(12) United States Patent
Kim

(10) Patent No.: US 11,890,843 B2
(45) Date of Patent: Feb. 6, 2024

(54) COMPOSITE CUSHIONING MATERIAL AND JIGLESS METHOD FOR MAKING THE SAME

(71) Applicant: Applied FT Composite Solutions Inc., Las Vegas, NV (US)

(72) Inventor: Daniel Kim, Busan (KR)

(73) Assignee: Applied FT Composite Solutions Inc., Las Vegas, NV (US)

( * ) Notice: Subject to any disclaimer, the term of this patent is extended or adjusted under 35 U.S.C. 154(b) by 175 days.

(21) Appl. No.: 13/901,034

(22) Filed: May 23, 2013

(65) Prior Publication Data

US 2014/0154452 A1 Jun. 5, 2014

Related U.S. Application Data

(63) Continuation of application No. PCT/US2011/062164, filed on Nov. 24, 2011.

(Continued)

(51) Int. Cl.
*B32B 3/18* (2006.01)
*A43B 13/18* (2006.01)
(Continued)

(52) U.S. Cl.
CPC .............. *B32B 3/18* (2013.01); *A43B 13/187* (2013.01); *A43B 17/14* (2013.01); *B29D 35/128* (2013.01);
(Continued)

(58) Field of Classification Search
CPC ..... B32B 3/18; B32B 38/0004; A43B 13/187; A43B 17/14; B29D 35/128; B29D 35/148;
(Continued)

(56) References Cited

U.S. PATENT DOCUMENTS 1,922,228 A  8/1933  Brown
2,604,642 A  7/1952  Marco
(Continued)

FOREIGN PATENT DOCUMENTS

CN  1179927 A  4/1998
CN  101135132 A  3/2008
(Continued)

OTHER PUBLICATIONS

Sheeler, J. W. "Glass Fibers as a Reinforcement for Elastomeric Compounds" Jul. 1977, Journal of Elastomers and Plastics vol. 9 pp. 267-280 (Year: 1977).*

(Continued)

*Primary Examiner* — Alicia J Weydemeyer
*Assistant Examiner* — Laura B Figg
(74) *Attorney, Agent, or Firm* — FisherBroyles, LLP; Joseph Hyosuk Kim

(57) ABSTRACT

The present application discloses a method for fabricating a composite structure for use as a resilient cushion, including: (a) placing a sheet of first resilient material on a surface; (b) cutting the sheet of first resilient material by pressing a cutter on to the first resilient material to produce a cut sheet of first resilient material displaying a cutting pattern of discrete first resilient elements of defined widths and lengths, wherein at least one of the first resilient elements touches adjacent resilient elements along its side; and (c) mounting a first expanse of material on at least one of the first resilient elements of the cut sheet of first resilient material to form a first composite structure.

16 Claims, 46 Drawing Sheets

Related U.S. Application Data

(60) Provisional application No. 61/417,177, filed on Nov. 24, 2010.

(51) Int. Cl.

| | | |
|---|---|---|
| *A43B 17/14* | (2006.01) | |
| *B29D 35/12* | (2010.01) | |
| *B29D 35/14* | (2010.01) | |
| *B32B 38/00* | (2006.01) | |
| *A41D 31/28* | (2019.01) | |

(52) U.S. Cl.
CPC ........ *B29D 35/148* (2013.01); *B32B 38/0004* (2013.01); *A41D 31/28* (2019.02); *Y10T 156/1043* (2015.01); *Y10T 156/1062* (2015.01); *Y10T 428/18* (2015.01)

(58) Field of Classification Search
CPC ............. Y10T 428/18; Y10T 156/1043; Y10T 156/1062; A41D 31/0044
USPC ........................................................ 428/54
See application file for complete search history.

(56) References Cited

U.S. PATENT DOCUMENTS

| | | | |
|---|---|---|---|
| 2,775,998 A | | 1/1957 | Osborn |
| 2,815,515 A | | 12/1957 | McKinley |
| 3,020,186 A | | 2/1962 | Lawrence |
| 3,285,768 A | | 11/1966 | Habib |
| 3,310,819 A | | 3/1967 | Morrison |
| 3,876,493 A | | 4/1975 | Gilmore |
| 4,194,255 A | | 3/1980 | Poppe |
| 4,272,850 A | | 6/1981 | Rule |
| 4,513,449 A | | 4/1985 | Donzis |
| 4,534,354 A | | 8/1985 | Bonner, Jr. et al. |
| 4,538,301 A | | 9/1985 | Sawatzki et al. |
| 4,543,862 A | | 10/1985 | Levene et al. |
| 4,686,724 A | | 8/1987 | Bedford |
| 4,823,483 A | * | 4/1989 | Chapnick ............... A43B 17/14 36/43 |
| 4,862,780 A | | 9/1989 | Memmott et al. |
| 4,930,232 A | * | 6/1990 | Engle ..................... A43B 13/12 36/44 |
| 5,052,053 A | | 10/1991 | Peart et al. |
| 5,325,537 A | | 7/1994 | Marion |
| 5,360,653 A | | 11/1994 | Ackley |
| 5,435,765 A | | 7/1995 | Fletcher |
| 5,551,082 A | | 9/1996 | Stewart et al. |
| 5,741,568 A | | 4/1998 | Rudy |
| 5,766,720 A | | 6/1998 | Yamagishi et al. |
| 5,836,027 A | | 11/1998 | Leventhal et al. |
| 5,858,155 A | | 1/1999 | Hill et al. |
| 5,902,439 A | | 5/1999 | Pike et al. |
| 5,938,875 A | | 8/1999 | Jessup et al. |
| 6,018,832 A | | 2/2000 | Graebe |
| 6,347,423 B1 | | 2/2002 | Stumpf |
| 6,444,078 B1 | | 9/2002 | Yoo |
| 6,519,781 B1 | | 2/2003 | Berns |
| 6,739,008 B1 | | 5/2004 | Kindrick |
| 6,743,325 B1 | | 6/2004 | Taylor |
| 6,829,794 B2 | | 12/2004 | Lenyo |
| 6,848,136 B2 | | 2/2005 | Sonobe |
| 6,854,144 B1 | | 2/2005 | Mehring, Jr. |
| 6,878,437 B1 | * | 4/2005 | Crane ....................... B32B 5/18 428/317.7 |
| 6,969,548 B1 | | 11/2005 | Goldfine |
| 7,082,623 B2 | | 8/2006 | Johnson et al. |
| 7,100,216 B2 | | 9/2006 | Matechen et al. |
| 7,235,291 B2 | | 6/2007 | Miyazaki et al. |
| 7,428,764 B2 | | 9/2008 | Clark |
| 7,992,226 B2 | | 8/2011 | Turner |
| 2003/0110567 A1 | | 6/2003 | Kawamura et al. |
| 2003/0186025 A1 | | 10/2003 | Scott et al. |
| 2005/0170935 A1 | | 8/2005 | Manser |
| 2006/0130372 A1 | * | 6/2006 | Auger ..................... A43C 15/14 36/134 |
| 2006/0162082 A1 | | 7/2006 | Kawahara et al. |
| 2007/0178282 A1 | | 8/2007 | Miekka |
| 2008/0075917 A1 | | 3/2008 | Park |
| 2008/0113143 A1 | | 5/2008 | Taylor |
| 2008/0127424 A1 | | 6/2008 | Rawls-Meehan |
| 2008/0201853 A1 | | 8/2008 | Graebe |
| 2008/0264557 A1 | * | 10/2008 | Kim ....................... B29C 65/02 156/251 |
| 2008/0282438 A1 | | 11/2008 | Boutaghou |
| 2009/0233511 A1 | | 9/2009 | Turner |
| 2009/0235558 A1 | * | 9/2009 | Auger ..................... A43B 7/085 36/30 R |
| 2010/0129573 A1 | | 5/2010 | Kim |
| 2011/0247744 A1 | * | 10/2011 | Turner ................... A63B 71/12 156/163 |

FOREIGN PATENT DOCUMENTS

| | | | |
|---|---|---|---|
| CN | 100406236 C | | 7/2008 |
| EP | 0008960 A2 | | 3/1980 |
| EP | 2009190 A2 | | 12/2008 |
| GB | 2456659 A | | 7/2009 |
| JP | 1974-125110 | | 10/1974 |
| JP | 50-135412 | | 10/1975 |
| JP | 52-50977 | | 11/1977 |
| WO | 9733493 | | 9/1997 |
| WO | 2006082595 A1 | | 8/2006 |
| WO | 2006134079 A1 | | 12/2006 |
| WO | WO-2007126271 A1 * | 11/2007 | ........... A43B 13/182 |

OTHER PUBLICATIONS

Yang et al. "Thermal expansion of polyurethane foam at low temperatures", Sep. 26, 2006, Elsevier Energy Conversion & Management 48 481-485 (Year: 2006).*

International Search Report and Written Opinion for PCT Application No. PCT/US2009/065699, dated Apr. 23, 2010 (16 pages).

International Search Report and Written Opinion for corresponding PCT Application No. PCT/US2011/062164, dated May 7, 2013 (25 pages).

* cited by examiner

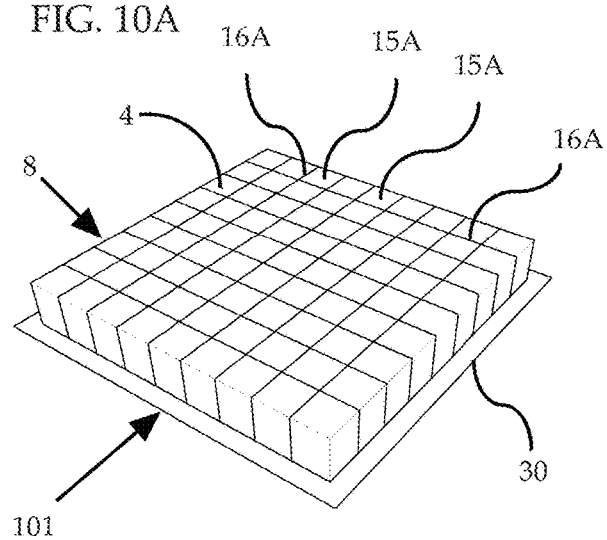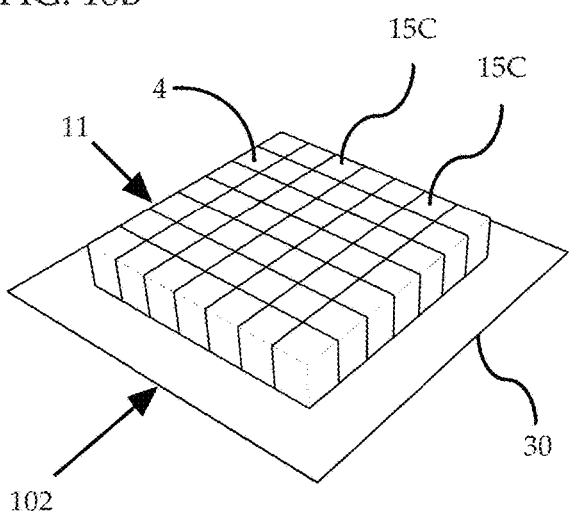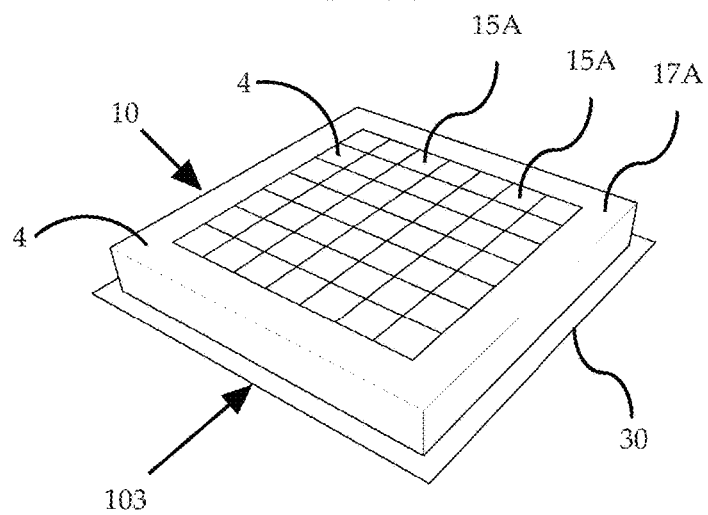

101

121A

103

123A

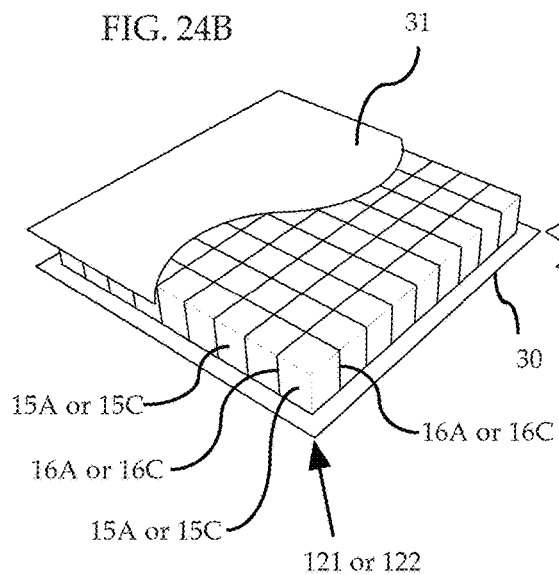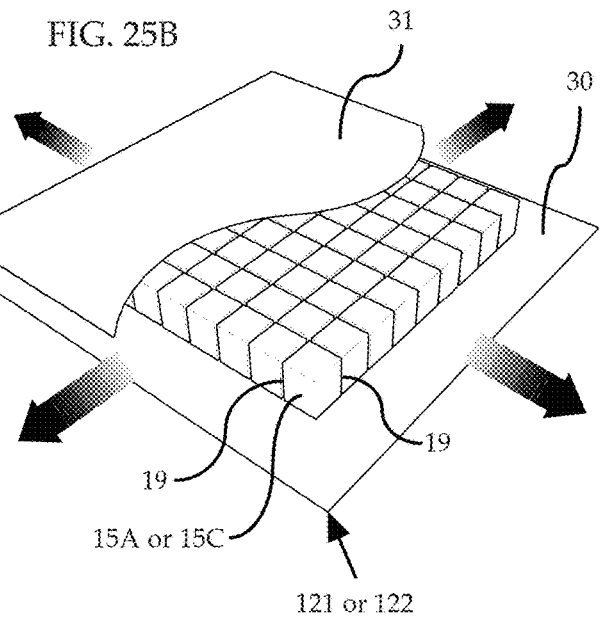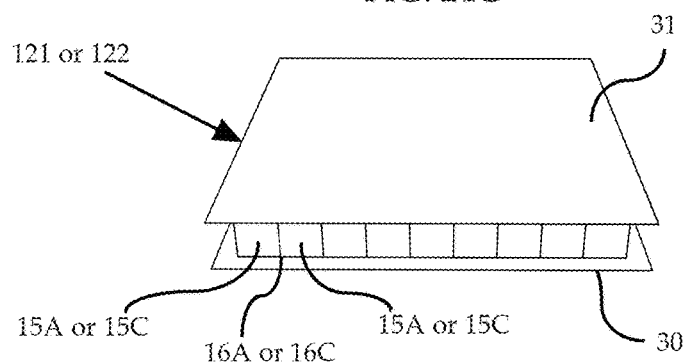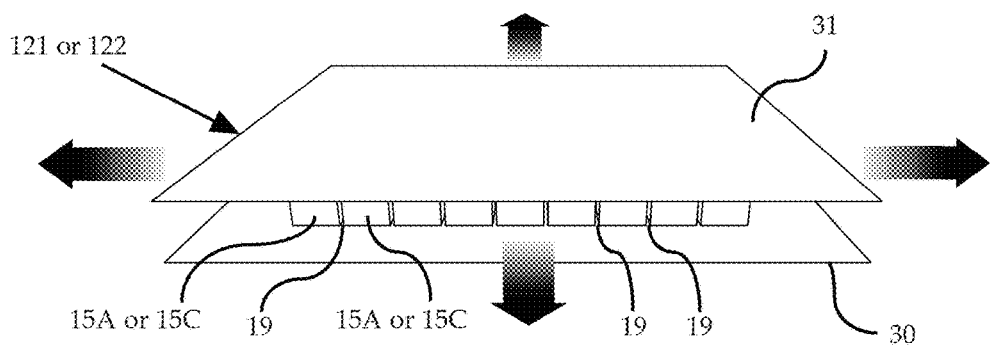

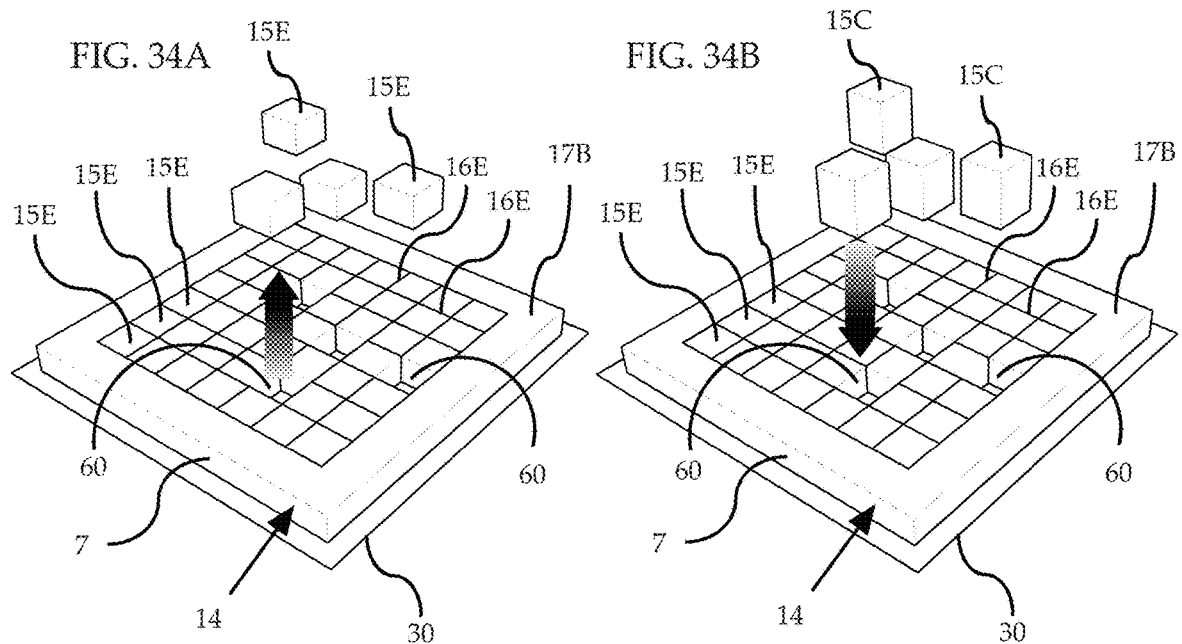
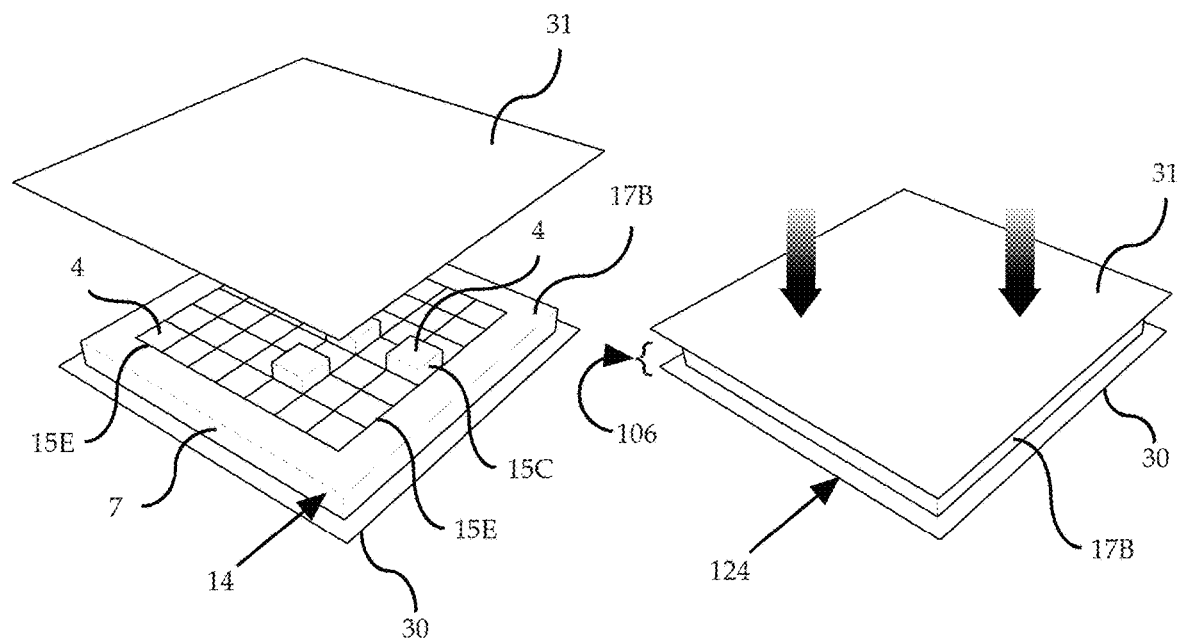

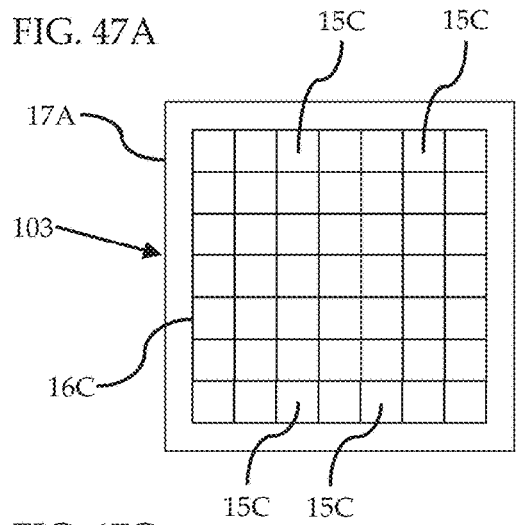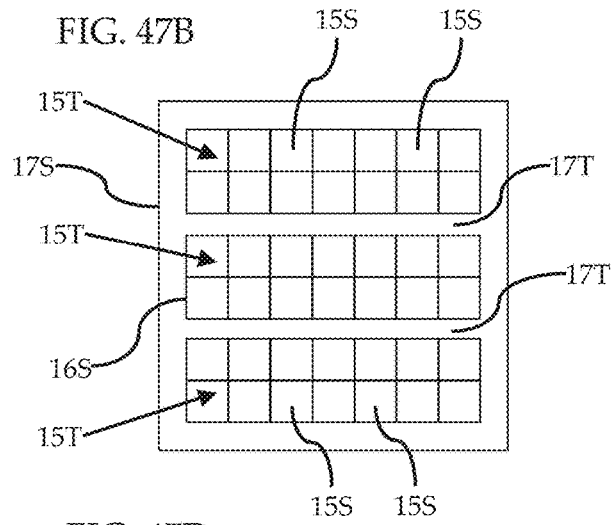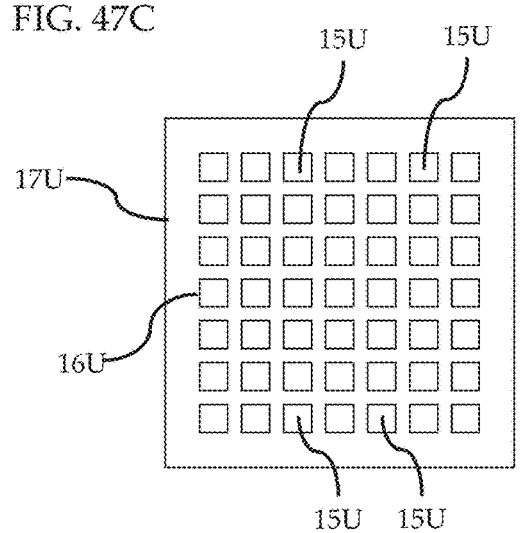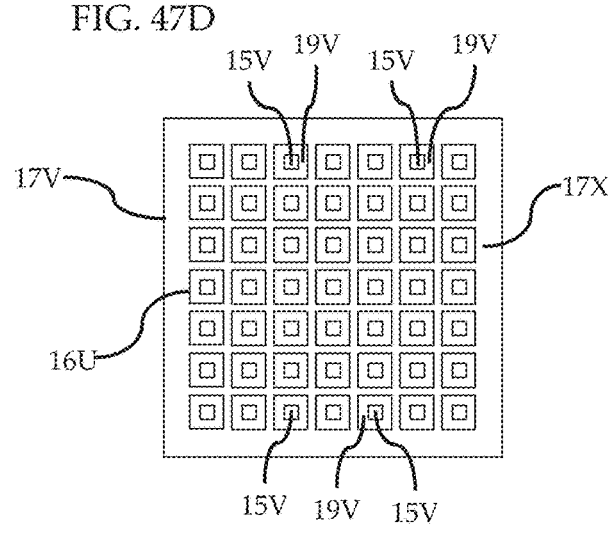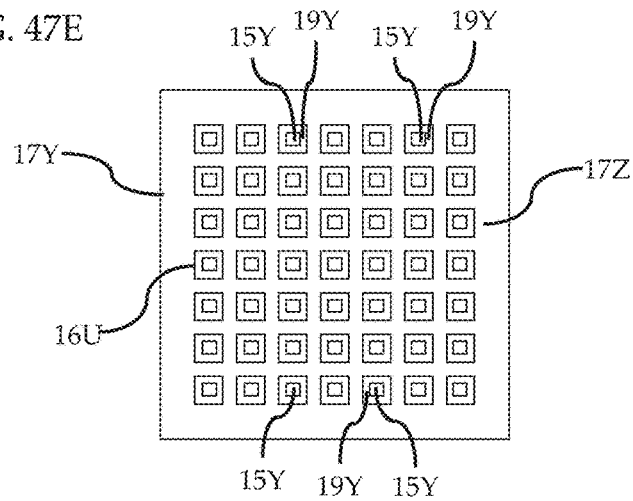

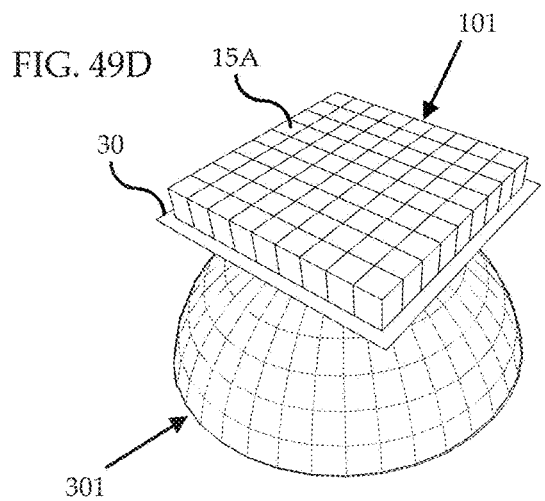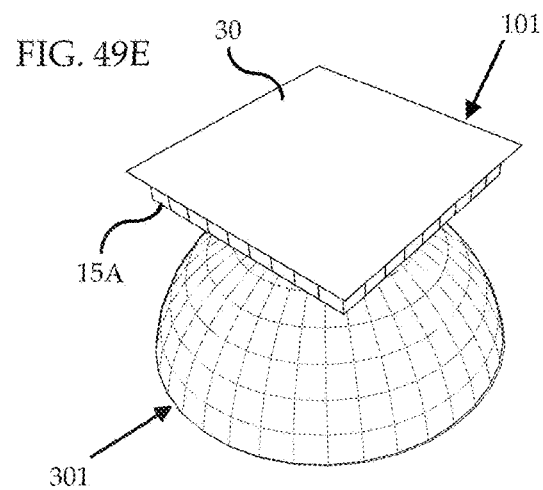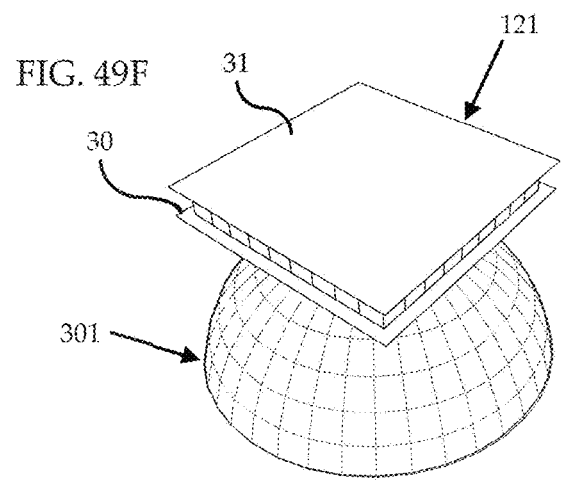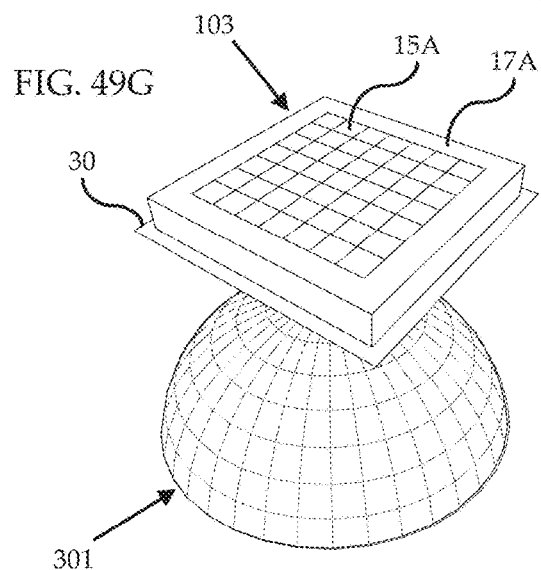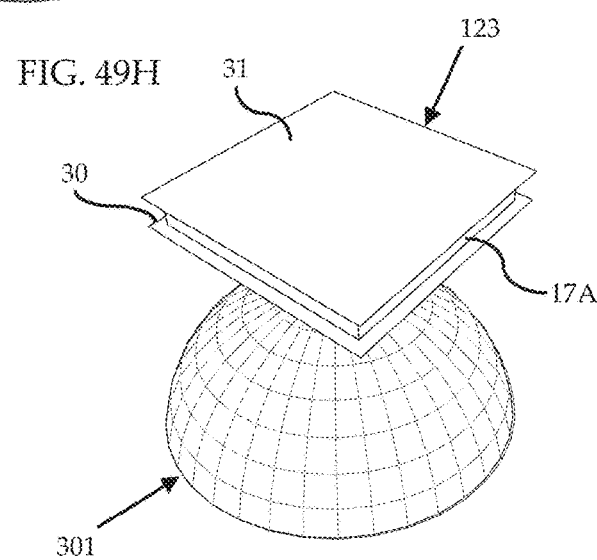

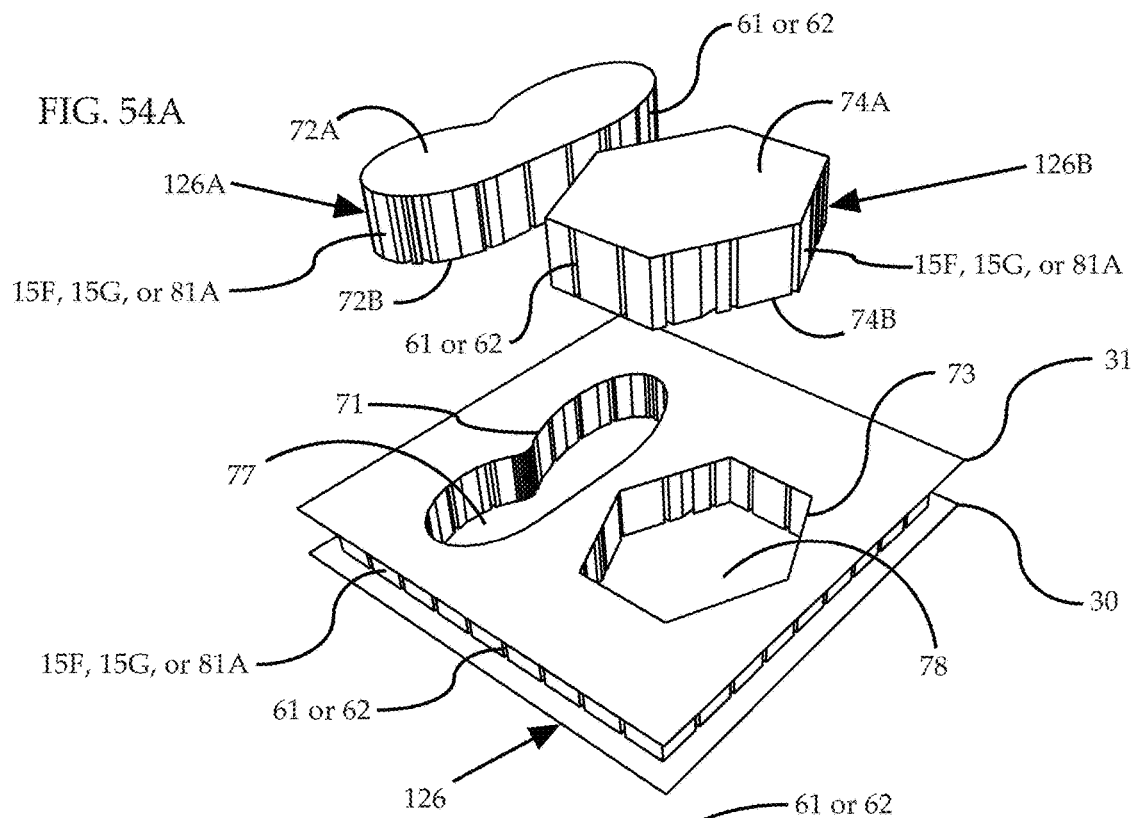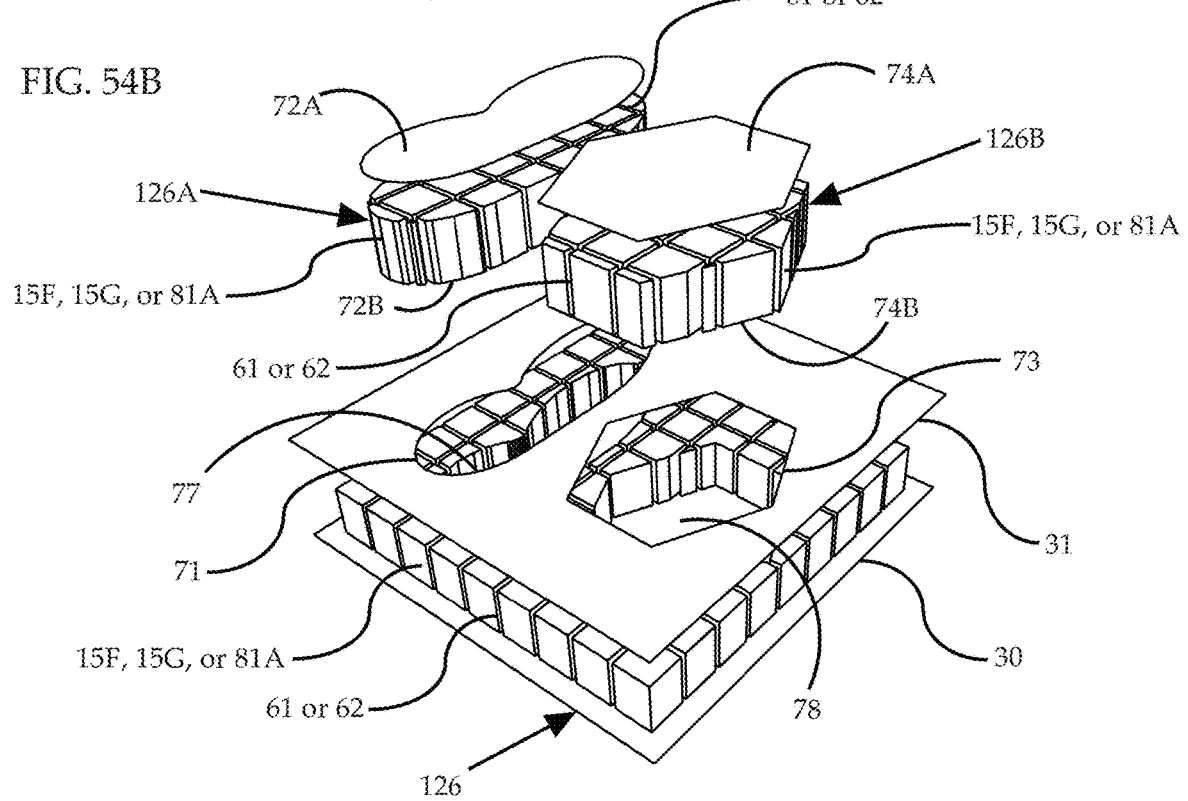

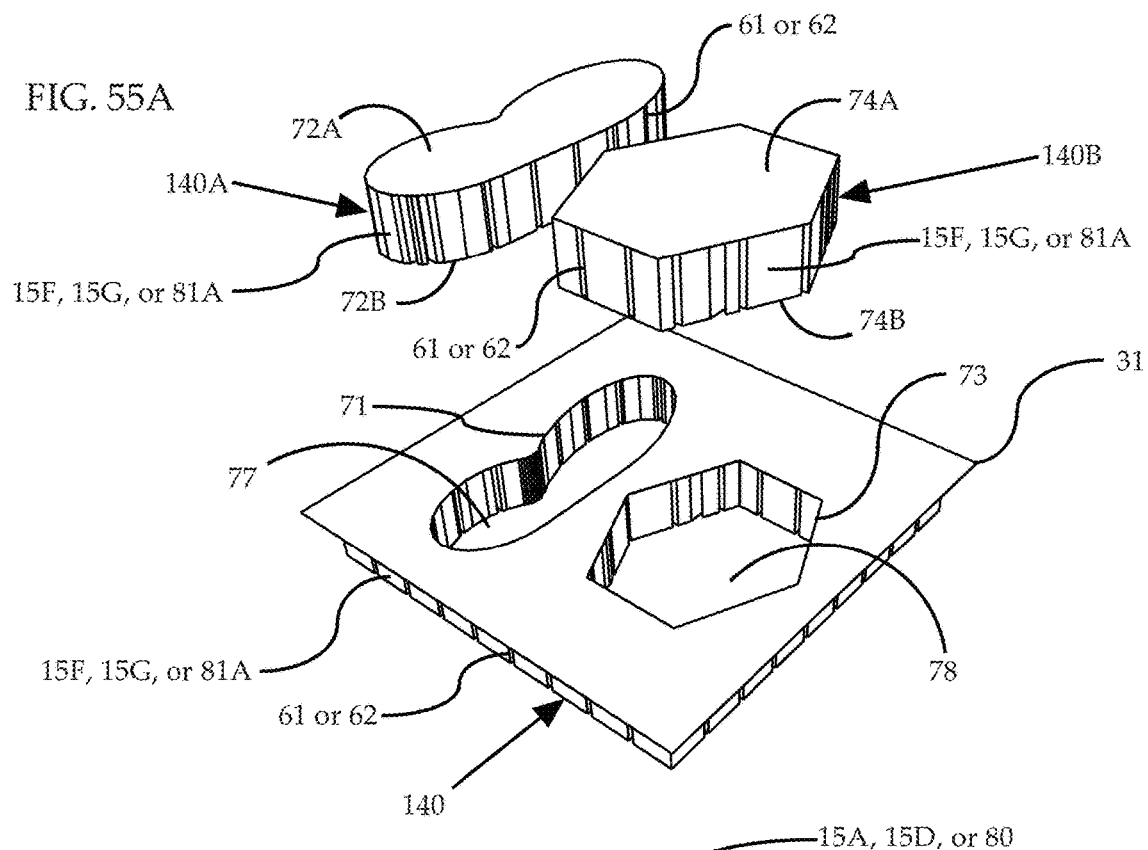
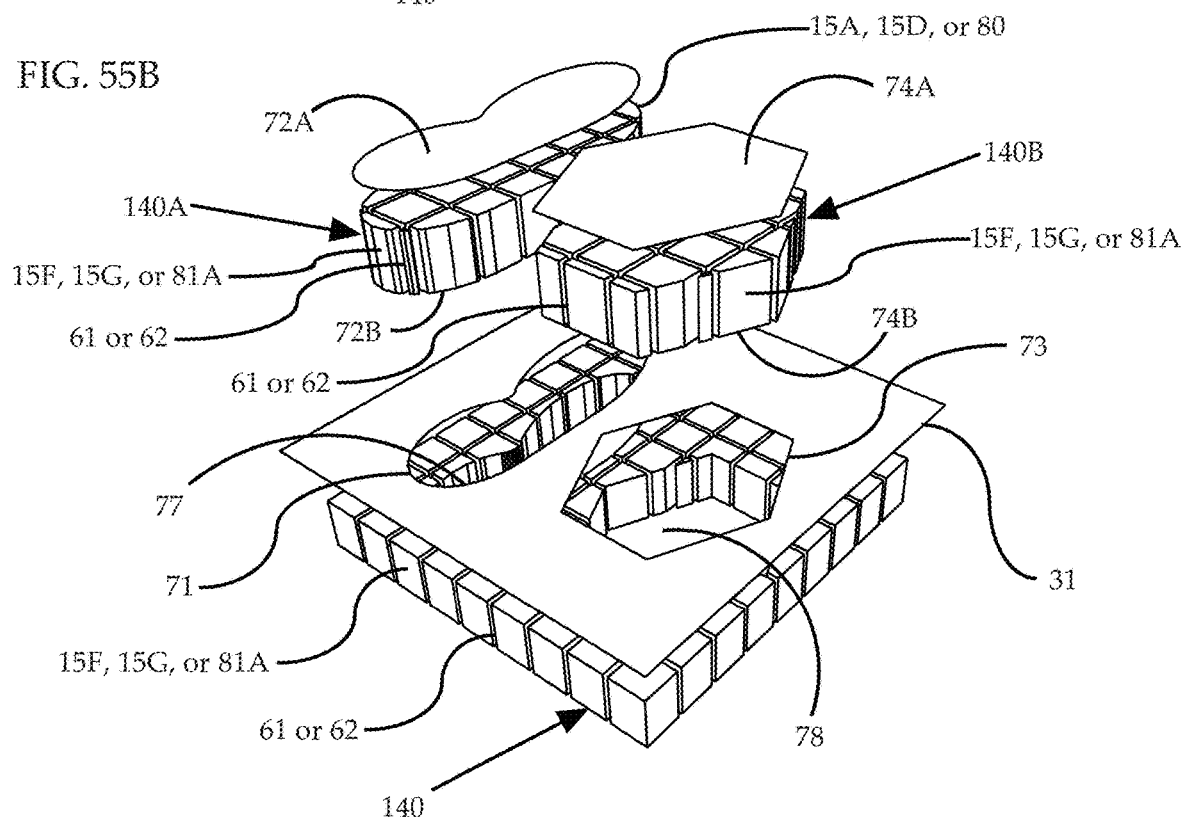

COMPOSITE CUSHIONING MATERIAL AND JIGLESS METHOD FOR MAKING THE SAME

BACKGROUND OF THE INVENTION

General Background and State of the Art

The invention relates to a composite cushioning material and the method for making the same. As described in greater detail below, this composite cushioning material is lightweight, flexible, and stretchable. Once assembled, the material can be used as cushioning component in footwear, as protective padding, or as components in athletic or industrial protective gear. The composite cushioning material can be made stretchable so as to better follow the contours of the wearer's body, hand, or foot, or to fully envelop the body parts that are intended to be protected, yet be flexible and breathable. The invention also relates to a method for making the said composite cushioning material without using molds or jigs during the assembly of its components.

SUMMARY OF THE INVENTION

In one aspect, the present invention is described as follows:

In one embodiment, the present application is directed to a method for fabricating a composite structure for use as a resilient cushion, comprising:
  (a) placing a sheet of first resilient material on a surface;
  (b) cutting the sheet of first resilient material by pressing a cutter on to the first resilient material to produce a cut sheet of first resilient material displaying a cutting pattern of discrete first resilient elements of defined widths and lengths, wherein at least one of the first resilient elements touches adjacent resilient elements along its side; and
  (c) mounting a first expanse of material on at least one of the first resilient elements of the cut sheet of first resilient material to form a first composite structure.

The method may further comprise: holding the resilient elements in place on the surface without aid of a jig. The method may further comprise: holding the resilient elements in place through vacuum applied from the surface. The method may further comprise: holding the resilient elements in place through frictional contact between the resilient elements. The discrete resilient elements may interlock with each other. The resilient elements may be concave or convex shapes, wherein the concave shaped resilient elements interlock with the convex shaped resilient elements. The discrete resilient element may be shaped as a cylinder, cube, or trapezoid.

The method described above may include applying heat, pressure or both sufficient to change shape of at least one of the resilient elements at or near the site of contact with a source of heat or pressure generation or both, without affecting shape of the shape-changed resilient element progressively away from the site of contact along the length of the shape-changed resilient element or along the axis perpendicular to the source of heat or pressure, to provide spacing with respect to the shape-changed resilient element and an adjacent structure. The adjacent structure may be a resilient element. The adjacent structure is a perimetral edge.

The above method may also comprise applying heat, pressure or both sufficient to change shape of at least one of the resilient elements at or near the site of contact with a source of heat or pressure generation or both, to provide spacing with respect to the shape-changed resilient element and an adjacent structure.

The method described above may use heat alone. In one embodiment, the source of heat generation may be microwave or heat platen. Alternatively, both heat and pressure may be applied. Heat or pressure or both heat and pressure on the resilient element may be uniformly applied. The change in shape may be shrinkage, shriveling, rounding or contraction. The site of contact of the resilient element from the source of heat or pressure generation or both may be the first expanse of material. A range of from 0.1% to 99% may be changed in shape along the length of the shape-changed resilient element or along the axis perpendicular to the source of heat or pressure from the point of contact with the source of heat or pressure generation. The range may include from 0.1% to 50%, 0.1% to 40%, or 0.1% to 30%.

In the method described above, the resilient material may be made of ethylene vinyl acetate ("EVA") foam, olefin or polyolefin foam, polyurethane ("PU") foam, urethane based foam, thermoplastic foam, rubber, elastomer, or other material with suitable shock absorbing characteristics, or resistant to puncture or abrasion, or a combination thereof. The method may include further cutting the first composite material into a desired shape. The shape may be an insole that fits in a shoe. An adhesive may be used to mount at least one resilient element to the first expanse of material. The method may further comprise: activating the adhesive with a heat platen. The first expanse of material may be made of synthetic non-woven fabric, natural or synthetic fabric, mesh, flexible or pliable plastic, neoprene, natural leather, synthetic leather, or a sheet of synthetic fiber, foam, plastic, latex, silicone, rubber, elastomer, or any combination of such materials.

The above method may include stretching the first expanse of material after bonding to the resilient elements so that space is formed between the resilient elements after the stretching is released. The method may further comprise stretching the first expanse of material before bonding to the resilient elements so as to provide closer proximity of the resilient elements to each other after the resilient elements are bound to the first expanse of material after the stretching is released. The method may further comprise mounting a second expanse of material on at least one resilient element opposite the first expanse of material to form a second composite material. An adhesive may be used to mount the resilient element to either the first expanse of material, the second expanse of material or both the first and second expanse of material.

The method may further comprise: activating the adhesive with a heat platen. The first or second expanse of material may be made of synthetic non-woven fabric, natural or synthetic fabric, mesh, flexible or pliable plastic, neoprene, natural leather, synthetic leather, or a sheet of synthetic fiber, foam, plastic, latex, silicone, rubber, elastomer, or any combination of such materials. The method may include stretching the first or second expanse of material after bonding to the resilient elements so that space is formed between the resilient elements after the stretching is released. The method may include stretching the first or second expanse of material before bonding to the resilient elements so as to provide closer proximity of the resilient elements to each other after the resilient elements are bound to the first or second expanse of material after the stretching is released. The method may further include cutting the second composite structure into a desired shape. The shape may be an insole that fits in a shoe.

The method may further comprise in step (b),
(i) cutting a sheet of second resilient material by pressing a cutter on to the second resilient material to produce a cut sheet of second resilient material displaying a cutting pattern of discrete second resilient elements of defined widths and lengths, and
(ii) exchanging at least one first resilient element in the cut sheet of first resilient material with at least one second resilient element from the cut sheet of the second resilient material to form a first composite resilient material, wherein the first expanse of material mounted on the first composite resilient material forms a third composite structure.

The method above may further include in (ii), comprising pressing a mechanical holder to a first portion of the cut sheet of first resilient material so as to cover at least one first resilient element, and removing a second portion of first resilient material not covered by the mechanical holder.

The first resilient element and second resilient element may have same or different physical characteristics. The second resilient elements may be obtained comprising the steps of:
(i) placing a sheet of second resilient material on a surface, wherein the second resilient material has different physical properties from the first resilient material;
(ii) cutting the sheet of second resilient material to produce a cut sheet of second resilient material displaying a cutting pattern that matches at least in areas identified to be exchanged in the first cut resilient material; and
(iii) removing at least one second resilient element from the cut sheet of second resilient material.

The difference in physical characteristics between the first and second resilient elements may be in the hardness, density, length, width or color.

The method above may include applying heat, pressure or both sufficient to change shape of at least one of the resilient elements at or near the site of contact with the source of heat, pressure or both, without affecting shape of the shape-changed resilient elements progressively away from the site of contact along the length of the shape-changed resilient elements or axis perpendicular to the source of heat or pressure, to provide spacing with regard to adjacent structure. The structure may be a resilient element. The shape of the resilient element sought to be changed may be composed of material that has faster shape changing rate when exposed to heat, pressure or both, than resilient element not sought to be changed. The material that may have faster shape changing rate is less dense material. The method may include applying heat or pressure or both uniformly to the resilient element. The change in shape may be shrinkage, shriveling, rounding or contraction. The site of contact of the resilient element to the source of heat or pressure may be through the first expanse of material. A range of from 0.1% to 50% may be changed in shape along the length of the shape-changed resilient elements or axis perpendicular to the source of heat or pressure from the point of contact with the source of heat or pressure. The range may include from 0.1% to 40%, or 0.1% to 30%. The resilient material may be made of ethylene vinyl acetate ("EVA") foam, olefin or polyolefin foam, polyurethane ("PU") foam, urethane based foam, thermoplastic foam, rubber, elastomer, or other material with suitable shock absorbing characteristics, or resistant to puncture or abrasion, or a combination thereof. The method above may include further cutting the third composite structure into a desired shape. The shape may be an insole that fits in a shoe. The method above may further include mounting a second expanse of material on the resilient element opposite the first expanse of material to form a fourth composite structure. An adhesive may be used to mount the resilient element to either the first expanse of material, the second expanse of material or both the first and second expanse of material. The method above may further include: activating the adhesive with a heat platen.

The first or second expanse of material is made of synthetic non-woven fabric, natural or synthetic fabric, mesh, flexible or pliable plastic, neoprene, natural leather, synthetic leather, or a sheet of synthetic fiber, foam, plastic, latex, silicone, rubber, elastomer, or any combination of such materials.

The method above may include stretching the first or second expanse of material after bonding to the resilient elements so that space is formed between the resilient elements after the stretching is released. The method may include stretching the first or second expanse of material before bonding to the resilient elements so as to provide closer proximity of the resilient elements to each other after the resilient elements are bound to the first or second expanse of material after the stretching is released. The method may include further cutting the fourth composite structure into a desired shape. The shape may be an insole that fits in a shoe.

In another aspect, the present invention is directed to a method for fabricating a multiple density resilient element composite structure for use as a resilient cushion, comprising:
(a) placing a sheet of third resilient material on a surface;
(b) cutting the sheet of third resilient material by pressing a cutter on to the third resilient material to produce a cut sheet of third resilient material displaying a cutting pattern of discrete third resilient elements of defined widths and lengths;
(c) placing a sheet of fourth resilient material on a surface;
(d) cutting the sheet of fourth resilient material by pressing a cutter on to the fourth resilient material to produce a cut sheet of fourth resilient material displaying a cutting pattern of discrete fourth resilient elements of defined widths and lengths, wherein the fourth resilient material is composed of material that has slower shape changing rate when exposed to heat, pressure or both than the third resilient material, or changes shape or dimension to a lesser extent when exposed to heat, pressure or both than the third resilient material;
(e) removing at least one third resilient element from the cut sheet of third resilient material and replacing it by inserting a fourth resilient element into the cut sheet of third resilient material to form a second composite resilient material;
(f) placing a sheet of the second composite resilient material on a surface;
(g) cutting the sheet of second composite resilient material by pressing a cutter on to the second composite resilient material to produce a cut sheet of second composite resilient material displaying a cutting pattern of discrete fifth resilient elements of defined widths and lengths, wherein at least one of the fifth resilient elements comprises a combination of the third resilient material and fourth resilient element; and
(h) mounting a first expanse of material on at least one of the fifth resilient elements of the cut sheet of second composite resilient material to form a fifth composite structure comprising multiple density resilient element composite.

The material that has slower shape changing rate when exposed to heat, pressure or both may be the denser material. The material that changes shape or dimension to a lesser extent when exposed to heat, pressure or both than the third resilient material may be denser material. The fifth resilient element may include, third resilient material completely or partially enveloping the fourth resilient element. In step (e) of the method described above, the third element is not completely removed from the third resilient element. The fifth resilient element comprises the third resilient element and fourth resilient element positioned end to end. The fifth resilient element may touch adjacent fifth resilient elements.

The above method may include applying heat, pressure or both sufficient to change shape of at least one of the fifth resilient elements at or near the site of contact, without affecting shape of the shape-changed fifth resilient element progressively away from the site of contact with the heat or pressure source along the length of the shape-changed resilient element or axis perpendicular to the source of heat or pressure, to provide spacing with regard to adjacent structure. The adjacent structure may be a resilient element. The method may include applying heat or pressure or both uniformly to the fifth resilient element. The change in shape may be shrinkage, shriveling, rounding or contraction. The site of contact of the resilient element to the source of heat or pressure may be through the first expanse of material. A range of from 0.1% to 50% may be changed in shape along the length of the shape-changed resilient element or axis perpendicular to the source of heat or pressure from the point of contact with the source of heat or pressure. The range may be from 0.1% to 40% or 0.1% to 30%. The resilient material may be made of ethylene vinyl acetate ("EVA") foam, olefin or polyolefin foam, polyurethane ("PU") foam, urethane based foam, thermoplastic foam, rubber, elastomer, or other material with suitable shock absorbing characteristics, or resistant to puncture or abrasion, or a combination thereof.

The method above may include further cutting the fifth composite structure into a desired shape. The shape may be an insole that fits in a shoe. The method above may include further mounting a second expanse of material on at least one resilient element opposite the first expanse of material to form a sixth composite structure. An adhesive may be used to mount the resilient element to either the first expanse of material, the second expanse of material or both the first and second expanse of material. The method may further include: activating the adhesive with a heat platen. The first or second expanse of material may be made of synthetic non-woven fabric, natural or synthetic fabric, mesh, flexible or pliable plastic, neoprene, natural leather, synthetic leather, or a sheet of synthetic fiber, foam, plastic, latex, silicone, rubber, elastomer, or any combination of such materials.

The method described above may further include stretching the first or second expanse of material after bonding to the resilient elements so that space is formed between the resilient elements after the stretching is released. The method described above may further include stretching the first or second expanse of material before bonding to the resilient elements so as to provide closer proximity of the resilient elements to each other after the resilient elements are bound to the first or second expanse of material after the stretching is released. The method described above may further include further cutting the sixth composite structure into a desired shape. The shape may be an insole that fits in a shoe.

The method described above may further include in step (g), exchanging at least one fifth resilient element in the cut sheet of second composite resilient material with at least one multiple density resilient element or single density resilient element from a cut sheet of resilient material or composite resilient material, wherein the first expanse of material mounted on the cut sheet of second composite resilient material forms a seventh composite structure. The method described above may further include mounting a second expanse of material on at least one resilient element opposite the first expanse of material to form an eighth composite structure. The method described above may further include exchanging the fifth resilient element into another cut resilient material to form multiple density resilient elements.

In another aspect, the invention is directed to a composite material for use as a resilient cushion, comprising
(i) a first expanse of material; and
(ii) at least one resilient element having defined length and width and physical characteristics connected to the first expanse of material at one end of the length of the resilient elements to form the composite material.

The composite material may include a plurality of resilient elements. At least some of the plurality of resilient elements may be different from each other in physical characteristics. The difference in the physical characteristics may be in color, length, width, hardness or density, or shrinkage when exposed to heat, pressure, or both. At least one resilient element is changed in shape at or near the point of contact with the first expanse of material. The change in shape may be shriveling, rounding, shrinking, cutting or contracting at an edge of the resilient element at or near the point of contact with the first expanse of material. The change in shape on the shape-changed resilient elements may be on material having faster shape changing rate when exposed to heat or pressure or both. The material with faster shrinking rate may be less dense material. A range of from 0.1% to 99% along the length of the resilient element from the point of contact with the first expanse of material may be changed in shape. The range may include from 0.1% to 50%, 0.1% to 40% or 0.1% to 30%.

It is recognized that generally the present invention is drawn to using resilient material having either a rate of deformation that is quicker or slower as well as the extent of deformation that is more or less.

The composite material may include a second expanse of material bound to the resilient element on the opposite side of the first expanse of material. The resilient elements may be made of ethylene vinyl acetate ("EVA") foam, olefin or polyolefin foam, polyurethane ("PU") foam, urethane based foam, thermoplastic foam, rubber, elastomer, or other material with suitable shock absorbing characteristics, or resistant to puncture or abrasion, or a combination thereof. The composite material may be a sockliner.

The resilient material in the composite may include a dense core fully and partially enveloped by less dense material. The less dense material on the resilient material may be changed in shape at or near the point of contact with the first expanse of material. The less dense material on the resilient material may be changed in shape at or near the point of contact with the second expanse of material.

It is recognized that resilient material that shrinks comparatively more is not necessarily less dense. And such material may also be used in making the "double density" resilient element.

In another aspect, the invention is directed to a multiple density composite material for use as a resilient cushion, comprising
(i) a first expanse of material; and
(ii) at least one resilient element having defined first end and second end and a middle along the length of the resilient element, as well as defined width along the length of the resilient element, connected to the first expanse of material at the first end of the resilient element to form the composite material, wherein the first end of the resilient element connected to the first expanse of material has maximum diameter that is less than the maximum diameter of the middle of the resilient element.

The maximum diameter of the first end may be less than the maximum diameter of the middle of the resilient element by about 1 to 50%, 5 to 50%, 10 to 40%, 15 to 35%, 20 to 30% or 5 to 30%.

The composite may comprise a second expanse of material bound to the opposite side of the first expanse of material, to which is bound second end of at least one resilient element, wherein the maximum diameter of the second end of the bound resilient element is less than the maximum diameter of the middle of the resilient element. The maximum diameter of the second end may be less than the maximum diameter of the middle of the resilient element by about 1 to 50%, 5 to 50%, 10 to 40%, 15 to 35%, 20 to 30% or 5 to 30%. The maximum diameter of the first end may be more than the maximum diameter of the middle of the resilient element.

These and other objects of the invention will be more fully understood from the following description of the invention, the referenced drawings attached hereto and the claims appended hereto.

BRIEF DESCRIPTION OF THE DRAWINGS

The present invention will become more fully understood from the detailed description given herein below, and the accompanying drawings which are given by way of illustration only, and thus are not limitative of the present invention, and wherein;

FIG. 10A shows a perspective view of a first single laminate composite.

FIG. 10B shows a perspective view of a second single laminate composite.

FIG. 10C shows a perspective view of a third single laminate composite.

FIG. 24B shows a perspective cut-away view of a dual laminate composite material.

FIG. 24C shows a side perspective view of a dual laminate composite material.

FIG. 25B shows a perspective cut-away view of a dual laminate composite material being stretched in one or two horizontal axes co-planar with the substrate layer.

FIG. 25C shows a side perspective view of a dual laminate composite material being stretched in one or two horizontal axes co-planar with the substrate layer.

FIG. 34A shows a perspective view of seventh cut material positioned next to first substrate layer, with at least one instance of fifth resilient element removed.

FIG. 34B shows a perspective view of seventh cut material positioned next to first substrate layer, where at least one instance of fifth resilient element is removed and replaced with third resilient element.

FIG. 34C shows a perspective view of sixth single laminate composite with a second substrate layer positioned above it.

FIG. 34D shows a perspective view of second substrate layer being laminated and bonded to the exposed fifth and third resilient elements in sixth single laminate composite, to form fourth dual laminate composite.

FIG. 47A shows a top view of third single laminate composite.

FIG. 47B shows a top view of an alternative embodiment consisting of a variation of third cut material.

FIG. 47C shows a top view of another alternative embodiment of third cut material.

FIG. 47D shows a top view of third cut material after the application of heat, pressure, or both.

FIG. 47E shows a top view of third cut material where a material that is denser and/or less susceptible to shrinkage is used.

FIG. 49C shows a side view of a dome-shaped mold next to eighth dual laminate composite.

FIG. 49D shows a perspective view of a dome-shaped mold next to first single laminate composite.

FIG. 49E shows a perspective view of a dome-shaped mold next to first single laminate composite.

FIG. 49F shows a perspective view of a dome-shaped mold next to first dual laminate composite.

FIG. 49G shows a perspective view of a dome-shaped mold next to third single laminate composite.

FIG. 49H shows a perspective view of a dome-shaped mold next to third dual laminate composite.

FIG. 50A shows a perspective view of dual laminate composite.

FIG. 50B shows a perspective view of patterns cut into dual laminate composite.

FIG. 51A shows a perspective view of single laminate composite.

FIG. 51B shows a perspective view of patterns cut into single laminate composite.

FIG. 53A shows a perspective view of first dual laminate sockliner and first dual laminate padding cut and removed from dual laminate composite.

FIG. 53B shows an exploded perspective view of first dual laminate sockliner and dual laminate padding cut and removed from dual laminate composite.

FIG. 54A shows a perspective view of dual laminate sockliner with spaced elements and first dual laminate pad component with spaced elements cut and removed from sixth dual laminate composite.

FIG. 54B shows an exploded perspective view of dual laminate sockliner with spaced elements and first dual laminate pad component with spaced elements cut and removed from sixth dual laminate composite.

FIG. 55A shows a perspective view of single laminate sockliner with spaced elements and single laminate pad component with spaced elements cut and removed from eleventh single laminate composite.

FIG. 55B shows an exploded perspective view of single laminate sockliner with spaced elements and single laminate pad component with spaced elements cut and removed from eleventh single laminate composite.

Figure 60:
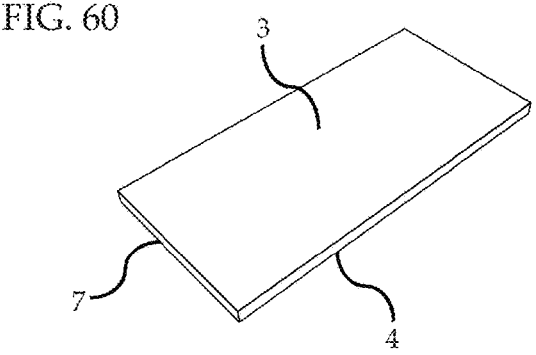

FIG. 60 shows a perspective view of second coated material.

Figure 61:
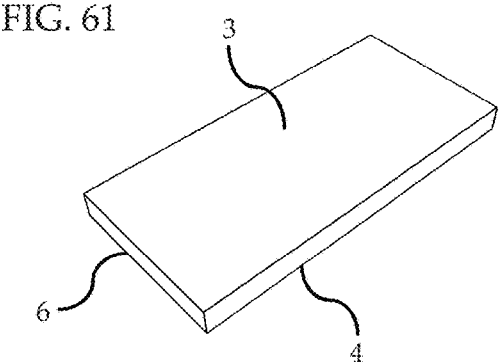

FIG. 61 shows a perspective view of first coated material.

Figure 62:
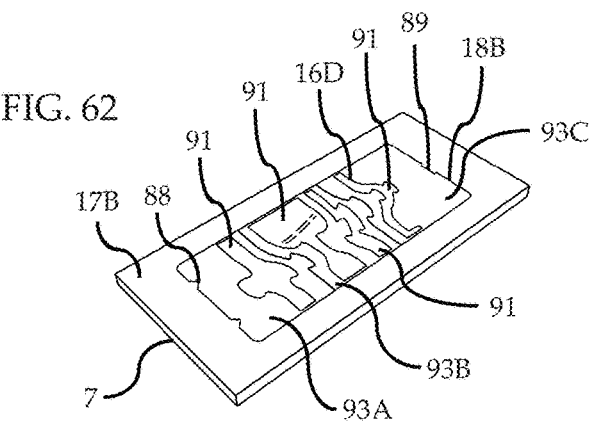

FIG. 62 shows a perspective view of second coated material cut along to define second perimetral edge and interrelated and interlocked resilient elements.

Figure 63:
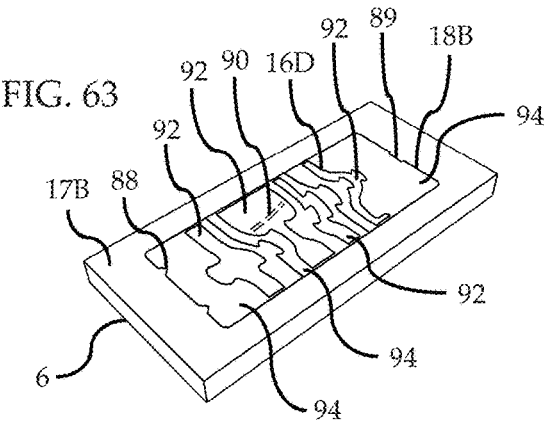

FIG. 63 shows a perspective view of first coated material cut along to define second perimetral edge and interrelated and interlocked resilient elements.

Figure 64:
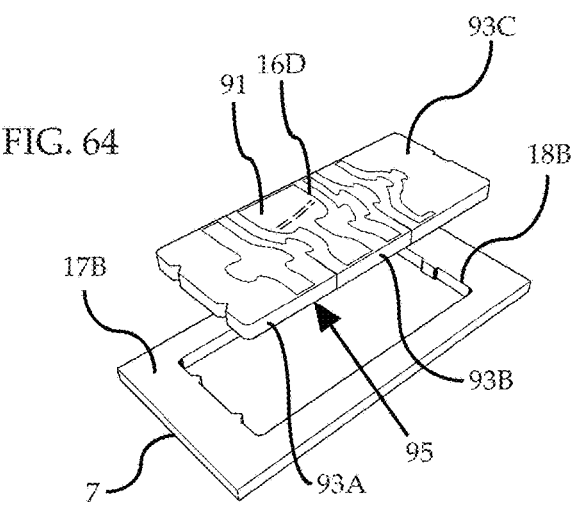

FIG. 64 shows a perspective view of second coated material cut along to define second perimetral edge and interrelated and interlocked resilient elements, with the interrelated and interlocked resilient elements separated and extracted from second perimetral edge, forming seventh partial pad assembly.

Figure 65:
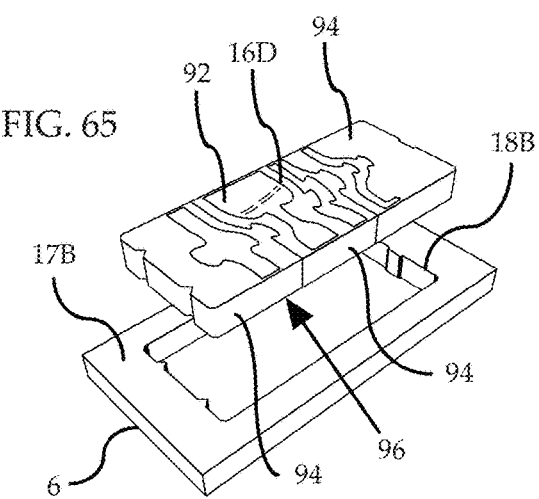

FIG. 65 shows a perspective view of first coated material cut along to define second perimetral edge and interrelated and interlocked resilient elements, with the interrelated and interlocked resilient elements separated and extracted from second perimetral edge, forming eighth partial pad assembly.

Figure 66:
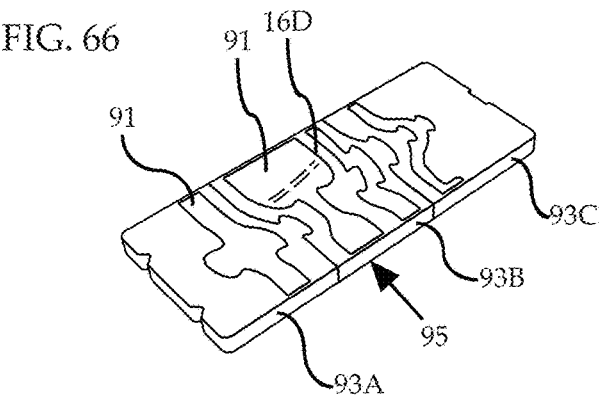

FIG. 66 shows a perspective view of seventh partial pad assembly.

Figure 67:
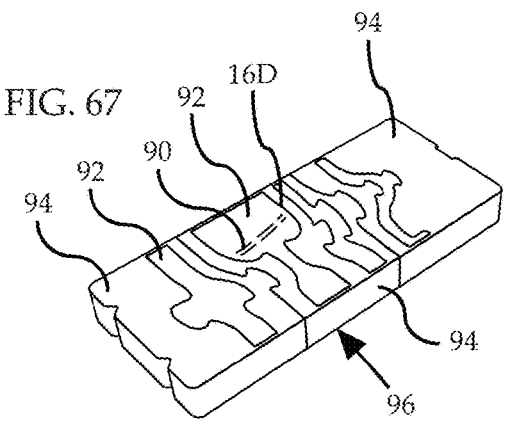

FIG. 67 shows a perspective view of eighth partial pad assembly.

Figure 68:
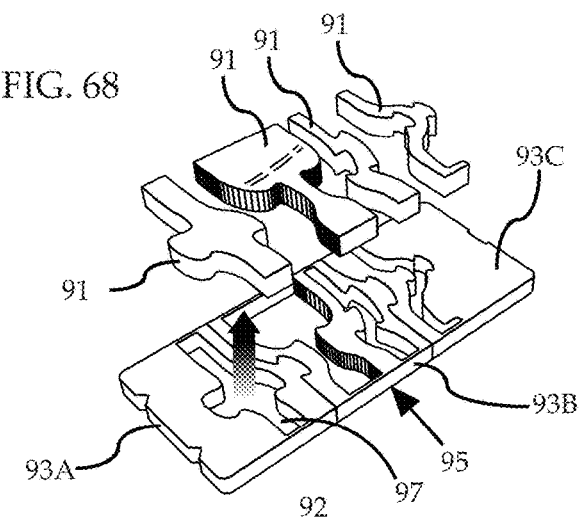

FIG. 68 shows a perspective view of seventh partial pad assembly, with ninth resilient elements extracted and removed.

Figure 69:
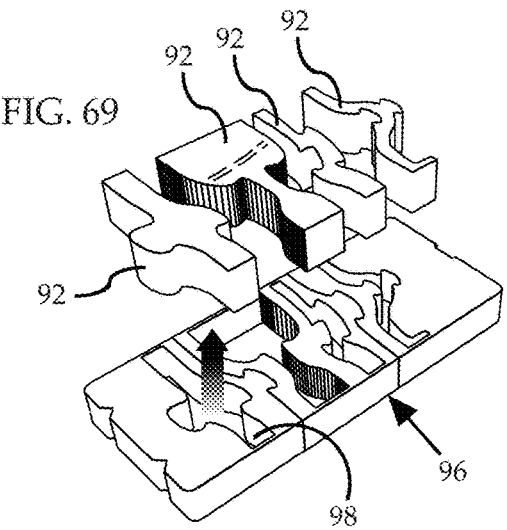

FIG. 69 shows a perspective view of eighth partial pad assembly, with tenth resilient elements extracted and removed.

Figure 70:
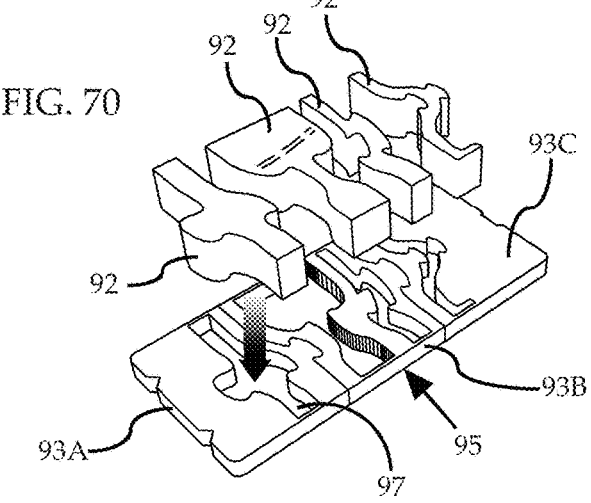

FIG. 70 shows a perspective view of seventh partial pad assembly, with ninth resilient elements extracted and removed, and tenth resilient elements being positioned for insertion into the negative spaces left behind.

Figure 71:
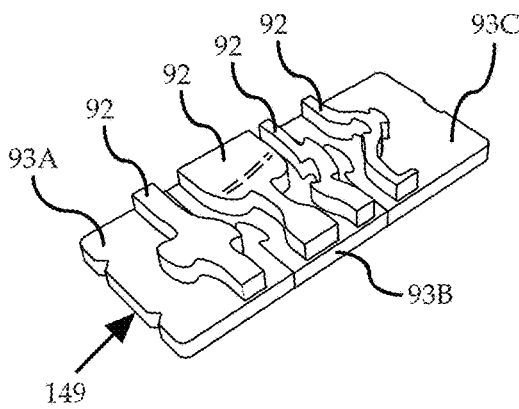

FIG. 71 shows a perspective view of ninth partial pad assembly, after insertion of tenth resilient elements into the spaces left behind by the extraction and removal of ninth resilient elements.

Figure 72:
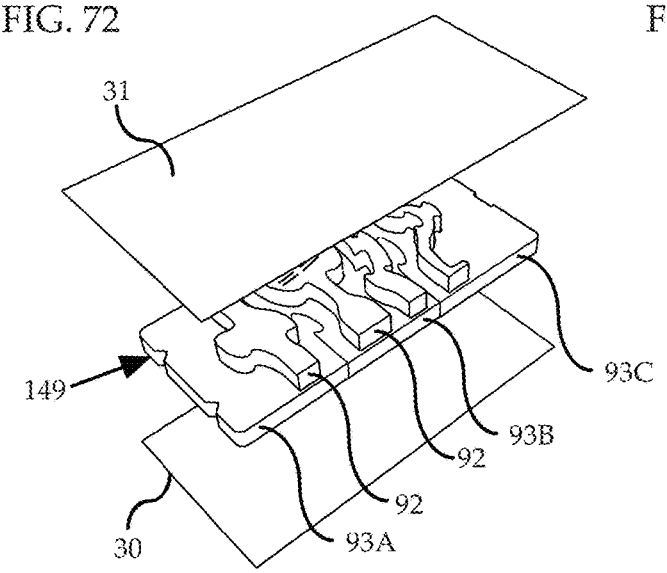

FIG. 72 shows a perspective view of first and second substrate layers being positioned for lamination or bonding to opposite faces of ninth partial pad assembly to form tenth dual laminate composite.

Figure 73:
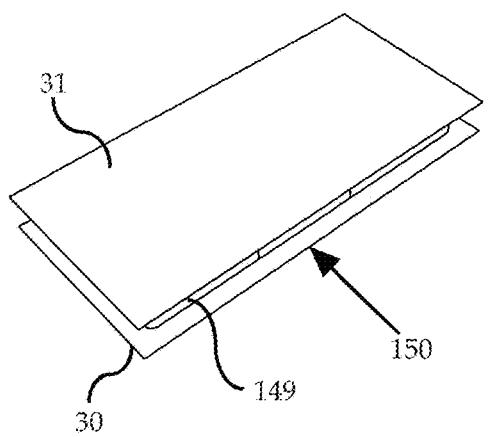

FIG. 73 shows a perspective view of tenth dual laminate composite.

Figure 74:
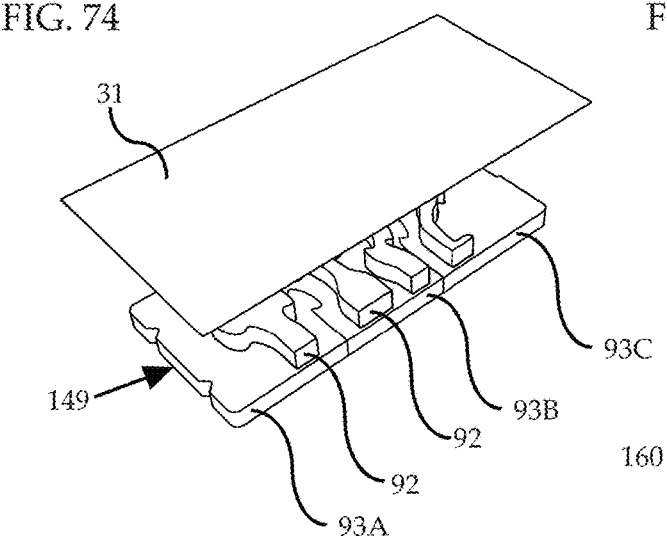

FIG. 74 shows a perspective view of second substrate layer being positioned for lamination or bonding to a face of ninth partial pad assembly to form twelfth single laminate composite.

Figure 75:
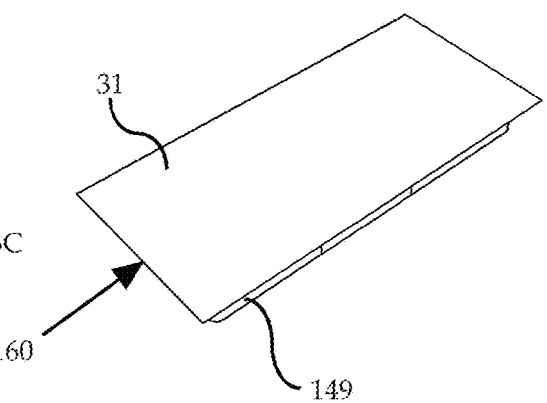

FIG. 75 shows a perspective view of twelfth single laminate composite.

Figure 76:
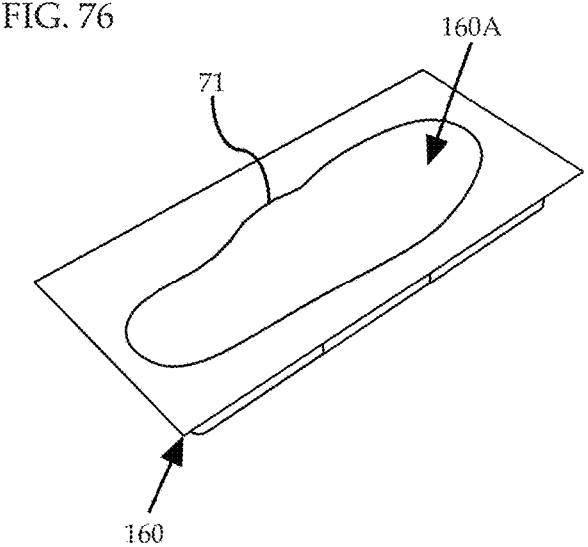

FIG. 76 shows a perspective view of patterns cut into twelfth single laminate composite.

Figure 77:
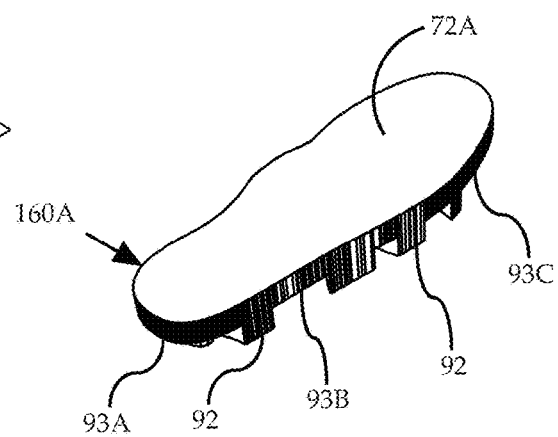

FIG. 77 shows a perspective view of single laminate sockliner after extraction and removal from twelfth single laminate composite.

Figure 78:
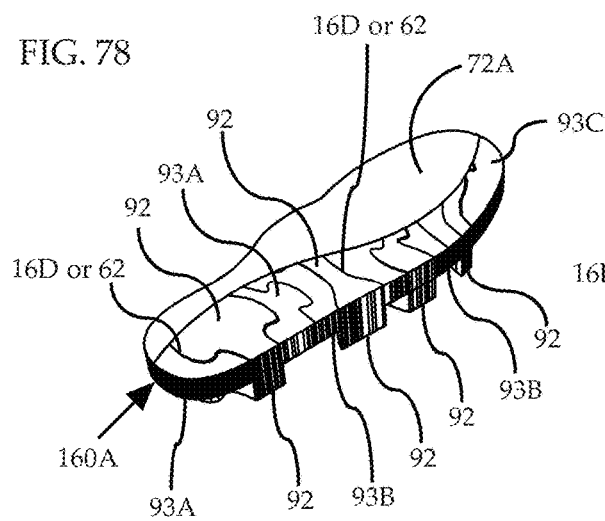

FIG. 78 shows a perspective cutaway view of single laminate sockliner.

Figure 79:
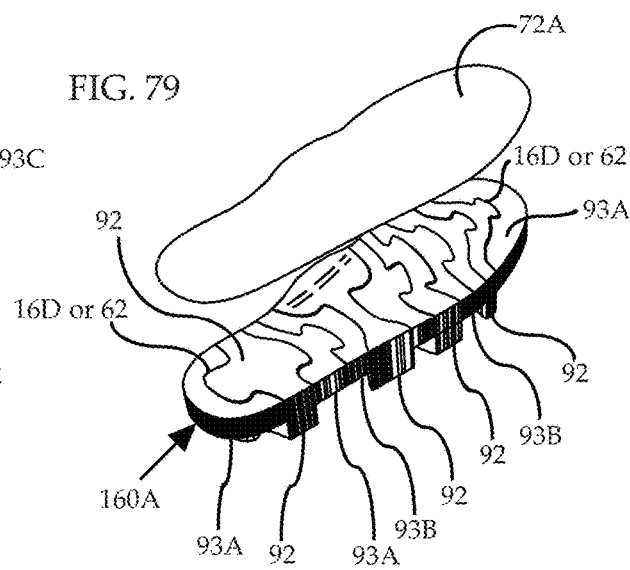

FIG. 79 shows an exploded perspective view of single laminate sockliner.

Figure 80:
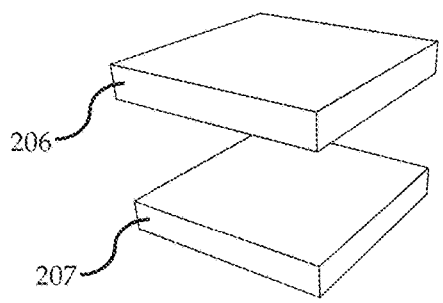

FIG. 80 shows a perspective view of coated material.

Figure 81:
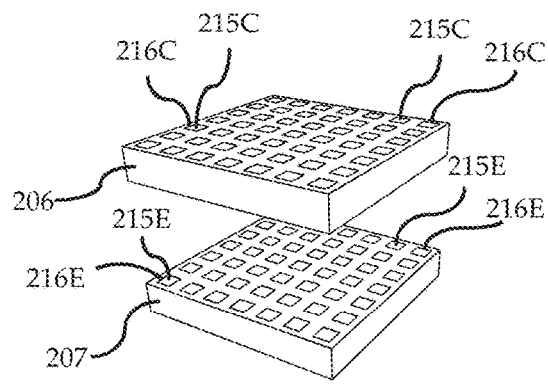

FIG. 81 shows a perspective view of coated material with cut resilient elements.

Figure 82:
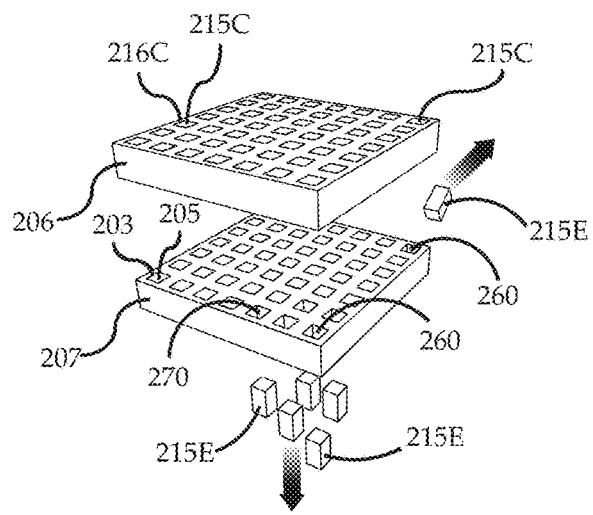

FIG. 82 shows a perspective view of coated material with cut resilient elements.

Figure 83:
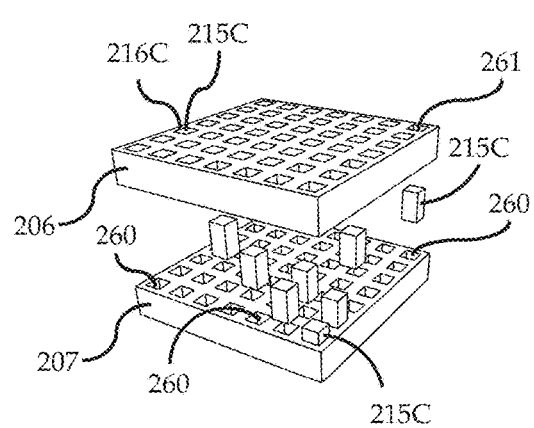

FIG. 83 shows a perspective view of coated material with cut resilient elements.

Figure 84:
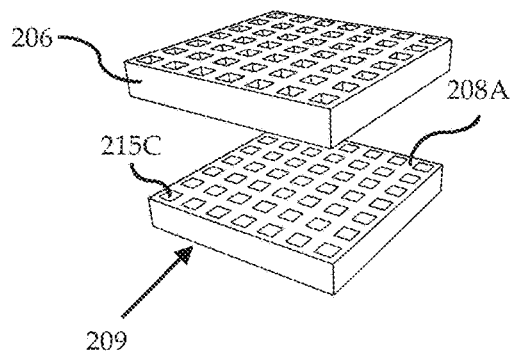

FIG. 84 shows a perspective view of dual density cut material.

Figure 85:
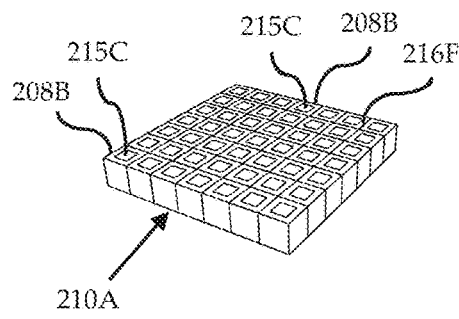

FIG. 85 shows a perspective view of dual density cut material.

Figure 86:
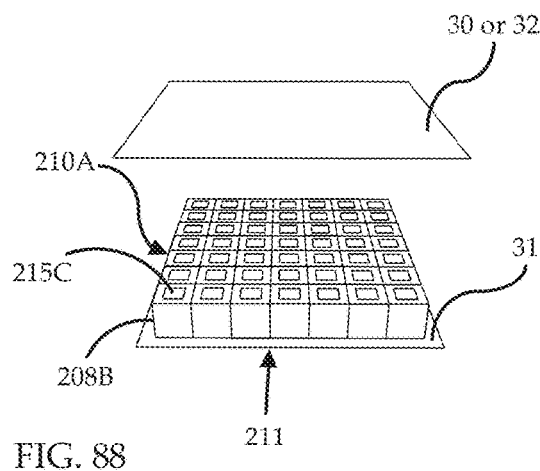

FIG. 86 shows a side perspective view of dual density cut material and substrate layer.

Figure 87:
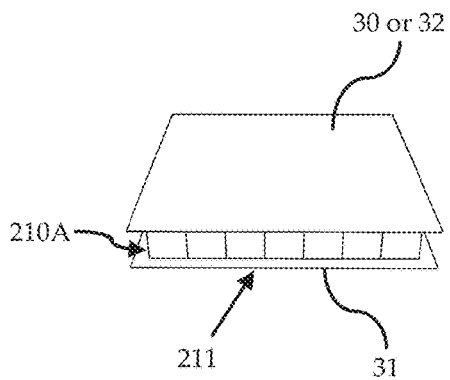

FIG. 87 shows a side perspective view of dual density cut material and substrate layer.

Figure 88:
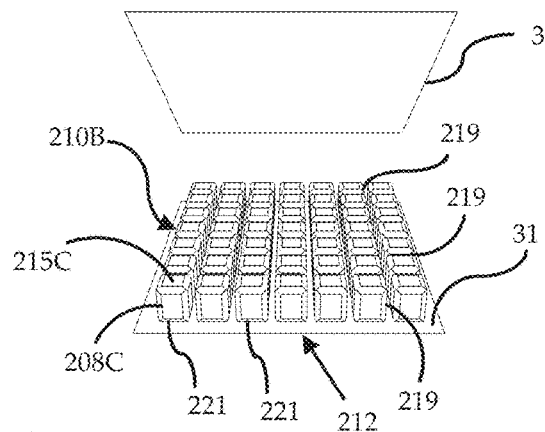

FIG. 88 shows a side perspective view of dual density cut material and substrate layer.

Figure 89:
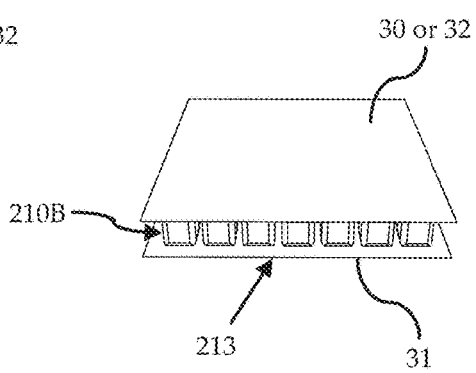

FIG. 89 shows a side perspective view of dual density cut material with shrunk resilient elements sandwiched between two substrate layers.

Figure 90:
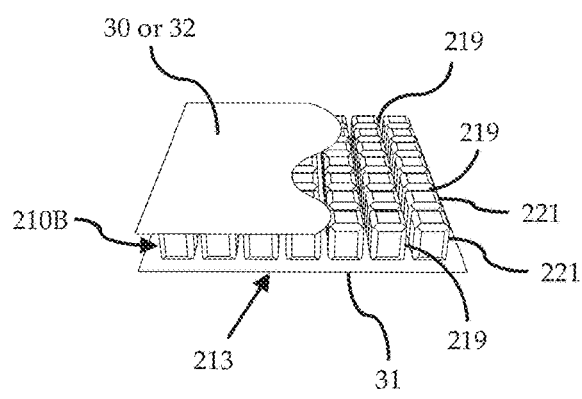

FIG. 90 shows a side perspective cutaway view of eleventh dual laminate composite.

Figure 91:
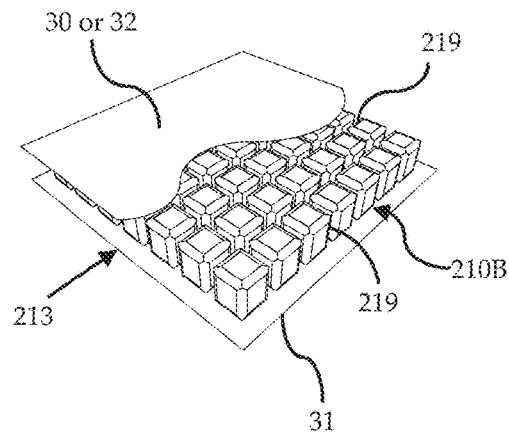

FIG. 91 shows a perspective cutaway view of eleventh dual laminate composite.

Figure 92:
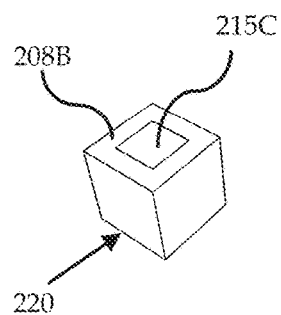

FIG. 92 shows a perspective view of dual density resilient element.

Figure 93:
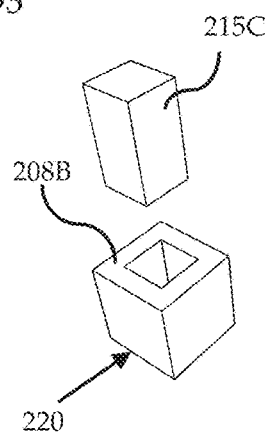

FIG. 93 shows a perspective view of jacket and core of dual density resilient element.

Figure 94:
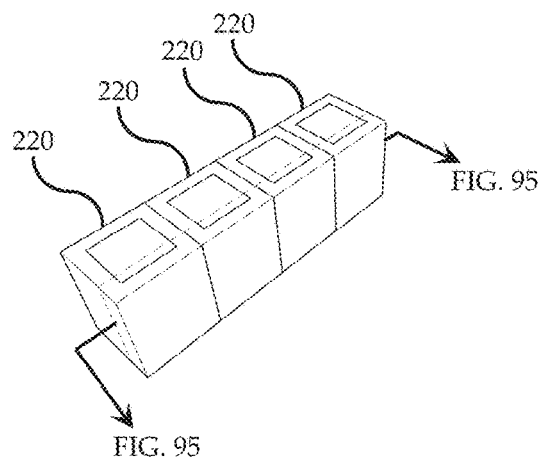

FIG. 94 shows a perspective view of dual density resilient elements.

Figure 95:
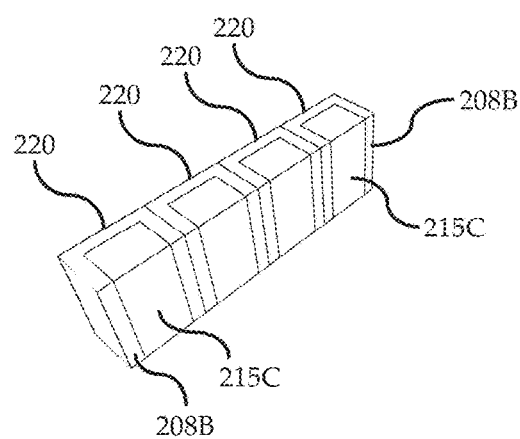

FIG. 95 shows a perspective cutaway view of dual density resilient elements.

Figure 96:
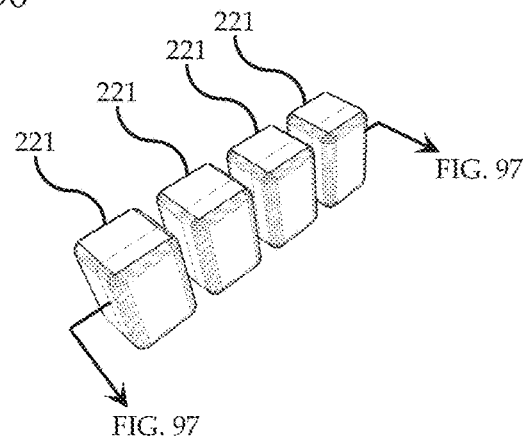

FIG. 96 shows a perspective view of dual density resilient elements after treatment.

Figure 97:
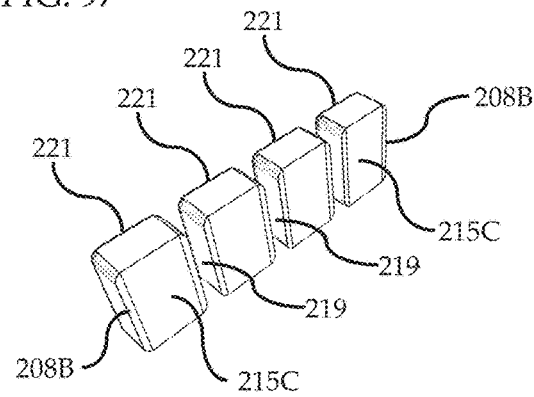

FIG. 97 shows a perspective view of dual density resilient elements after treatment.

Figure 98:
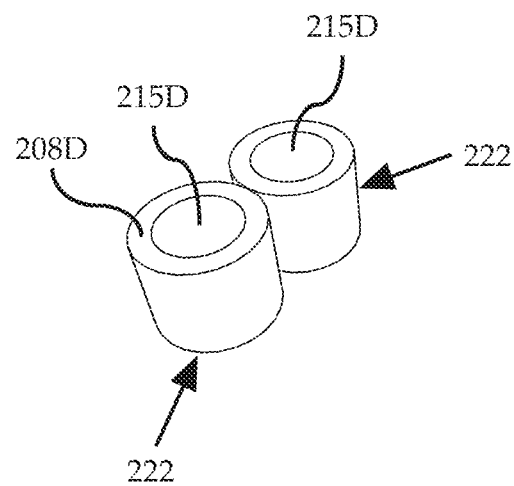

FIG. 98 shows a perspective view of cylindrically shaped dual density resilient elements.

Figure 99:
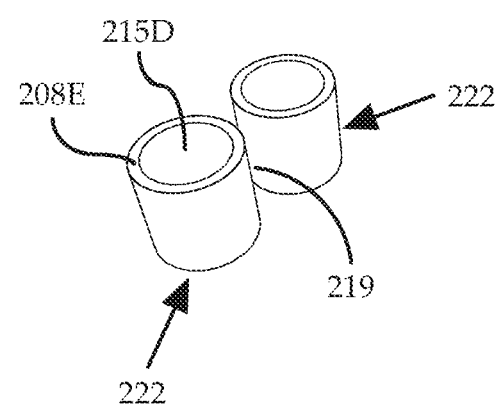

FIG. 99 shows a perspective view of cylindrically shaped dual density resilient elements.

DETAILED DESCRIPTION OF THE INVENTION

Description of the Composite Cushioning Material

1. Single Laminate Composite

Figure 51A:
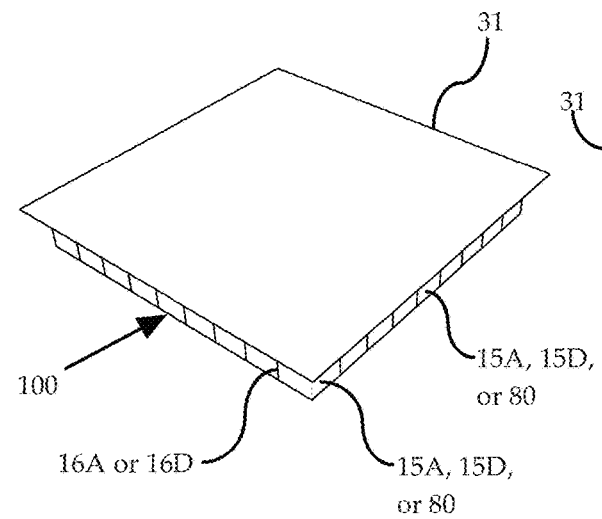

The invention relates to a composite cushioning material comprised of two or more resilient elements attached or bonded to a single substrate layer, such as in single laminate composite 100 depicted in FIG. 51A.

Figure 32A:
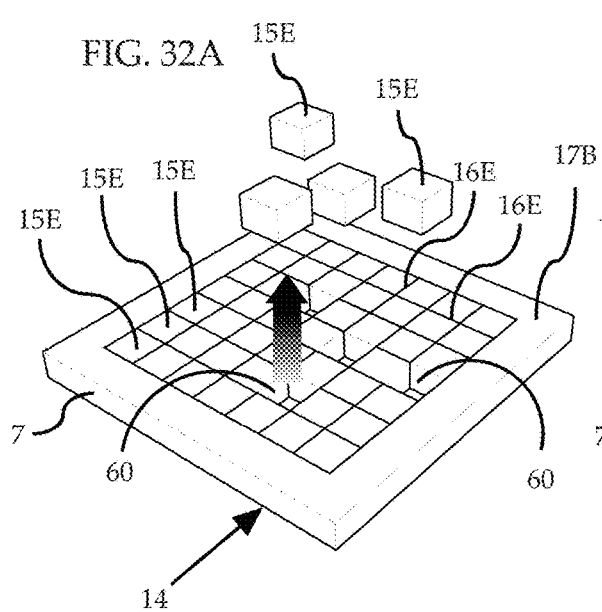
FIG. 32A shows a perspective view of seventh cut material, where at least one instance of fifth resilient element is removed.
Figure 32B:
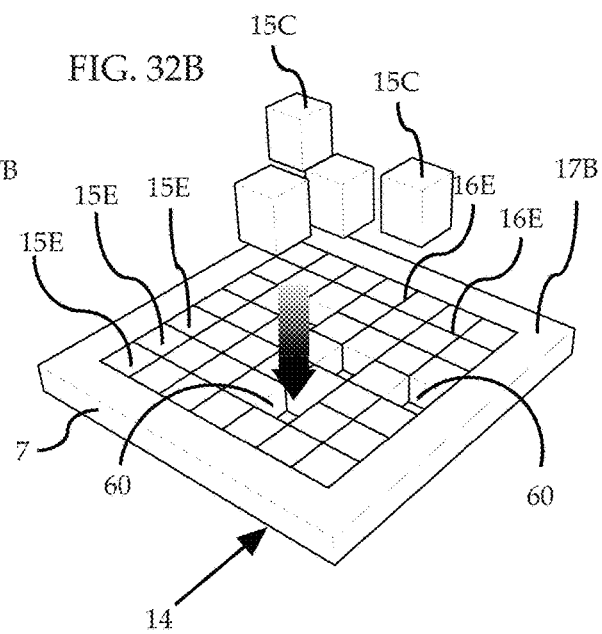
FIG. 32B shows a perspective view of third cut material, where at least one instance of third resilient element is removed.
Figure 32C:
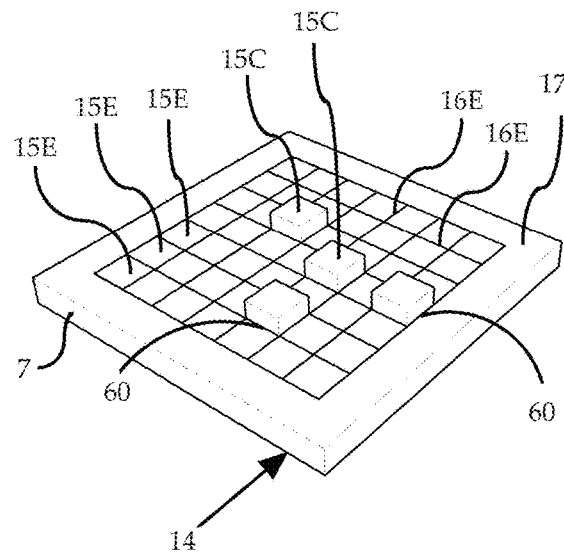
FIG. 32C shows a perspective view of seventh cut material, where at least one instance of fifth resilient element is removed and replaced with third resilient element.
Figure 32D:
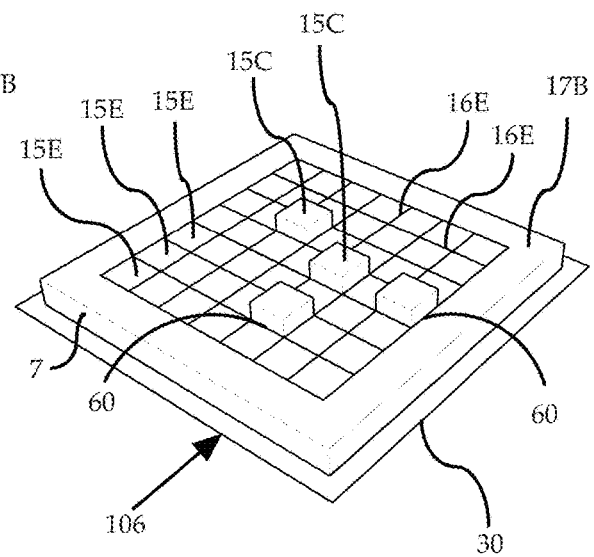
FIG. 32D shows a perspective view of seventh cut material, where at least one instance of fifth resilient element is removed and replaced with third resilient element, and first substrate layer is used to form sixth single laminate composite.
Figure 34E:
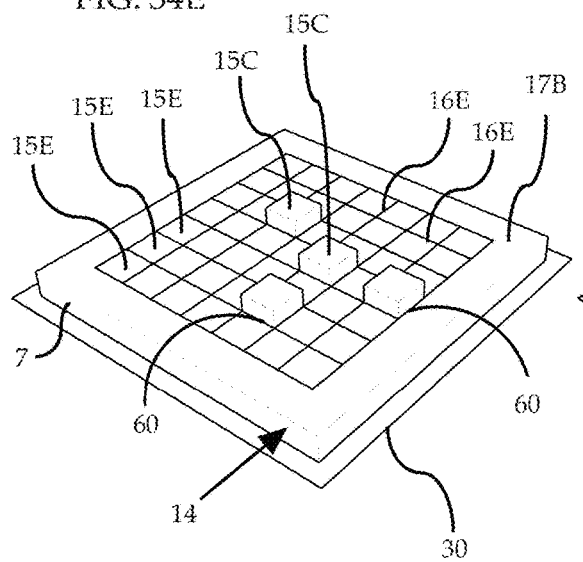
FIG. 34E shows a perspective view of seventh cut material positioned next to first substrate layer, with at least one instance of fifth resilient element removed and replaced with third resilient element.
Figure 34F:
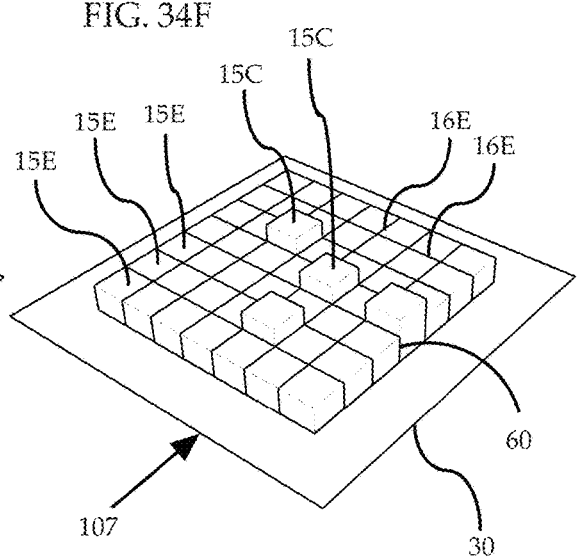
FIG. 34F shows a perspective view of seventh cut material positioned next to first substrate layer, with at least one instance of fifth resilient element removed and replaced with third resilient element, and second perimetral edge removed from the workpiece forming seventh single laminate composite.
Figure 40A:
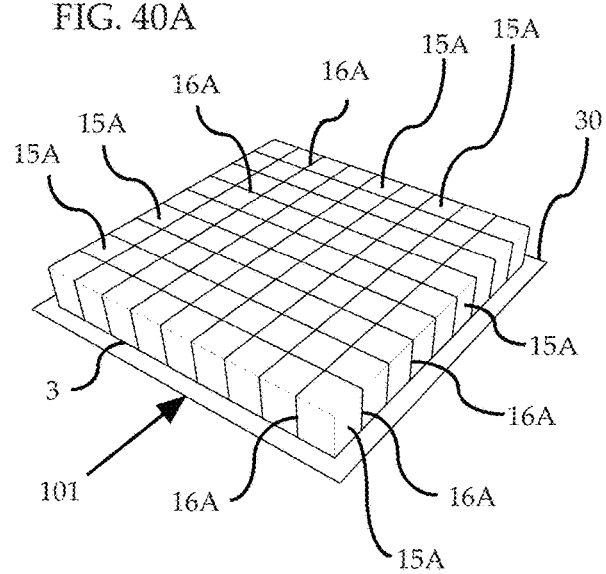
FIG. 40A shows a perspective view of first single laminate composite with a plurality of first resilient elements.
Figure 40B:
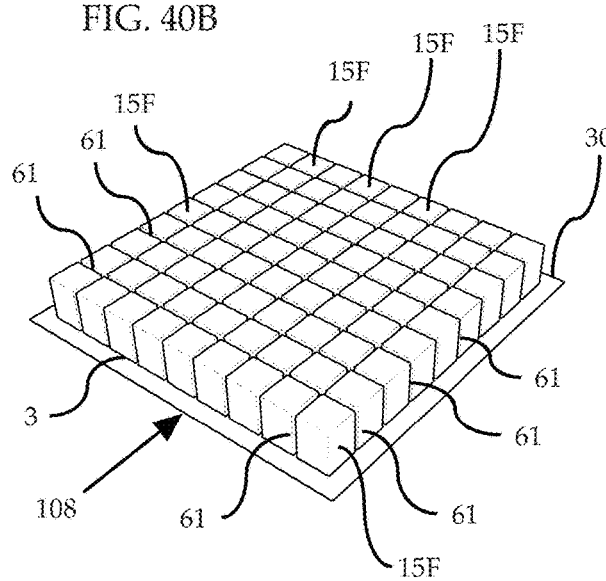
FIG. 40B shows a perspective view of eighth single laminate composite with a plurality of sixth resilient elements, where such elements are spaced apart from one another.
Figure 42A:
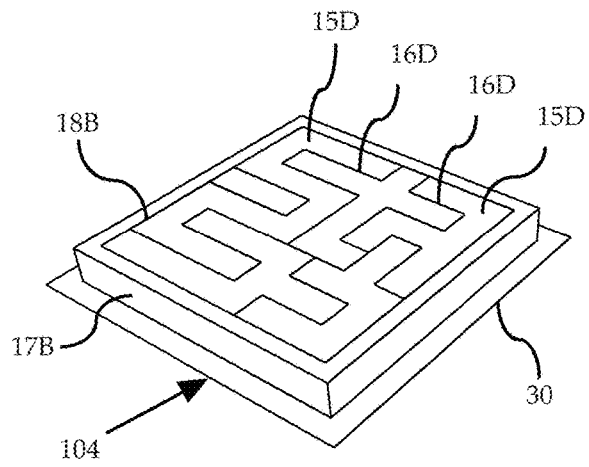
FIG. 42A shows a perspective view of fourth single laminate composite with a plurality of interrelated fourth resilient elements surrounded by second perimetral edge.
Figure 42B:
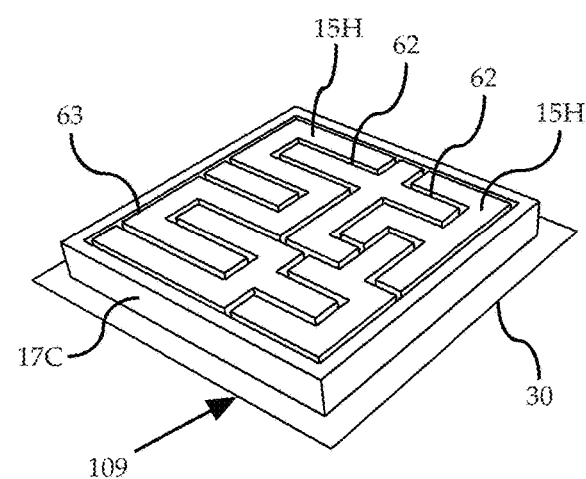
FIG. 42B shows a perspective view of ninth single laminate composite with a plurality of interrelated eighth resilient elements surrounded by third perimetral edge.
Figure 43A:
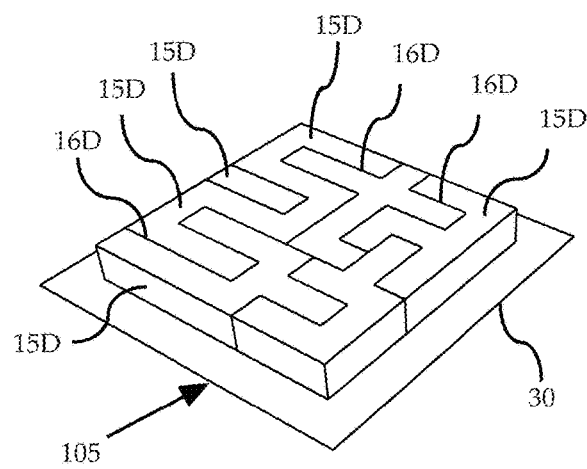
FIG. 43A shows a perspective view of fifth single laminate composite with a plurality of interrelated fourth resilient elements.
Figure 43B:
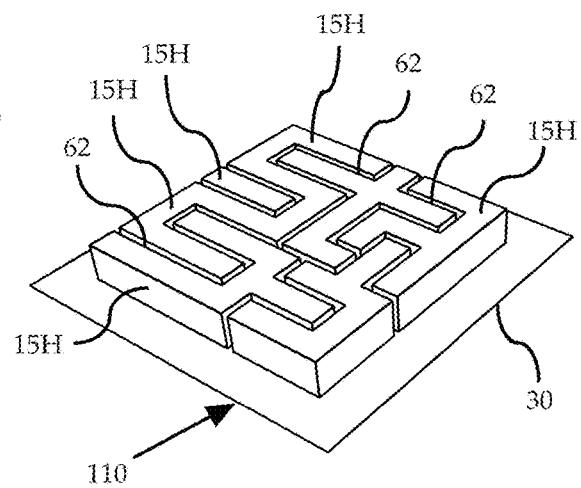
FIG. 43B shows a perspective view of tenth single laminate composite with a plurality of interrelated eighth resilient elements.

The invention also includes many different alternative and optional variations of single laminate composite 100, such as first single laminate composite 101 depicted in FIG. 10A; second single laminate composite 102 depicted in FIG. 10B; third single laminate composite 103 depicted in FIG. 10C; fourth single laminate composite 104 depicted in FIG. 42A; fifth single laminate composite 105 depicted in FIG. 43A; sixth single laminate composite 106 depicted in FIG. 32D; seventh single laminate composite 107 depicted in FIG. 34F; eighth single laminate composite 108 depicted in FIG. 40B; ninth single laminate composite 109 depicted in FIG. 42B; tenth single laminate composite 110 depicted in FIG. 43B; eleventh single laminate composite 140 depicted in FIG. 55A; and twelfth single laminate composite 160 depicted in FIG. 75.

In one embodiment of the invention, the resilient elements in single laminate composite 100 are located adjacent to each other, with no spacing between them.

In an alternative and optional embodiment of the invention, at least two of the resilient elements may be spaced apart in relation to the each other, as in eighth single laminate composite 108 depicted in FIG. 40B, in ninth single laminate composite 109 depicted in FIG. 42B, in tenth single laminate composite 110 depicted in FIG. 43B, and in eleventh single laminate composite 140 depicted in FIG. 55A.

In another embodiment of the invention, the individual resilient elements in single laminate composite 100 have the same dimension, shape, and thickness in relation to each other, and are made of the same type of material.

In an alternative and optional embodiment of the invention, at least two of the resilient elements may have different dimensions or shape in relation to each other, as in twelfth single laminate composite 160 depicted in FIG. 75. In yet another alternative and optional embodiment of the invention, at least two of the resilient elements may have different thicknesses in relation to each other, as in sixth single laminate composite 106 depicted in FIG. 32D, and seventh single laminate composite 107 depicted in FIG. 34F.

Single laminate composite 100 and variation thereof may be used as cushioning component in footwear, as protective padding, or as components in athletic or industrial protective gear.

Optionally, single laminate composite 100 may also be cut into a suitable shape for use as a shoe insole, or footwear sockliner, as in first single laminate sockliner 140A depicted in FIG. 55A, and in second single laminate sockliner 160A depicted in FIG. 77.

Single laminate composite 100 may also be optionally cut into other suitable shape for use as a cushioning component or protective padding component in athletic or industrial protective gear, as in single laminate padding 140B depicted in FIG. 55B.

2. Dual Laminate Composite

Figure 50A:
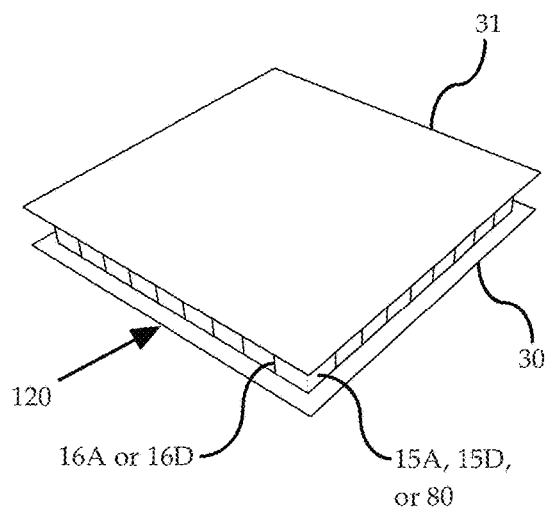

The invention also relates to a composite cushioning material comprised of two or more resilient elements attached or bonded to two substrate layers, such as dual laminate composite 120 depicted in FIG. 50A.

Figure 13A:
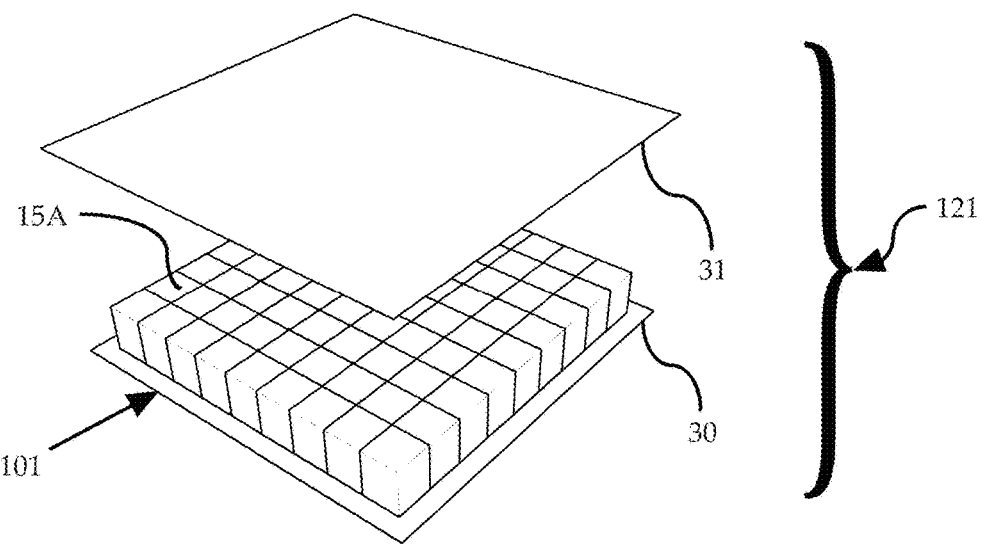
FIG. 13A shows a perspective view of a second substrate layer being positioned near a first single laminate composite opposite to the side already laminated to the first substrate layer to form a first dual laminate composite.
Figure 13B:
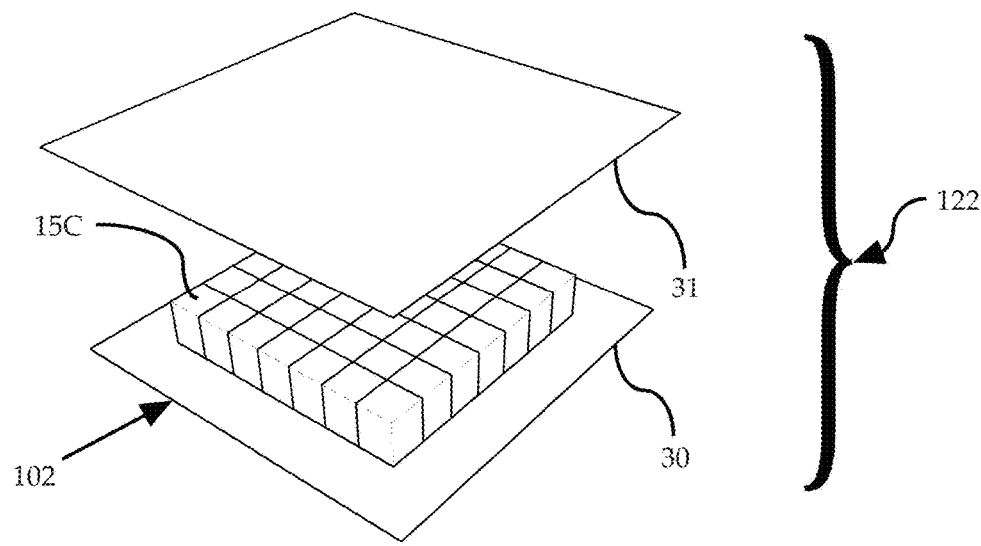
FIG. 13B shows a perspective view of a second substrate layer being positioned near a second single laminate composite opposite to the side already laminated to the first substrate layer to form a second dual laminate composite.
Figure 13C:
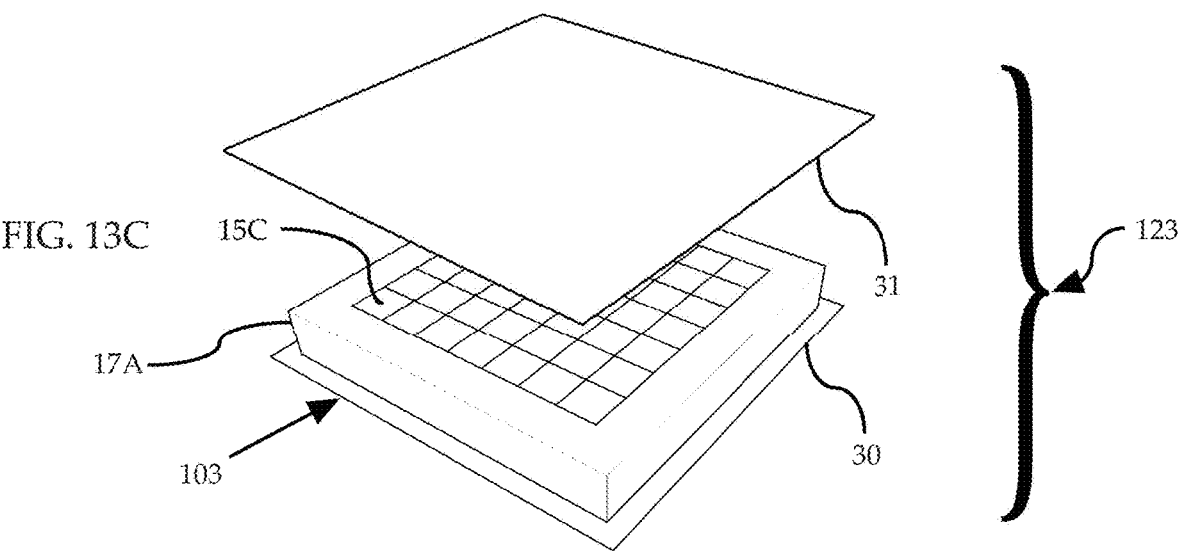
FIG. 13C shows a perspective view of a second substrate layer being positioned near a third single laminate composite opposite to the side already laminated to the first substrate layer to form a third dual laminate composite.
Figure 14:
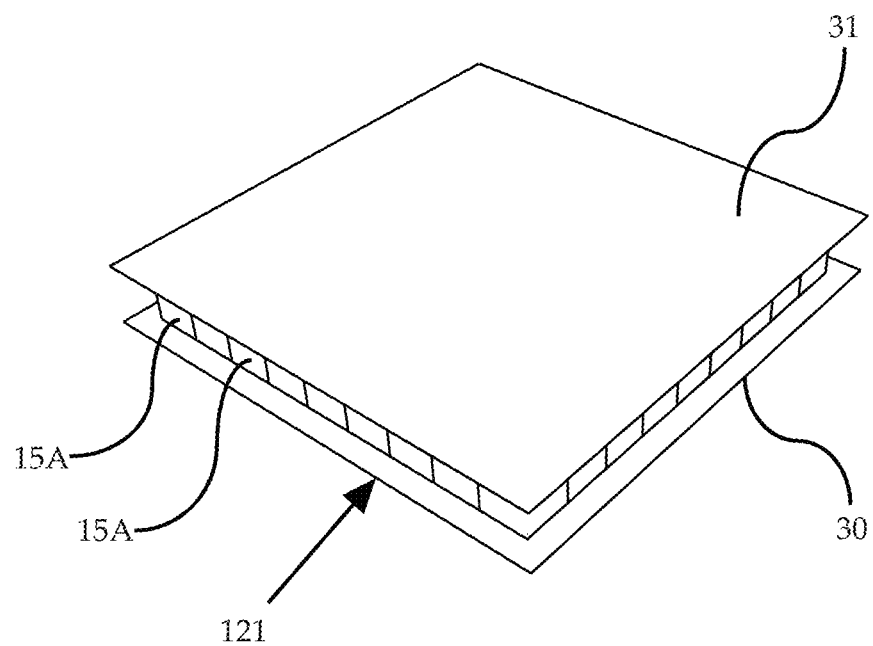
FIG. 14 shows a perspective view of the first dual laminate composite.
Figure 15A:
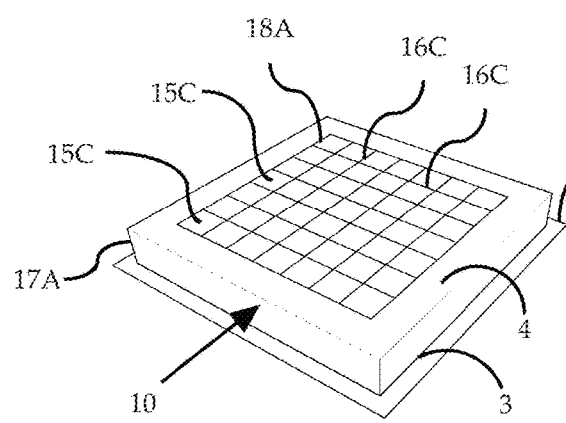
FIG. 15A shows a perspective view of third cut material, comprised of third resilient elements, surrounded by a first perimetral edge.
Figure 15B:
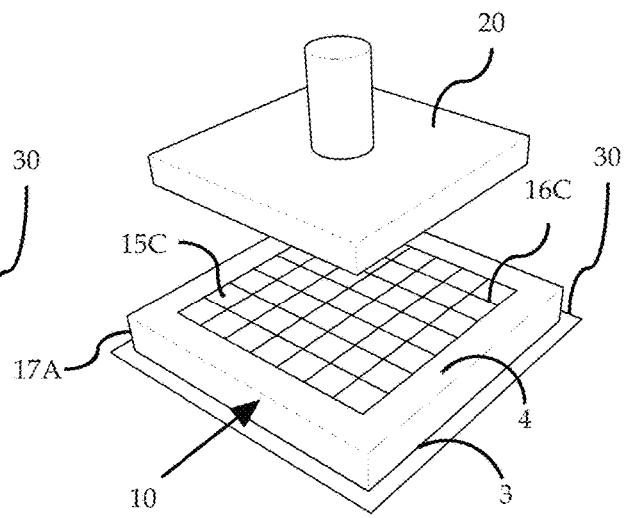
FIG. 15B shows a perspective view of a mechanical holder being brought into contact with third cut materials, comprised of third resilient elements, surrounded by a first perimetral edge.
Figure 15C:
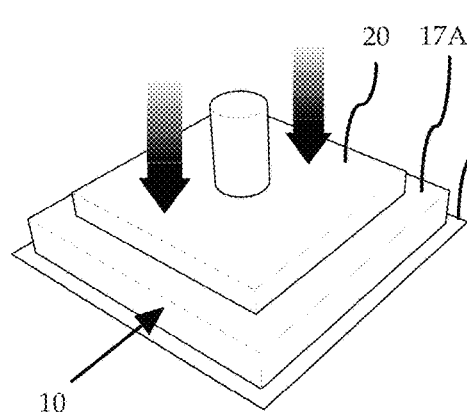
FIG. 15C shows a perspective view of the third resilient elements, surrounded by a first perimetral edge, where in the third resilient elements are in contact with a mechanical holder, but the first perimetral edge is not held by the mechanical holder.
Figure 15D:
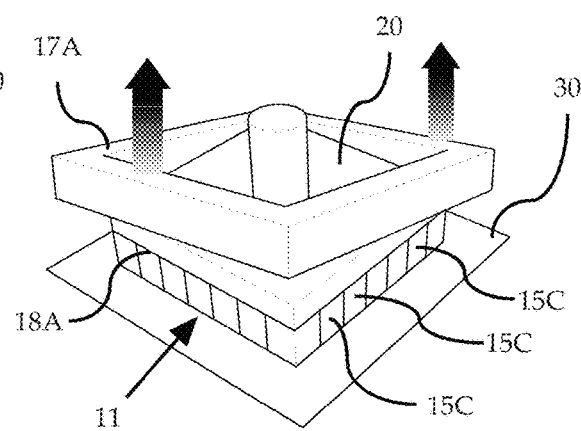
FIG. 15D shows a perspective view wherein the first perimetral edge is being removed, leaving in place the mechanical holder in contact with the third resilient elements.
Figure 15E:
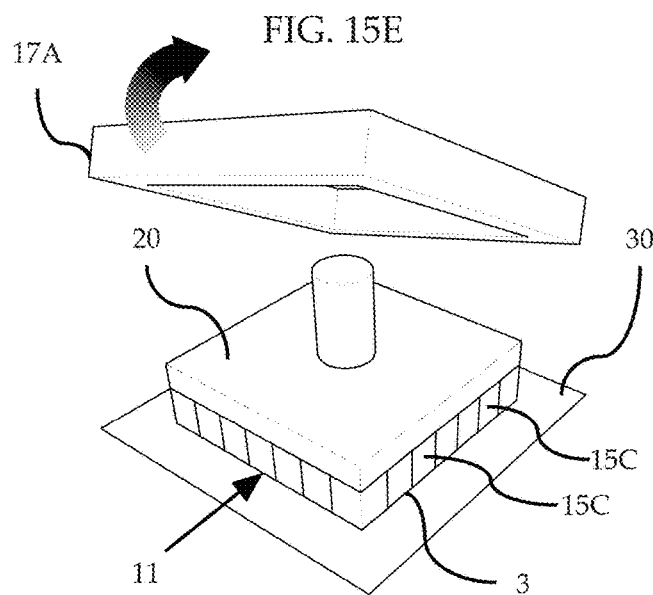
FIG. 15E shows a perspective view wherein the first perimetral edge has been removed, leaving in place the mechanical holder in contact with the third resilient elements.
Figure 15F:
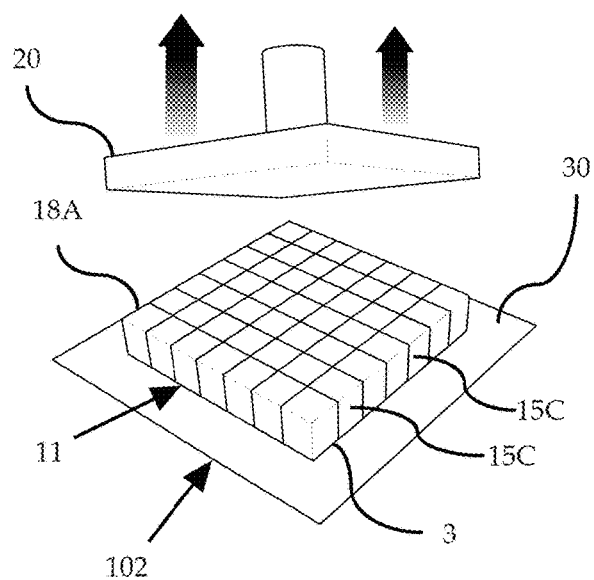
FIG. 15F shows a perspective view of the second single laminate composite, formed from a first substrate layer and fourth cut material.
Figure 15G:
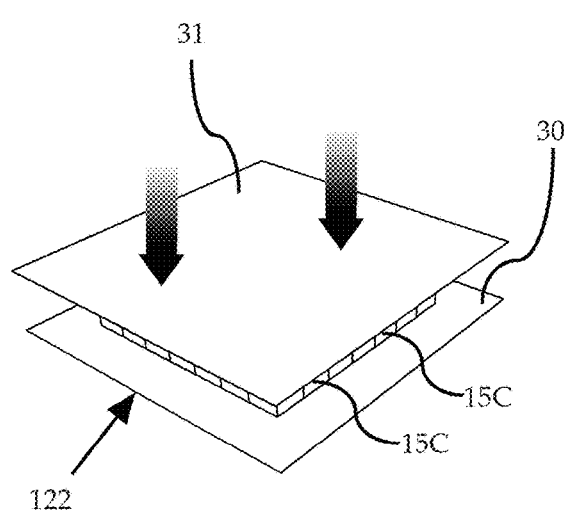
FIG. 15G shows a perspective view of the second dual laminate composite, formed from the second single laminate composite and second substrate layer.
Figure 33:
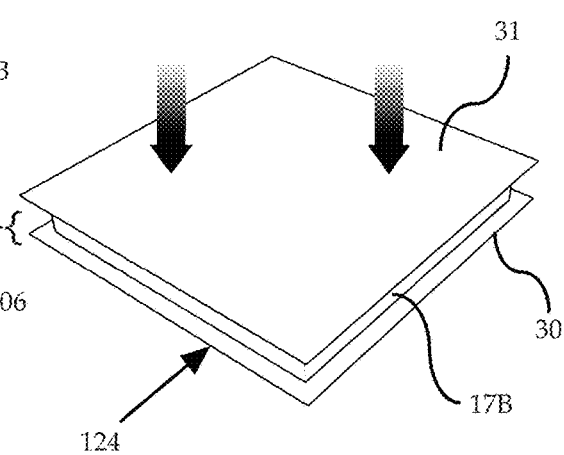
FIG. 33 shows a perspective view of second substrate layer being laminated and bonded to the exposed fifth and third resilient elements in sixth single laminate composite, to form fourth dual laminate composite.
Figure 35:
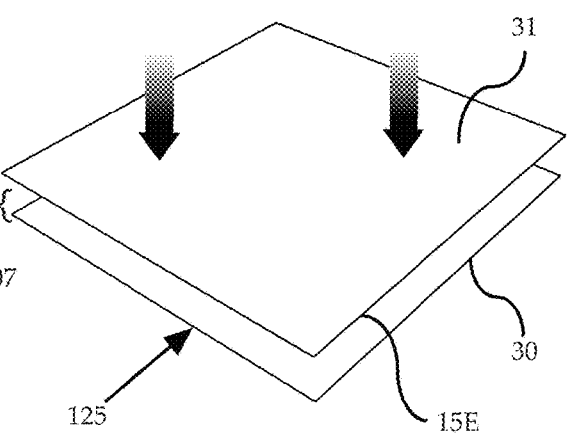
FIG. 35 shows a perspective view of second substrate layer being laminated and bonded to the exposed fifth and third resilient elements in seventh single laminate composite, to form fifth dual laminate composite.
Figure 41A:
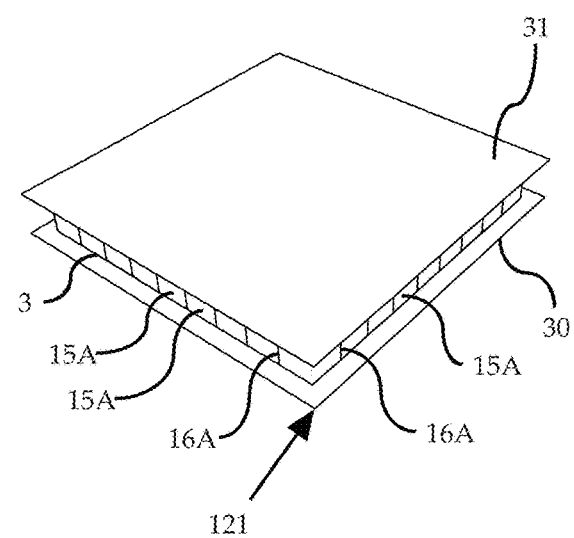
FIG. 41A shows a perspective view of first dual laminate composite with a plurality of first resilient elements.
Figure 41B:
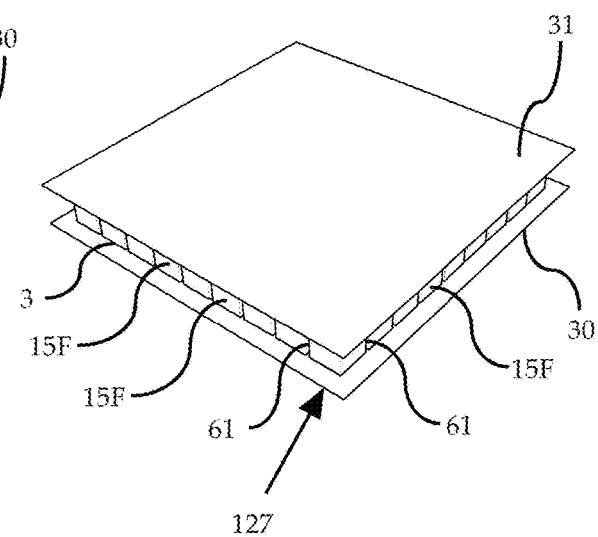
FIG. 41B shows a perspective view of seventh dual laminate composite with a plurality of sixth resilient elements, where such elements are spaced apart from one another.
Figure 41C:
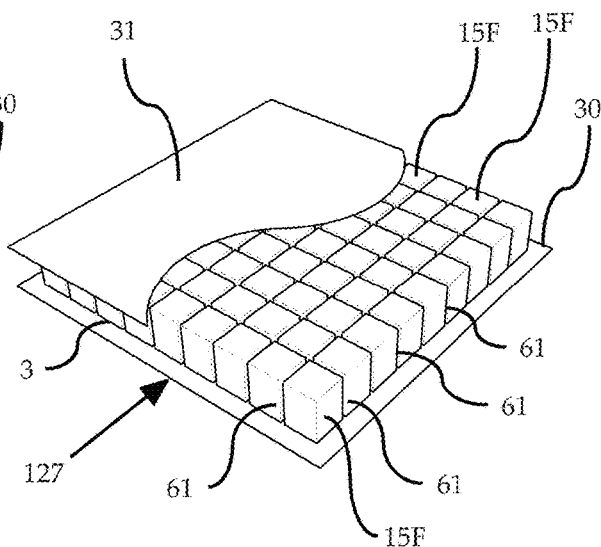
FIG. 41C shows a perspective cutaway view of seventh dual laminate composite with a plurality of sixth resilient elements, where such elements are spaced apart from one another.
Figure 41D:
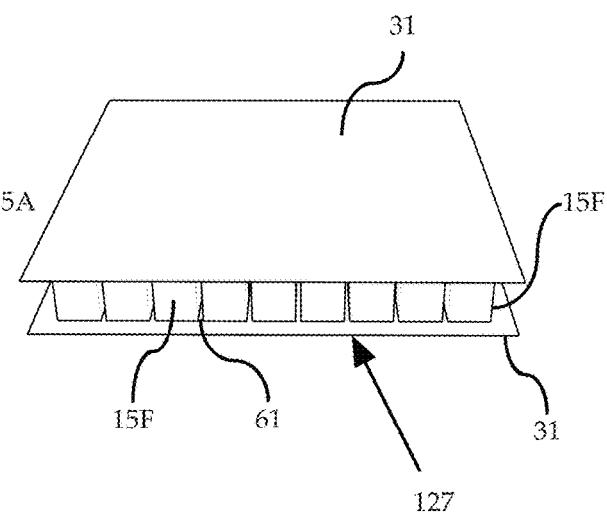
FIG. 41D shows a side perspective view of seventh dual laminate composite with a plurality of sixth resilient elements, where such elements are spaced apart from one another.
Figure 41E:
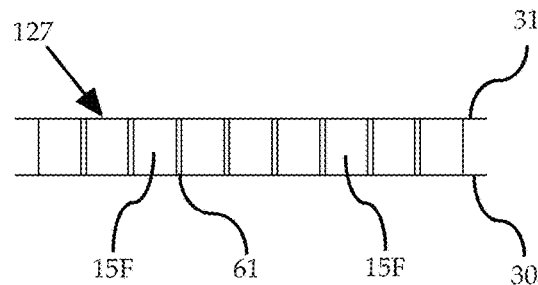
FIG. 41E shows a side view of seventh dual laminate composite with a plurality of sixth resilient elements, where such elements are spaced apart from one another.
Figure 41F:
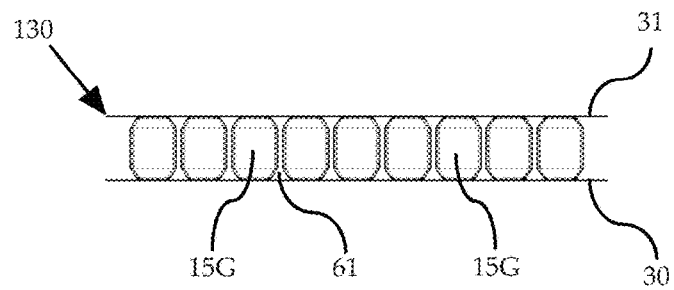
FIG. 41F shows a side view of eighth dual laminate composite with a plurality of seventh resilient elements, where such elements are spaced apart from one another.

The invention also includes many different alternative and optional variations of dual laminate composite 120, such as first dual laminate composite 121 depicted in FIG. 14; second dual laminate composite 122 depicted in FIG. 15G; third dual laminate composite 123 depicted in FIG. 13C; fourth dual laminate composite 124 depicted in FIG. 33; fifth dual laminate composite 125 depicted in FIG. 35; sixth dual laminate composite 126 depicted in FIG. 54A; seventh dual laminate composite 127 depicted in FIG. 41B; eighth dual laminate composite 130 depicted in FIG. 41F; and tenth dual laminate composite 150 depicted in FIG. 73.

In one embodiment of the invention, the resilient elements in dual laminate composite 120 are located adjacent to each other, with no spacing between them.

In an alternative and optional embodiment of the invention, at least two of the resilient elements may be spaced apart in relation to the each other, as in seventh dual laminate composite 127 depicted in FIG. 41B, and eighth dual laminate composite 130 depicted in FIG. 41F.

In another embodiment of the invention, the individual resilient elements in single laminate composite 100 have the same dimension, shape, and thickness in relation to each other, and are made of the same type of material.

In an alternative and optional embodiment of the invention, at least two of the resilient elements may have different dimensions or shape in relation to each other, as in tenth dual laminate composite 150 depicted in FIG. 73. In yet another alternative and optional embodiment of the invention, at least two of the resilient elements may have different thicknesses in relation to each other, as in fourth dual laminate composite 124 depicted in FIG. 33; in fifth dual laminate composite 125 depicted in FIG. 35; and in tenth dual laminate composite 150 depicted in FIG. 73.

Dual laminate composite 120 and variation thereof may be used as cushioning component in footwear, as protective padding, or as components in athletic or industrial protective gear.

Figure 53A:
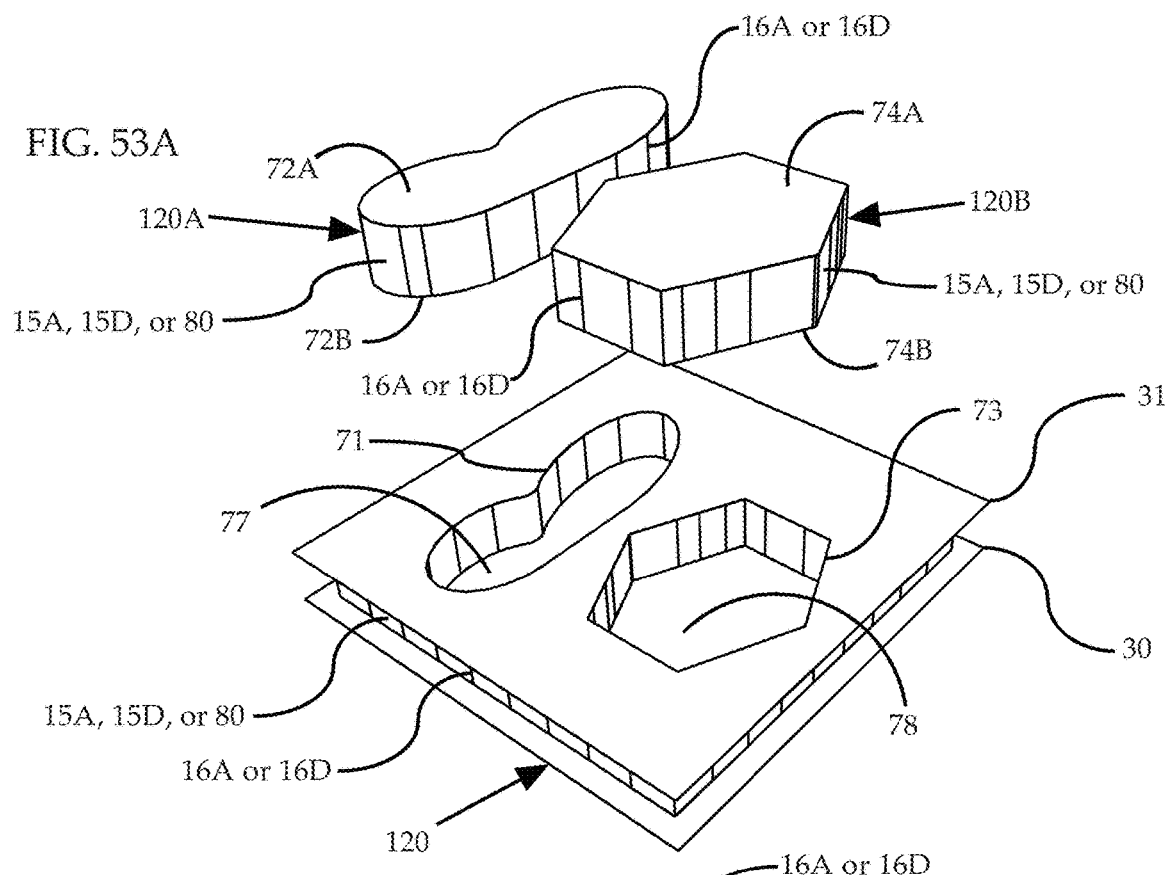

Optionally, dual laminate composite 120 may also be cut into a suitable shape for use as a shoe insole, or footwear sockliner, as in first dual laminate sockliner 120A depicted in FIG. 53A, and in second dual laminate sockliner 126A depicted in FIG. 54A.

Dual laminate composite 120 may also be optionally cut into other suitable shape for use as a cushioning component or protective padding component in athletic or industrial protective gear, as in first dual laminate padding 120B depicted in FIG. 53A, and in second dual laminate padding 126B depicted in FIG. 54A.

The various aspects of the invention, as well as its benefits, will be better appreciated once the process of making the same, described in greater detail below, is fully understood.

Composite Cushioning Material Assembly and Construction Process

1. Selection and Preparation of Resilient Materials

Figure 1A:
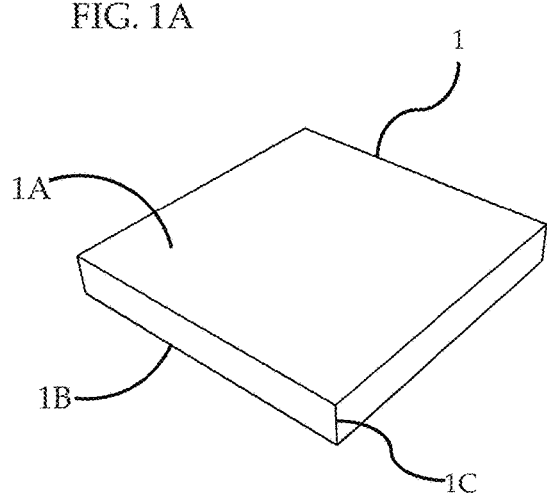
FIG. 1A shows a perspective view of the first resilient material.

FIG. 1A depicts first resilient material 1, which includes first surface 1A and second surface 1B. In one aspect of the invention, the composition of first resilient material 1 may include, without limitation, a resilient material such as foam, including, without limitations, ethylene vinyl acetate ("EVA") foam, olefin or polyolefin foam, polyurethane ("PU") foam, urethane based foam, thermoplastic foam, rubber, elastomer, or other material with suitable shock absorbing characteristics, or resistant to puncture or abrasion (including a combination of any such materials).

Figure 1B:
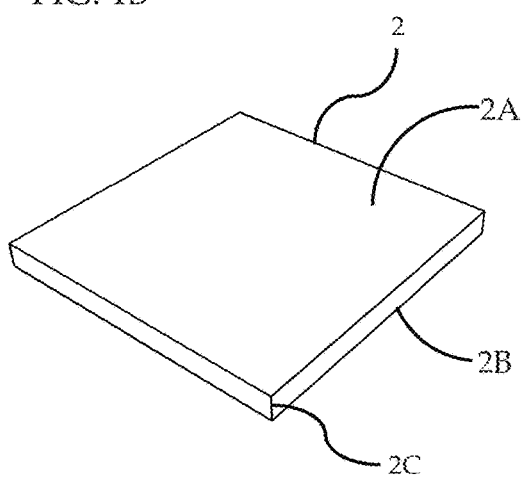
FIG. 1B shows a perspective view of the second resilient material.

FIG. 1B depicts second resilient material 2, which includes first surface 2A and second surface 2B. In another aspect of the invention, the composition of second resilient material 2 may include, without limitation, a resilient material such as foam, including, without limitations, EVA foam, olefin or polyolefin foam, PU foam, urethane based foam, thermoplastic foam, rubber, elastomer, or other material with suitable shock absorbing characteristics, or resistant to puncture or abrasion (including a combination of any such materials).

Functionally, the resilient materials may act as a cushion against impact, provide structural rigidity, or provide thermal insulation to heat or cold, depending on the type and material of which the resilient material is made.

In a more preferred embodiment of the invention, thickness 1C of first resilient material 1 is greater than thickness 2C of second resilient material 2. Also optionally, first resilient material 1 is comprised of an EVA foam sheet or block, and second resilient material 2 is optionally comprised of an EVA foam sheet or block of greater density or hardness in relation to first resilient material 1. However, it is understood that second resilient material 2 may optionally and alternatively be comprised of an EVA foam sheet or block of lower or equal density or hardness in relation to first resilient material 1.

It is also understood that the resilient materials (such as first resilient material 1 and second resilient material 2) may optionally be made of more than one type of material. By way of example only, and without limitations, the resilient material may be comprised of a sheet or flat block of EVA foam or other polymer foam, laminated on one side (or optionally on both sides) with a sheet of synthetic fabric such as polyester or nylon, or a thin sheet of silicone It is also understood that first resilient material 1 and second resilient material 2 may optionally be comprised of materials with the same or different dimensions, including thickness. By way of example only, optionally and alternatively, thickness 1C of first resilient material 1 may be the same or less than thickness 2C of second resilient material 2.

It is also understood that, optionally and alternatively, first resilient material 1 and second resilient material 2 may be comprised of the same or different types of materials. By way of example only, and without limitations, first resilient material 1 and second resilient material 2 may optionally be comprised of materials that are different in composition, have different functional characteristics or performance parameters (by way of example only, and without limitations, different density, hardness, or compressibility), or have different colors. Alternatively, the resilient materials may also be optionally comprised of the same type of material.

FIGS. 1A and 1B depict first resilient material 1 and second resilient material 2 as square in shape. However, it is understood that first resilient material 1 and second resilient material 2 may optionally be of any suitable shape and dimension, including thickness.

FIGS. 1A and 1B also depict first resilient material 1 and second resilient material 2 as solid. However, it is understood that the resilient materials need not be solid, and that each of them may optionally be perforated or include apertures (by way of example only, perforated to enhance the flexibility, permeability, or breathability of the entire assembly).

2. Placement or Application of Joining Elements

Figure 2A:
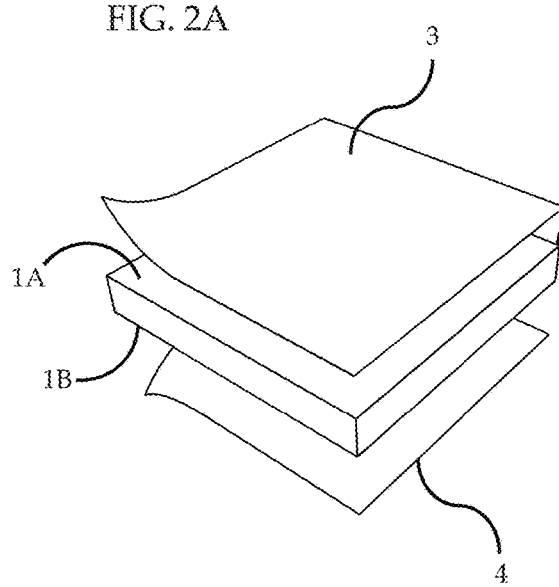
FIG. 2A shows a perspective view of the first resilient material being brought together with a first joining element and an optional second joining element.

As depicted in FIG. 2A, first joining element 3 may be placed on or applied over first side 1A of first resilient material 1. Optionally, second joining element 4 may be placed on or applied over second side 1B of first resilient material 1.

Figure 2B:
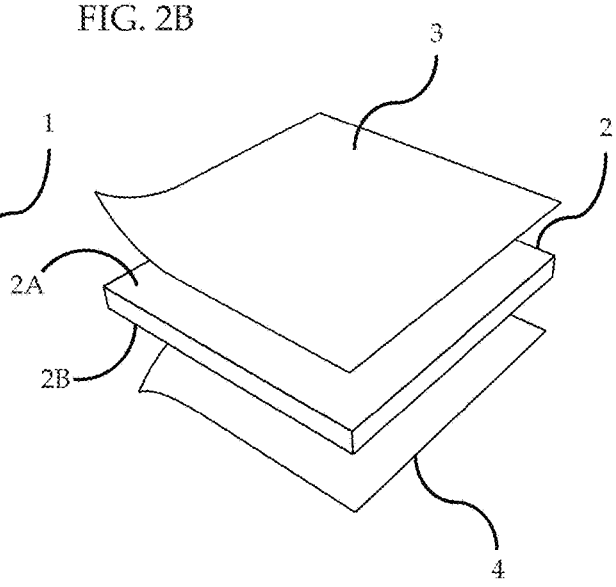
FIG. 2B shows a perspective view of the second resilient material being brought together with a first joining element and an optional second joining element.

As depicted in FIG. 2B, first joining element 3 may be placed on or applied over first side 2A of second resilient material 2. Optionally, second joining element 4 may be placed on or applied over second side 2B of second resilient material 2.

In a more preferred embodiment of the invention, first joining element 3 and second joining element 4 are optionally comprised of EVA based hot-melt adhesive ("HMA") film.

However, it is understood that first joining element 3 may be, optionally, any compound, adhesive, substance, attachment, or device (such as Velcro or interlocking mechanical means) that permits first resilient material 1 to bond or adhere to first laminate 30.

It is also understood that second joining element 4 may be, optionally, any compound, adhesive, substance, attachment, or device (such as Velcro or interlocking mechanical means) that permits second resilient material 2 to bond or adhere to second laminate 31.

It is understood that the joining elements may optionally include any glue, bonding agent, adhesive film, or tape suitable for making the resilient materials bond or adhere to the laminate sheeting structures. In one embodiment of the invention, first joining element 3 and second joining element 4 may optionally be comprised of hot-melt adhesive film that is activated through pressure, heat, or both.

Depending on the type of material and the composition of the resilient materials and the substrates, the joining elements may optionally include EVA, olefin or polyolefin-based adhesive, glue, or HMA film, or polyurethane or urethane based adhesive, glue, or HMA film. The joining elements may also include, optionally and alternatively, polyamine based adhesive, glue, or HMA film.

Figure 3A:
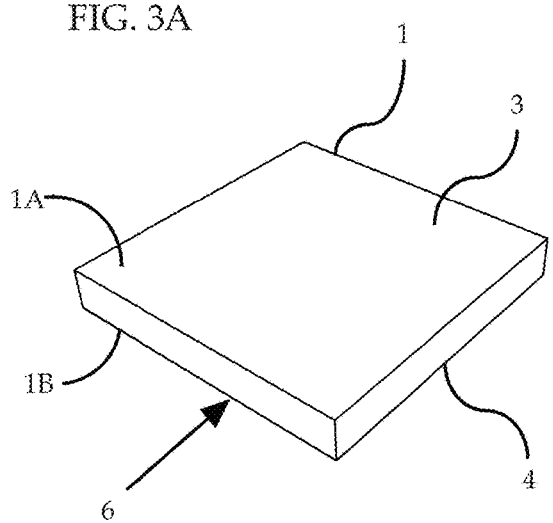
FIG. 3A shows a perspective view of the first resilient material coated with a first joining element and an optional second joining element.

FIG. 3A depicts first resilient material 1 "coated" on first surface 1A with first joining element 3. FIG. 3A also depicts first resilient material 1 optionally "coated" on second surface 1B with second joining element 4. The result is first coated material 6.

Figure 3B:
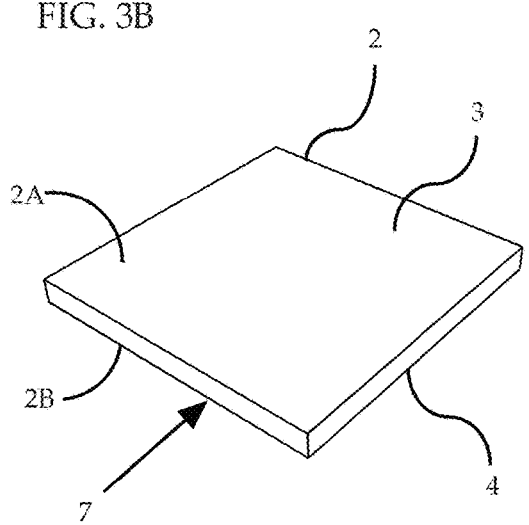
FIG. 3B shows a perspective view of the second resilient material coated with a first joining element and an optional second joining element.

FIG. 3B depicts second resilient material 2 "coated" on first surface 2A with first joining element 3. FIG. 3B also depicts second resilient material 2 optionally "coated" on second surface 2B with second joining element 4. The result is second coated material 7.

3. Cutting of Coated Materials

Figure 4A:
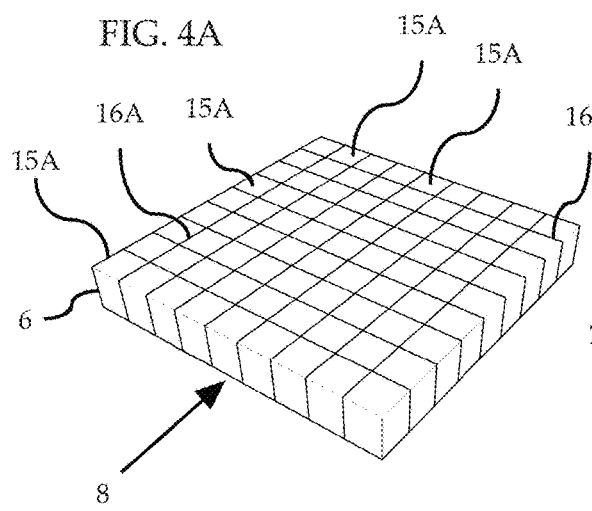
FIG. 4A shows a perspective view of the first coated material cut along first material cutting lines to form first resilient elements.

As depicted in FIG. 4A, first coated material 6 is cut along first material cutting lines 16A, defining and creating a plurality of first resilient elements 15A. The result is first cut material 8.

Figure 4B:
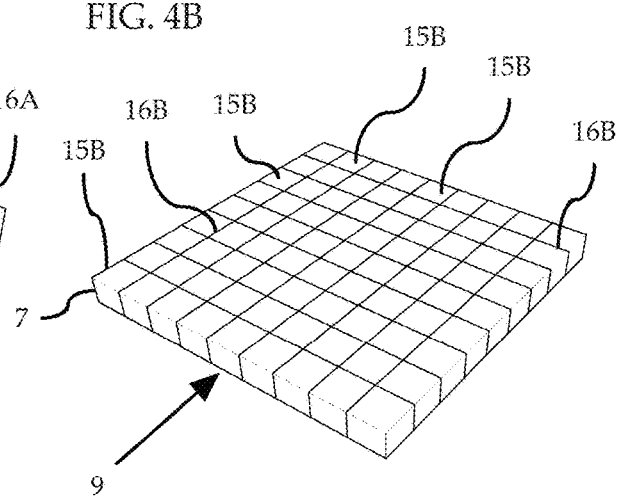
FIG. 4B shows a perspective view of the second coated material cut along second material cutting lines to form second resilient elements.

As depicted in FIG. 4B, second coated material 7 is cut along second material cutting lines 16B, defining and creating a plurality of second resilient elements 15B. The result is second cut material 9.

FIGS. 4A and 4B depict first material cutting lines 16A and second material cutting lines 16B as regular and square in shape, defining and forming first resilient elements 15A and second resilient elements 15B that are cubic in shape. However, it is understood that the material cutting lines may optionally be of any suitable shape and dimension, including irregular or asymmetrical shapes, to form resilient elements that may optionally be of any suitable shape and dimension.

In one embodiment of the invention, first resilient elements 15A in first cut material 8, and second resilient elements 15B in second cut material 9, may optionally be held in position in relation to the other resilient elements in the array through inertia or friction with other resilient elements. Alternatively and optionally, first resilient elements 15A and second resilient elements 15B may be immobilized or held in proper alignment through vacuum devices or means located in or on the work surface, which "sucks" the individual resilient elements against the work surface. By way of example only, and without limitations, the surface of the work surface might optionally resemble the perforated surface of tabletop "air hockey" tables, wherein air is sucked out through the holes on the work surface by means of a vacuum pump or similar device, creating a vacuum when resilient elements (such as first resilient elements 15A or second resilient elements 15B) are placed on its surface. It is understood that fourth resilient elements 15D in sixth cut material 13, depicted in FIG. 4F below, may be immobilized or held in proper alignment through the same type of vacuum devices or means.

Figure 4C:
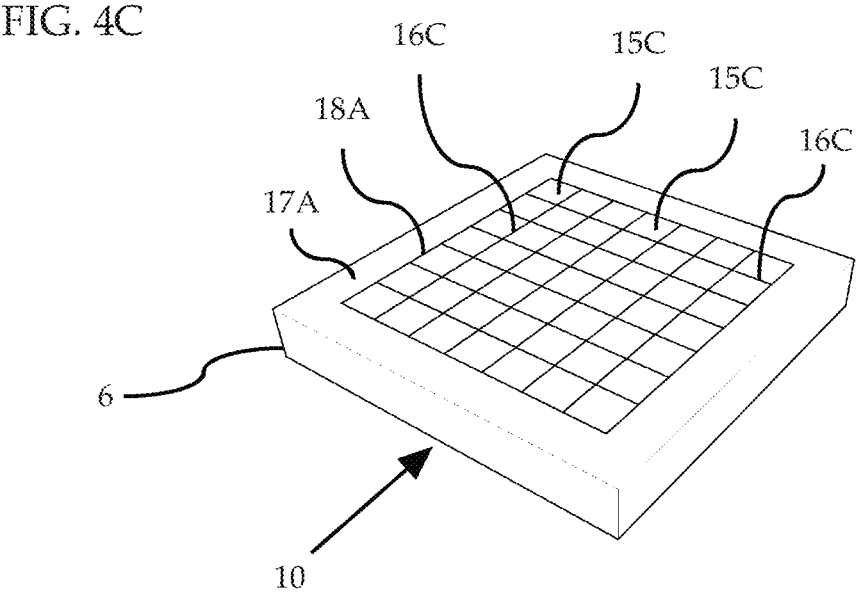
FIG. 4C shows a perspective view of the first coated material cut along third material cutting lines and a perimetral edge cut line to form third resilient elements, surrounded by a first perimetral edge.

FIG. 4C depicts an alternative embodiment of the invention, wherein first coated material 6 is cut along first perimetral edge cut line 18A, and along third material cutting lines 16C, to define and create a plurality of third resilient elements 15C, surrounded by first perimetral edge 17A. The result is third cut material 10, comprised of a plurality of third resilient elements 15C, surrounded by first perimetral edge 17A.

In one optional aspect of the invention, first perimetral edge 17A may aid in holding third resilient elements 15C in third cut material 10 in place or in relation to each other, through friction with the perimetral edge material and other resilient elements.

Figure 4D:
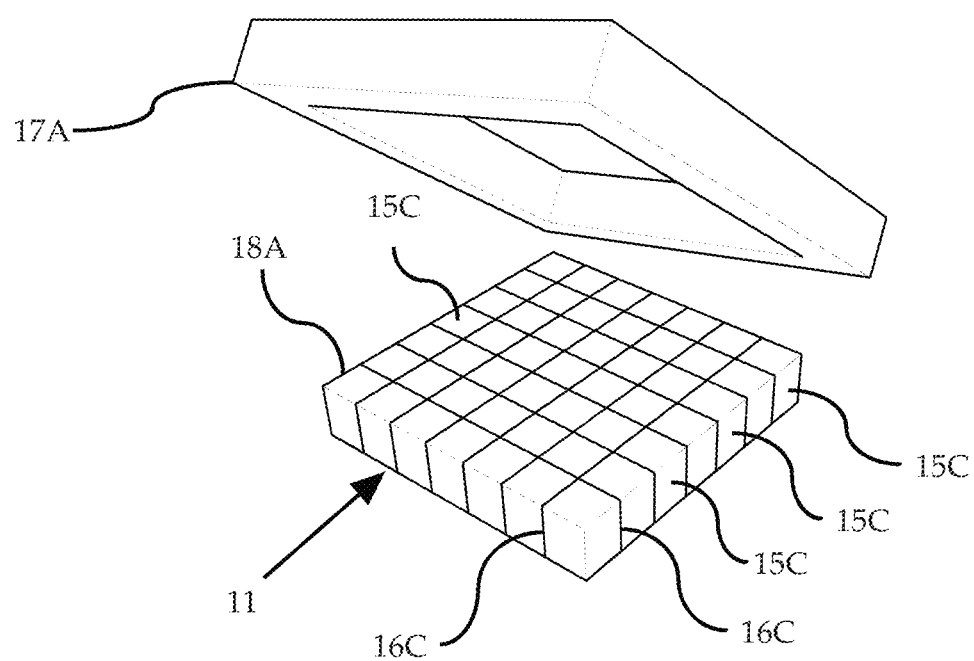
FIG. 4D shows a perspective view of the first coated material wherein the first perimetral edge is removed leaving the third resilient elements.

FIG. 4D depicts an alternative, optional embodiment of the invention, wherein first perimetral edge 17A is optionally separated and removed from third cut material 10, to form fourth cut material 11, comprised of a plurality of third resilient elements 15C. The outer perimeter of the array of third resilient elements 15C is defined by the shape of first perimetral edge cut line 18A.

Figure 4E:
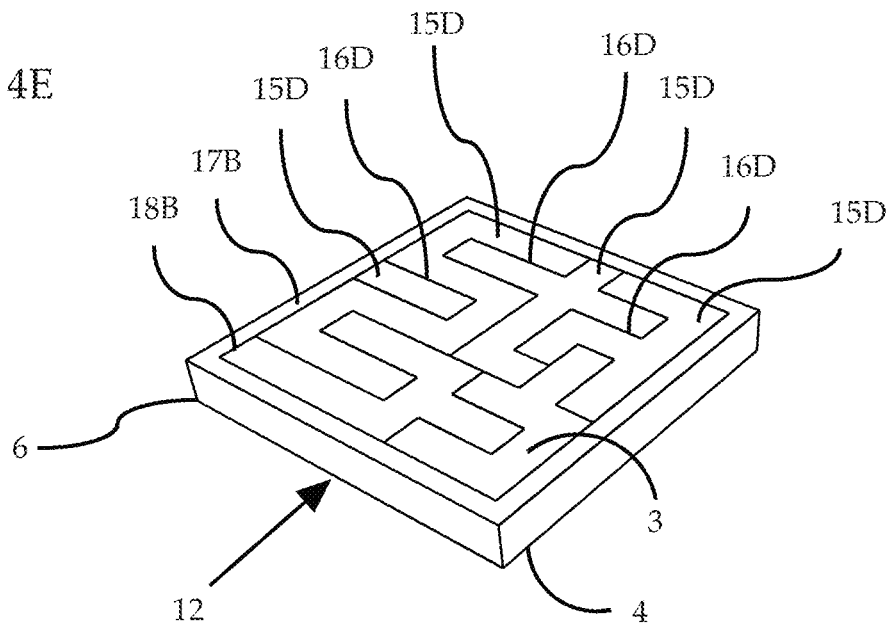
FIG. 4E shows a perspective view of the first coated material cut along fourth material cutting lines and a second perimetral edge cut line to form interrelated fourth resilient elements, surrounded by a second perimetral edge.

FIG. 4E illustrates an alternative embodiment of the invention, wherein first coated material 6 is cut along second perimetral edge cut line 18B, and along fourth material cutting lines 16D, to define and create a plurality of interrelated fourth resilient elements 15D, surrounded by second perimetral edge 17B. In this alternative embodiment, fourth resilient elements 15D may optionally have irregular or asymmetrical shapes. The result is fifth cut material 12.

In one optional aspect of the invention, second perimetral edge 17B may aid in holding fourth resilient elements 15D in fifth cut material 12 in place or in relation to each other, through friction with the perimetral edge material and other resilient elements.

It is understood that the shapes of fourth resilient elements 15D are defined by the shapes of fourth material cutting lines 16D. In this embodiment of the invention, the shapes and dimensions of fourth material cutting lines 16D are optionally selected so that upon cutting first coated material 6 along fourth material cutting lines 16D, at least one instance of resulting fourth resilient element 15D engages or "interlocks" with at least one other instance of fourth resilient element 15D.

In one aspect of the invention, the optional "interlocking" shapes of the resilient elements in fifth cut material 12 (depicted in FIG. 4E) and sixth cut material 13 (depicted in FIG. 4F) may aid in holding the resilient elements in those cut materials in place or in relation to each other, through friction with the other resilient elements. In another aspect, the discrete resilient elements resist movement relative to one another by interlocking or by having cohesion due to the material from which they are made. Cohesion through stickiness is also contemplated in the present invention. Such "sticky" material may include a resilient material or elastomer, such as, by way of example only and without limitations, EVA foam, olefin or polyolefin foam, PU foam, urethane based foam, thermoplastic foam, rubber, elastomer, other open or closed cell polymer foam, or other resilient material (including a combination of any such materials) with coefficient of friction sufficient to hold the resilient elements in place in relation to the other elements in the various cut materials.

In one alternative and optional embodiment of the invention, at least one instance of fourth resilient element 15D has one or more cut sides that is substantially or partially convex in shape, and at least one instance of fourth resilient element 15D has one or more cut sides that is substantially or partially concave in shape, and the convex-shaped side of the first instance of fourth resilient element 15D fits or engages the concave-shaped side of the second instance of fourth resilient element 15D, and is held there by friction.

Figure 44A:
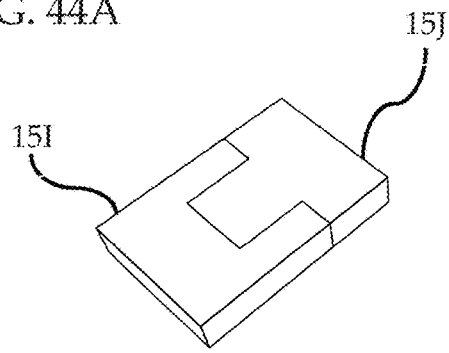
FIG. 44A shows a perspective view of interlocked concave and convex resilient elements.
Figure 44B:
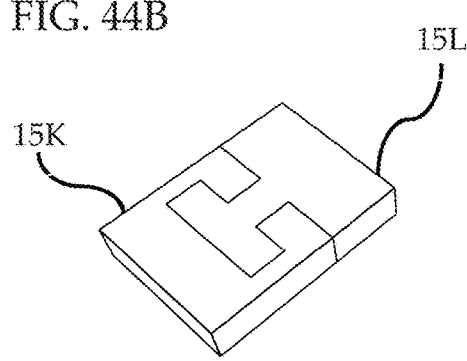
FIG. 44B shows a perspective view of interlocked concave and convex resilient elements.
Figure 44C:
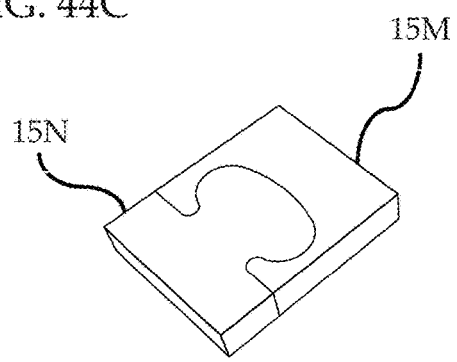
FIG. 44C shows a perspective view of interlocked concave and convex resilient elements.

By way of example only, and without limitations, other alternative and optional embodiments of fourth resilient element 15D are depicted in FIGS. 44A through 44E. As illustrated in the same as non-limiting examples, interrelated concave resilient element 15I may engage or "interlock" with convex resilient element 15J (FIG. 44A); concave resilient element 15K may engage or "interlock" with convex resilient element 15L (FIG. 44B); and concave resilient element 15M may engage or "interlock" with convex resilient element 15N (FIG. 44C).

Figure 44D:
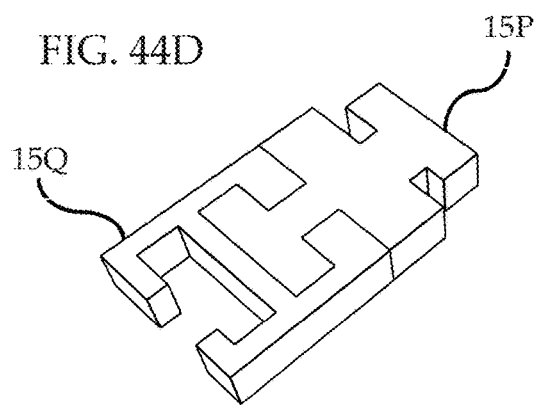
FIG. 44D shows a perspective view of interlocked dual concave and dual convex resilient elements.
Figure 44E:
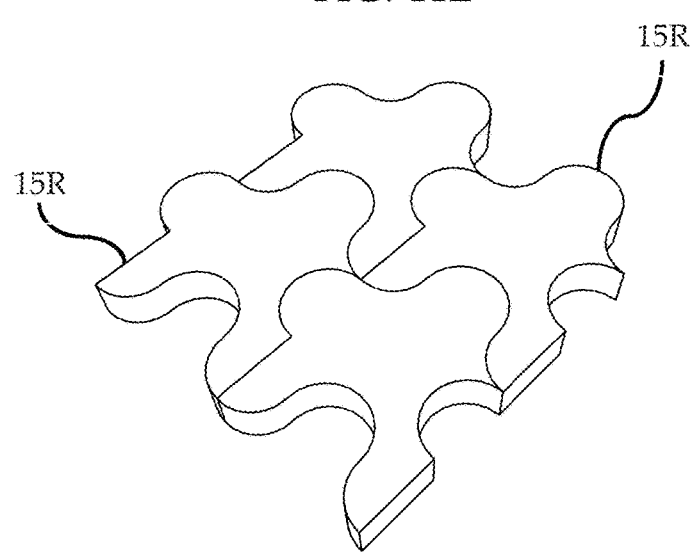
FIG. 44E shows a perspective view of interlocked concave-convex resilient elements.

It is understood that individual resilient element may optionally be shaped so that it engages or "interlocks" with more than one resilient element. As illustrated in FIGS. 44D and 44E as non-limiting examples, dual concave resilient element 15Q may engage or "interlock" with more than instance of dual convex resilient element 15P (FIG. 44D); and concave-convex resilient element 15R may engage or "interlock" with multiple instances of other concave-convex resilient elements 15R (FIG. 44E).

In FIG. 4E, for purposes of illustration only, fourth resilient elements 15D of fifth cut material 12 are optionally shown with shapes defined by right angles. However, it is understood that fourth resilient elements 15D may have different shapes, including, without limitations, shapes defined by curves, provided that the selected shape permits at least one instance of fourth resilient elements 15D to engage or "interlock" with at least one other instance of fourth resilient element 15D, like in a "jigsaw" puzzle. Non-limiting examples of this alternative and optional embodiment are illustrated in FIG. 44C as concave resilient element 15M and convex resilient element 15N, and in FIG. 44E as concave-convex resilient elements 15R.

It is understood that, alternatively and optionally, individual instances of fourth resilient element 15D may have a regular, symmetrical, or uniform shape, but that when the plurality of fourth resilient elements 15D are laid out within fifth cut material 12 and are viewed as a whole, they may form a complex, non-symmetrical, or non-repeating pattern. It is also understood that, alternatively and optionally, individual instances of fourth resilient element 15D may have an irregular, asymmetrical, or non-uniform shape, but that when the plurality of fourth resilient elements 15D are laid out within fifth cut material 12 and are viewed as a whole, they may form a symmetrical or repeating pattern.

It is understood that the "interlocking" fourth resilient elements 15D may optionally remain engaged to one another by means of friction, and a plurality of "interlocking" fourth resilient elements 15D may aid in holding the entire assembly together, in one piece, while fifth cut material 12 or the assembled array of fourth resilient elements 15D undergo further assembly or processing.

Figure 4F:
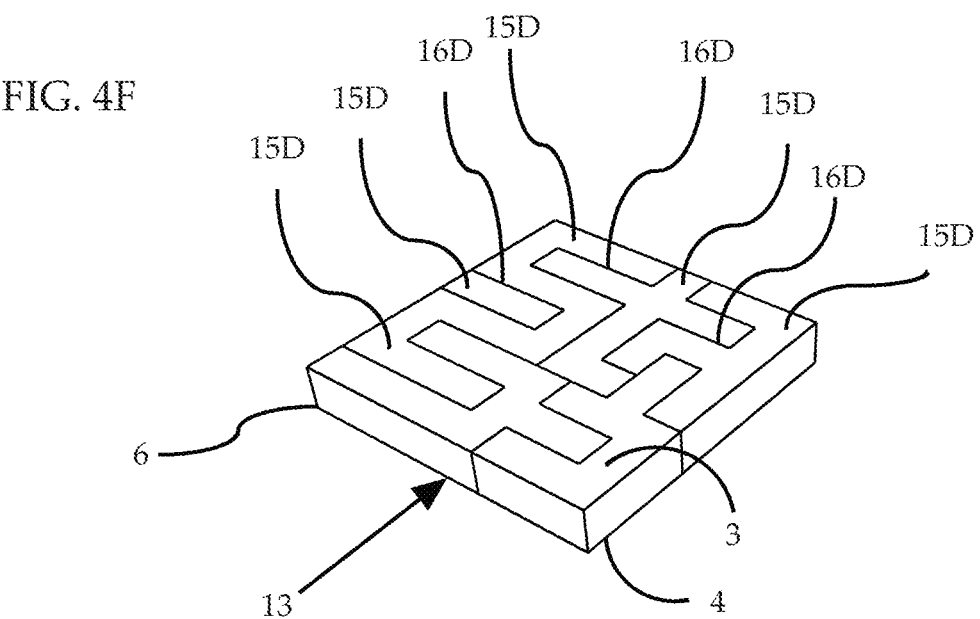
FIG. 4F shows a perspective view of the first coated material cut along fourth material cutting lines to form interrelated fourth resilient elements.

FIG. 4F depicts yet another alternative, optional embodiment of the invention, wherein first coated material 6 is cut along fourth material cutting lines 16D, to define and create a plurality of interrelated fourth resilient elements 15D. In this alternative embodiment, fourth resilient elements 15D may optionally have irregular or asymmetrical shapes. The result is sixth cut material 13.

Sixth cut material 13 may optionally and alternatively be fabricated by cutting the first coated material 6 along fourth material cutting lines 16D, or by removing and discarding second perimetral edge 17B from fifth cut material 12 and retaining the plurality of fourth resilient elements 15D.

It is understood that the shapes of fourth resilient elements 15D in sixth cut material 13 are defined by the shapes of fourth material cutting lines 16D. In this alternative embodiment of the invention, the shapes and dimensions of fourth material cutting lines 16D are optionally selected so that upon cutting first coated material 6 along fourth material cutting lines 16D, at least one instance of resulting fourth resilient element 15D engages or "interlocks" with at least one other instance of fourth resilient element 15D.

It is understood that in this alternative embodiment of the invention, at least two interrelated fourth resilient elements 15D engage or "interlock" with each other, and remain substantially engaged to one another by means of friction, and a plurality of "interlocking" fourth resilient elements 15D may aid in holding the entire assembly together, in one piece, while sixth cut material 13 or the assembled array of fourth resilient elements 15D undergo further assembly or processing.

In one alternative and optional embodiment of the invention, at least one instance of fourth resilient element 15D has one or more cut sides that is substantially or partially convex in shape, and at least one instance of fourth resilient element 15D has one or more cut sides that is substantially or partially concave in shape, and the convex-shaped side of the first instance of fourth resilient element 15D fits or engages the concave-shaped side of the second instance of fourth resilient element 15D, and is held there by friction.

By way of example only, and without limitations, other alternative and optional embodiments of fourth resilient element 15D included in sixth cut material 13 are depicted in FIGS. 44A through 44E. As illustrated in the same as non-limiting examples, concave resilient element 15I may engage or "interlock" with convex resilient element 15J (FIG. 44A); concave resilient element 15K may engage or "interlock" with convex resilient element 15L (FIG. 44B); and concave resilient element 15M may engage or "interlock" with convex resilient element 15N (FIG. 44C).

It is understood that individual resilient element of sixth cut material 13 may optionally be shaped so that it engages or "interlocks" with more than one resilient element. As illustrated in FIGS. 44D and 44E as non-limiting examples, dual concave resilient element 15Q may engage or "interlock" with more than one instance of dual convex resilient element 15P (FIG. 44D); and concave-convex resilient element 15R may engage or "interlock" with multiple instances of other concave-convex resilient elements 15R (FIG. 44E).

In FIG. 4F, for purposes of illustration only, fourth resilient elements 15D of sixth cut material 13 are optionally shown with shapes defined by right angles. However, it is understood that fourth resilient elements 15D may have different shapes, including, without limitations, shapes defined by curves, provided that the selected shape permits at least one instance of fourth resilient elements 15D to engage or "interlock" with at least one other instance of fourth resilient element 15D, like in a "jigsaw" puzzle. Non-limiting examples of this alternative and optional embodiment are illustrated in FIG. 44C as concave resilient element 15M and convex resilient element 15N, and in FIG. 44E as concave-convex resilient elements 15R.

It is understood that, alternatively and optionally, individual instances of fourth resilient element 15D in sixth cut material 13 may have a regular, symmetrical, or uniform shape, but that when the plurality of fourth resilient elements 15D are laid out within sixth cut material 13 and are viewed as a whole, they may form a complex, non-symmetrical, or non-repeating pattern. It is also understood that, alternatively and optionally, individual instances of fourth resilient element 15D may have an irregular, asymmetrical, or non-uniform shape, but that when the plurality of fourth resilient elements 15D are laid out within sixth cut material 13 and are viewed as a whole, they may form a symmetrical or repeating pattern.

4. Optional Removal of Perimetral Edge Material

FIGS. 5A through 5E depict the removal of the perimetral edge material from a cut material, with the aid of a mechanical device or means, which is optional.

Figure 5A:
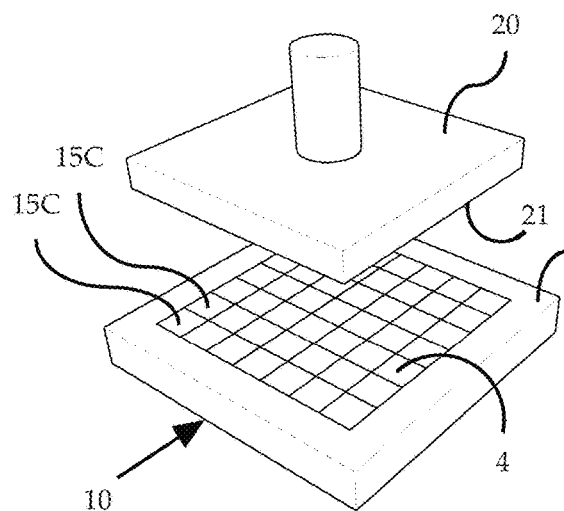
FIG. 5A shows a perspective view of the third resilient elements, surrounded by a first perimetral edge, which are brought into contact with a mechanical holder.
Figure 5B:
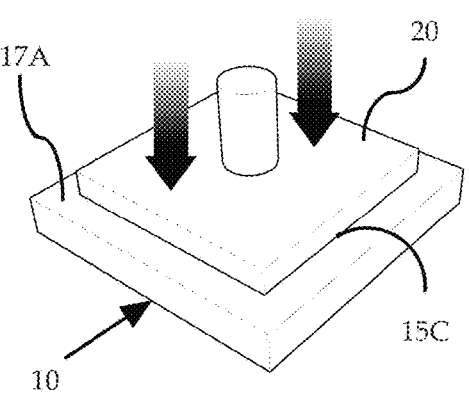
FIG. 5B shows a perspective view of the third resilient elements, surrounded by a first perimetral edge, where in the third resilient elements are in contact with a mechanical holder, but the first perimetral edge is not held by the mechanical holder.

FIGS. 5A and 5B depicts third cut material 10, comprised of a plurality of third resilient elements 15C, surrounded by first perimetral edge 17A. A mechanical holder 20 with a perimeter shape 21 substantially similar to the perimeter shape of the array of third resilient elements 15C is positioned adjacent to the array of third resilient elements 15C, makes contact with the resilient elements, and holds them in place. As depicted in FIG. 5B, mechanical holder 20 does not hold first perimetral edge 17A in place.

Figure 5C:
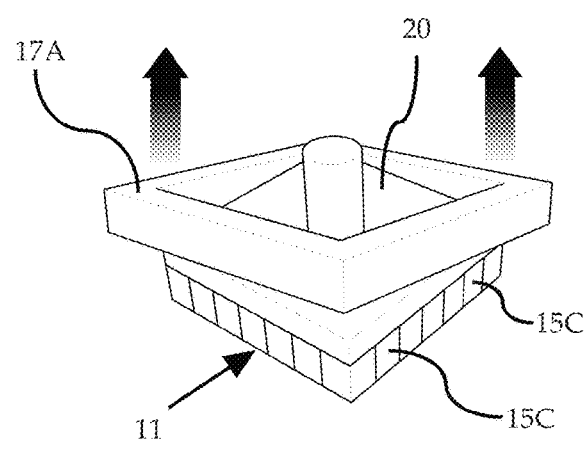
FIG. 5C shows a perspective view of the third resilient elements, in contact with a mechanical holder, wherein the first perimetral edge is being removed.

FIG. 5C depicts the mechanical extraction of first perimetral edge 17A, aided by mechanical holder 20 that holds the array of third resilient elements 15C in place.

Figure 5D:
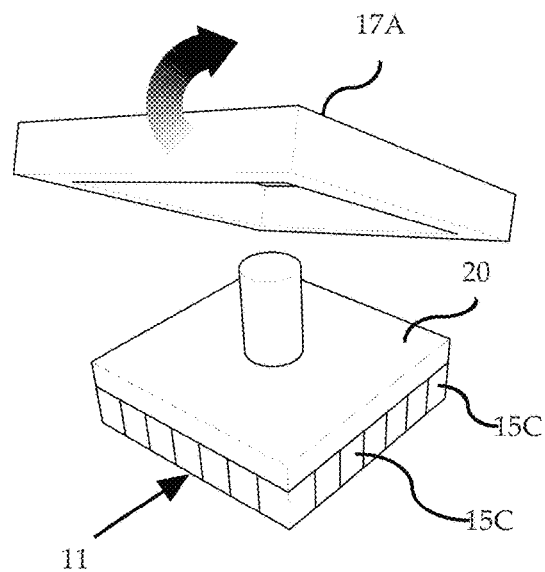
FIG. 5D shows a perspective view of the third resilient elements, in contact with a mechanical holder, wherein the first perimetral edge has been removed.
Figure 5E:
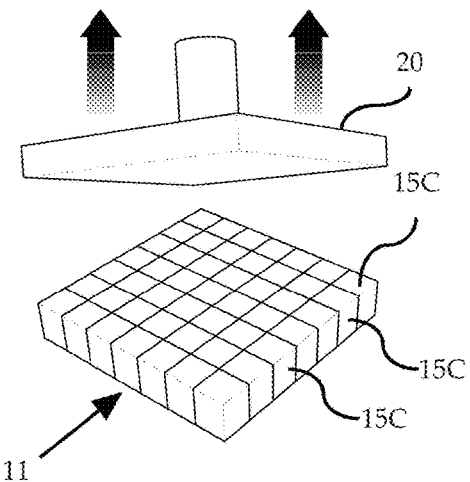
FIG. 5E shows a perspective view of the third resilient elements, wherein the mechanical holder is being removed.

FIG. 5D depicts the removal of first perimetral edge 17A, leaving behind a plurality of third resilient elements 15C held in place by mechanical holder 20. FIG. 5E depicts the release and removal of mechanical holder 20, forming fourth cut material 11.

It is understood that in one alternative embodiment of the invention, mechanical holder 20 may be optionally shaped so that it makes contact with only some, and not all, of third resilient elements 15C, enabling some of third resilient elements 15C not held in place by mechanical holder 20 to be removed (by themselves or along with first perimetral edge 17A) prior to the bonding of the plurality of remaining third resilient elements 15C to first substrate layer 30 or second substrate layer 31, as described below.

It is also understood that, alternatively and optionally, first perimetral edge 17A may also be extracted and removed manually from third cut material 10.

The same mechanically-aided extraction process using mechanical holder 20 may optionally be employed to extract and remove second perimetral edge 17B from fifth cut material 12, leaving behind a plurality of fourth resilient elements 15D and forming sixth cut material 13. Alternatively, and optionally, second perimetral edge 17B may also be extracted and removed manually from fifth cut material 12.

5. Lamination of First Substrate Layer

FIGS. 6A through 10C depict lamination of first substrate layer 30 onto cut materials (such as first cut material 8, second cut material 9, third cut material 10, fourth cut material 11, fifth cut material 12, and sixth cut material 13), to form a variety of single laminate composite materials.

Figure 6A:
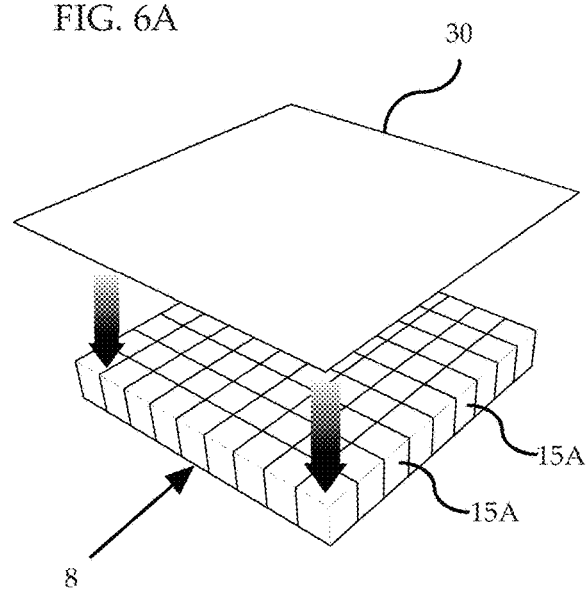
FIG. 6A shows a perspective view of a first substrate layer being positioned over a first cut material, such as first cut material.

As depicted in FIG. 6A, first substrate layer 30 may be positioned over a cut material, such as first cut material 8.

In a more preferred embodiment of the invention, first substrate layer 30 is optionally comprised of a sheet or layer of synthetic, non-woven fabric such as polyester or nylon. However, it is understood that, optionally, first substrate layer 30 may be comprised of a sheet or layer of any suitable material, including, without limitation, natural or synthetic fabric, mesh, flexible or pliable plastic, neoprene, natural leather, synthetic leather, or a sheet of synthetic fiber, or a combination of such materials. Furthermore, first substrate layer 30 may also be optionally made of foam, plastic, latex, silicone, rubber, other rubber-like materials, elastomer, and so forth, including any combination of such materials. First substrate layer 30 may also be comprised of any such materials encased in, or sandwiched by, sheets of natural or synthetic fabric.

It is also understood that suitable composition for first substrate layer 30 may optionally be selected from a wide variety and range of materials, provided that the resulting substrate layer may be made to bond to the resilient elements. The selection of material, or combination of materials, for first substrate layer 30 may impart the finished product with different functional characteristics or performance parameters (such as, by way of example only and without limitations, distinct overall stretchability, breathability, permeability to gases or liquids, absorbency of vapors and liquids, resistance to tear and puncture, protection from corrosion, and the like).

Figure 6B:
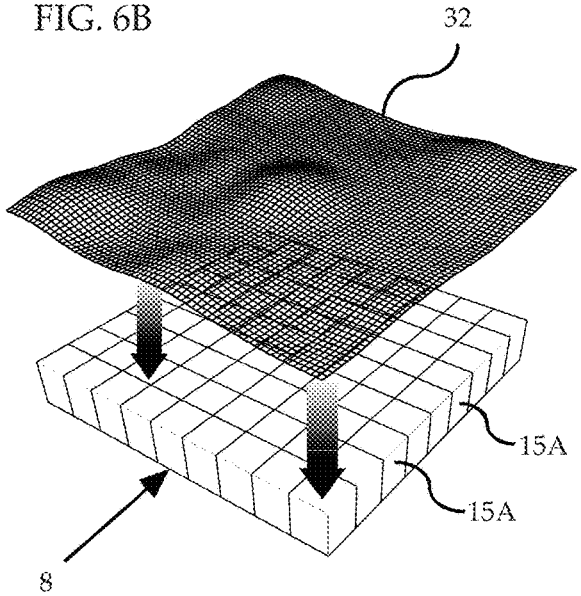
FIG. 6B shows a perspective view of an optional alternative substrate layer, being positioned over a first cut material.
Figure 6C:
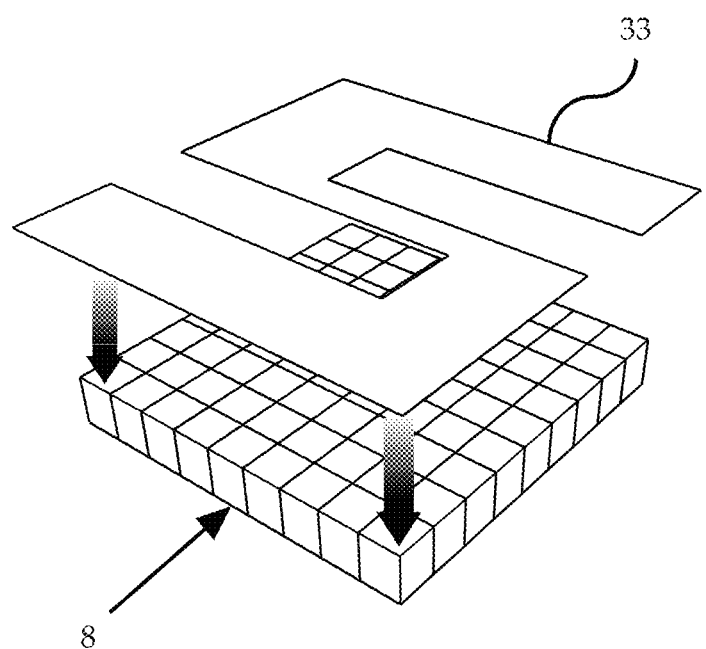
FIG. 6C shows a perspective view of a variant of first substrate layer being positioned over a first cut material.
Figure 6D:
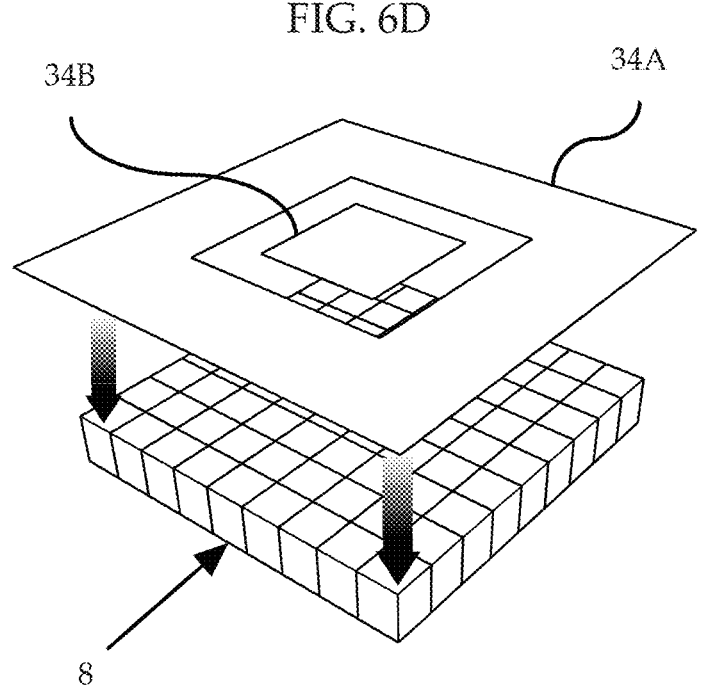
FIG. 6D shows a perspective view of another variant of first substrate layer being positioned over a first cut material.

By way of example only, and without limitations, FIG. 6B depicts the optional and alternative placement and lamination of alternative substrate layer 32, comprised of open and lightweight mesh material, over first cut material 8, to form one type of single laminate composite material.

FIGS. 6A and 6B depict first substrate layer 30 as roughly rectangular in shape; however, it is understood that such shape is optional, and that first substrate layer 30 may be comprised of materials cut or shaped in any shape, size, dimension, or thickness, including irregular shapes.

In another aspect of the invention, first substrate layer 30 may optionally be shaped so as to cover only some of the plurality of resilient elements, optionally leaving at least one resilient element exposed. A non-limiting example of one optional variation of first substrate layer 30 shaped so as to cover only some of the plurality of resilient elements is first substrate layer component variant 33, depicted in FIG. 6C. Also optionally, first substrate layer 30 may be comprised of two or more separate, non-contiguous pieces, such as first substrate layer component variants 34A and 34B depicted in FIG. 6D.

Figure 7:
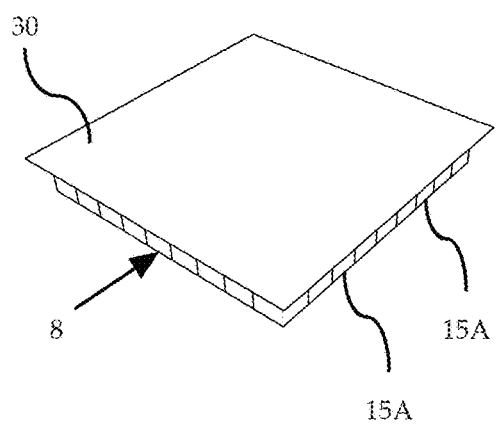
FIG. 7 shows a perspective view of the first substrate layer pressed or bonded or adhered to the first cut material

Once first substrate layer 30 is placed over first cut material 8 as depicted in FIG. 7, the entire assembly may be pressed until first substrate layer 30 bonds or is made to adhere to the surface of first cut material 8 by means of first joining element 3. If first joining element 3 is, optionally, a heat activated hot-melt adhesive ("HMA") film, glue, or bonding agent, the entire assembly may be heat pressed in order to activate the joining element.

Any means or device for heat-pressing first substrate layer 30 against first cut material 8 may be employed for this purpose, such as a heated press or platen.

Figure 8A:
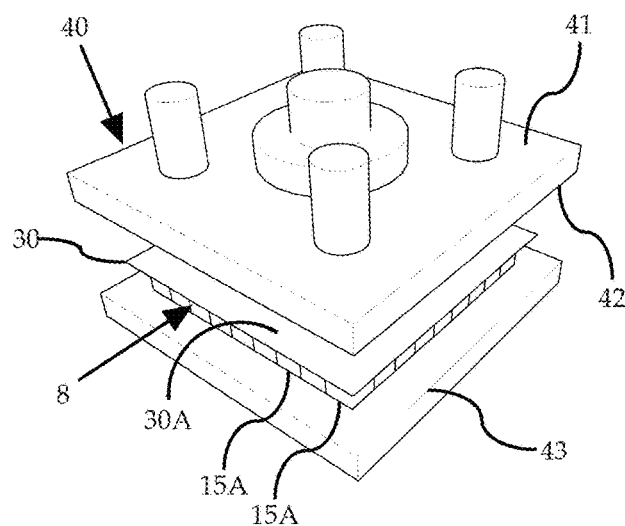
FIG. 8A shows a perspective view of first cut material placed next to a work surface with first substrate layer positioned on the opposite side, with a pressure platen being brought into contact with the first cut material on the side with the first substrate layer.
Figure 8B:
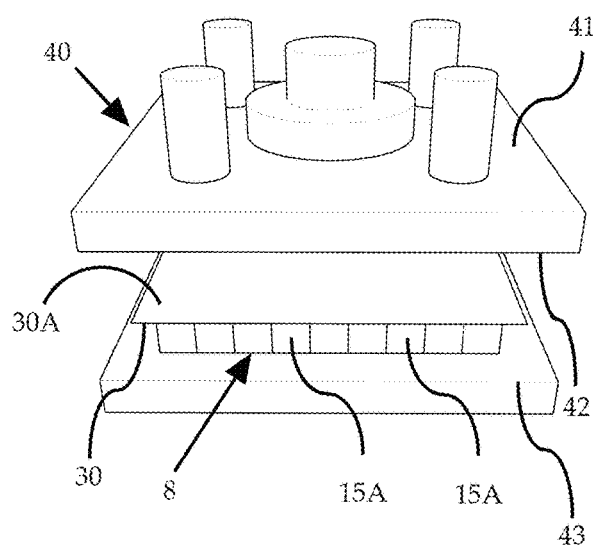
FIG. 8B shows a side perspective view of FIG. 8A.
Figure 9:
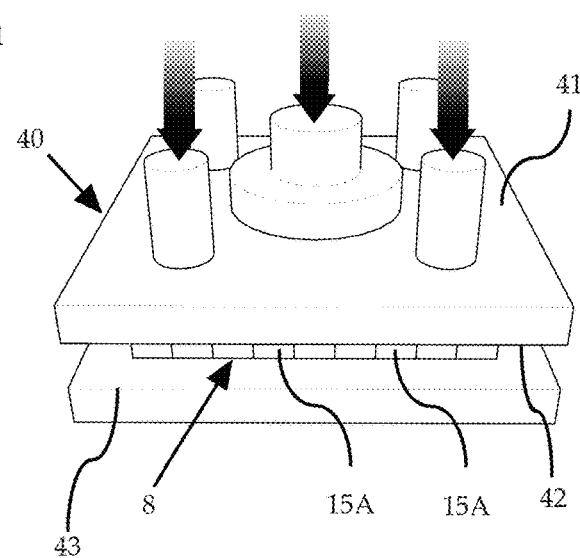
FIG. 9 shows the pressure platen engaged with the first cut material.

FIGS. 8A through 9 depict one non-limiting example of such heat-pressing operation.

As depicted in FIG. 8A a cut material (in this case, first cut material 8) is optionally placed flat adjacent to work surface 43, and first substrate layer 30 is positioned flat on the opposite side of first cut material 8. Pressure platen 40, which includes pressing element 41 and optional heating element 42, is positioned adjacent to substrate side 30A of first substrate layer 30, so that the work piece comprised of first substrate layer 30 and first cut material 8 is positioned between pressure platen 40 and work surface 43, and first substrate layer 30 faces heating element 42, and the array of first resilient elements 15A face work surface 43.

Optionally, the surface of pressure platen 40 may incorporate or be coated with one or more non-reactive materials (such as silicone, polytetrafluoroethylene/PTFE, perfluoroalkoxy/PFA, fluorinated ethylene propylene/FEP, Teflon, or other similar non-reactive material) that do not adhere to the exposed joining element, if any, on the surface of the resilient elements that are not fully covered by first substrate layer 30 (It is understood that this may be the case if, by way of example only, first substrate layer 30 is optionally shaped so as to cover only some of the plurality of resilient elements).

FIG. 8B depicts the lateral view of the arrangement, wherein first cut material 8 is located between pressure platen 40 and work surface 43.

FIG. 9 depicts pressure platen 40 in an engaged state, pressing towards work surface 43, with the work piece comprised of first substrate layer 30 and first cut material 8 "sandwiched" between pressure platen 40 and work surface 43, and heat pressed in the process.

FIGS. 10A through 10C depict, by way of example only and without limitations, a variety of single laminate composite materials that may be fabricated through this process.

FIG. 10A depicts first single laminate composite 101, comprised of first cut material 8 bonded or made to adhere to first substrate layer 30.

FIG. 10B depicts second single laminate composite 102, comprised of fourth cut material 11 bonded or made to adhere to first substrate layer 30.

FIG. 10C depicts third single laminate composite 103, comprised of third cut material 10 bonded or made to adhere to first substrate layer 30.

6. Optional Stretch-Processing of Single Laminate Composite Materials

Figure 11A:
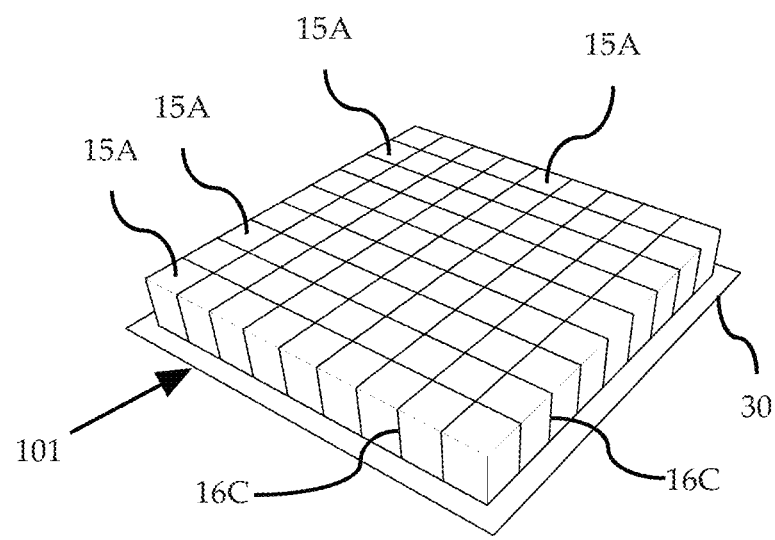
FIG. 11A shows a perspective view of the first single laminate composite.
Figure 11B:
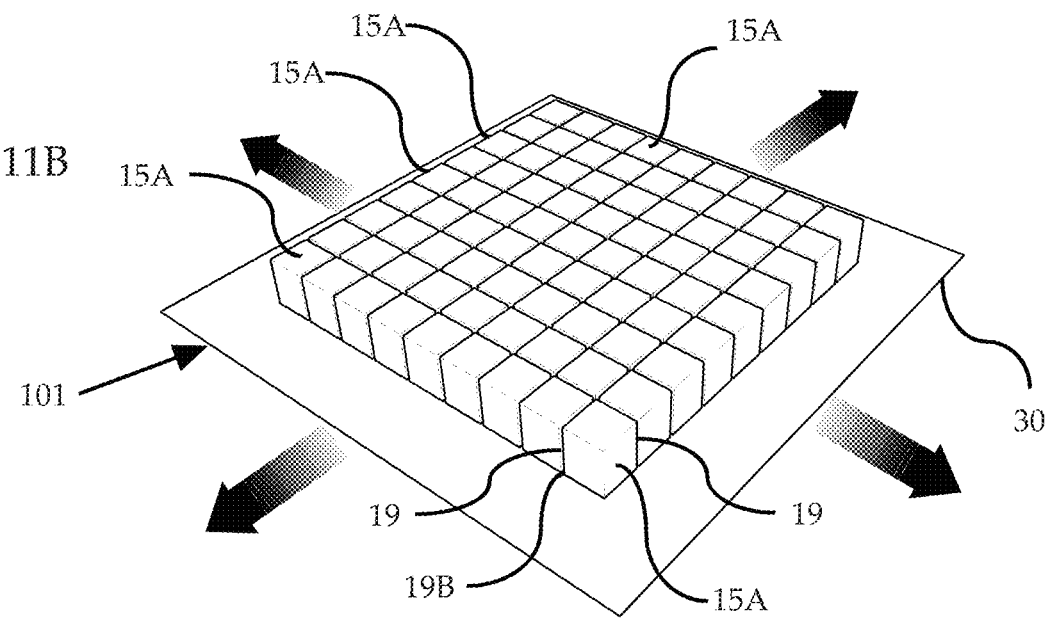
FIG. 11B shows a perspective view of the first single laminate composite being optionally stretched along one or two horizontal axes co-planar with the first substrate layer.
Figure 12:
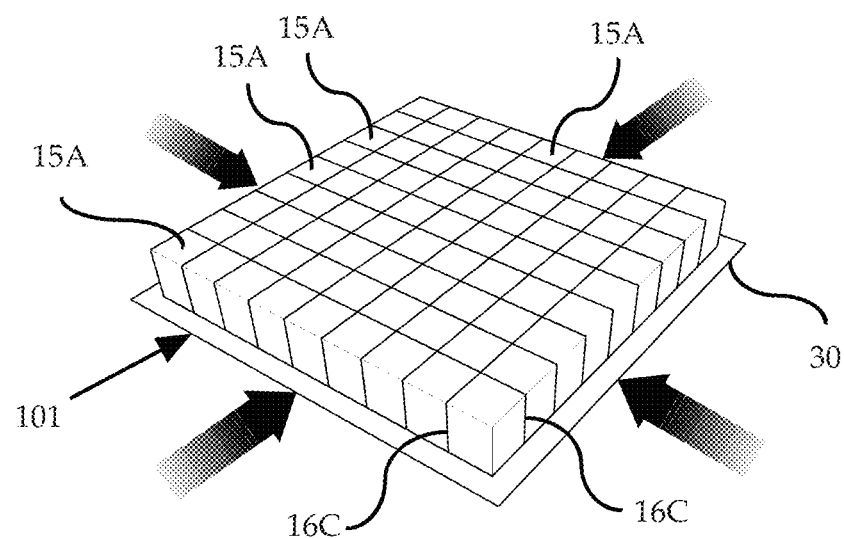
FIG. 12 shows a perspective view of the first single laminate composite of FIG. 11B wherein the mechanical force is released allowing the first single laminate composite to return to a "relaxed" or rest state.

In another optional aspect of the invention, illustrated by way of example in FIGS. 11A through 12, following the lamination of the cut materials to first substrate layer 30, the resulting single laminate composite materials may be mechanically stretched along one or two horizontal axis co-planar with the first substrate layer 30. The purpose behind this optional procedure is to cause the plurality of resilient elements bonded to first substrate layer 30 to move apart from each other, and thereby break any residual or excess glue or adhesive, such as first joining element 3, that may have seeped out from the surface of the resilient materials and seeped into the various material cutting lines defining the resilient elements, partially bonding the resilient elements to each other.

By way of example only, and without limitations, FIG. 11A depicts first single laminate composite 101 following the first lamination, comprised of first cut material 8 bonded or made to adhere to first substrate layer 30. As depicted in FIG. 11A, first cut material 8 is fabricated by cutting first coated material 6 along first material cutting lines 16A, and thereby defining and creating a plurality of first resilient elements 15A.

As depicted in FIG. 11B, first single laminate composite 101 is optionally stretched along one or two horizontal axis co-planar with the first substrate layer 30 by application of mechanical force, as illustrated by the arrows in FIG. 11B that depict the direction of the mechanical stretch. As first substrate layer 30 is stretched, individual first resilient elements 15A—which are bonded to first substrate layer 30—move apart from each other, creating stretch gap 19 between first resilient elements 15A.

The extent of stretch gap 19 depends on the composition, dimensions, and shape of first substrate layer 30, as well as the extent of the mechanical force applied to the assembly. Stretch gap 19 optionally breaks any bonds between two or more first resilient elements 15A caused by residues of first joining element 3 that may have seeped out during the lamination process.

As depicted in FIG. 12, when mechanical force ceases to be applied and first single laminate composite 101 is released, first single laminate composite 101 returns to a "relaxed" or rest state.

7. Optional Lamination of Second Substrate Layer

FIGS. 13A through 19 depict optional lamination of second substrate layer 31 onto cut materials (such as first cut material 8, second cut material 9, third cut material 10, fourth cut material 11, fifth cut material 12, and sixth cut material 13) in addition to the lamination of first substrate layer 30, to form a variety of dual laminate composite materials.

In a more preferred embodiment of the invention, a composite cushioning material comprised of two or more resilient elements attached or bonded to two substrate layers, such as dual laminate composite 120 depicted in FIG. 50A, may be fabricated by laminating or bonding second substrate layer 31 to single laminate composite 100 depicted in FIG. 51A. Second substrate layer 31 is optionally positioned adjacent to the exposed side of single laminate composite 100, which is opposite to the side already laminated to first substrate layer 30; and second substrate layer 31 is laminated or bonded to the exposed side of the single laminate composite 100, to form dual laminate composite 120. Second substrate layer 31 may be laminated or bonded to the resilient elements of single laminate composite 100 by using the various optional and alternative methods disclosed in this application, including the various processes disclosed above for lamination of first substrate layer 30 onto various resilient elements or cut materials.

This process may be employed to make dual laminate composite 120, as well as many variations of the same. By way of example only, in one aspect of the invention, as depicted in FIG. 13A, second substrate layer 31 may be optionally positioned adjacent to the side of first single laminate composite 101 opposite to the side already laminated to first substrate layer 30; and second substrate layer 31 may be laminated or bonded to the side adjacent to it, to form first dual laminate composite 121. (It is understood that first single laminate composite 101 is comprised of first substrate layer 30 bonded to first cut material 8).

In another aspect of the invention, as depicted in FIG. 13B, second substrate layer 31 may be optionally positioned adjacent to the side of second single laminate composite 102 opposite to the side already laminated to first substrate layer 30; and second substrate layer 31 may be laminated or bonded to the side adjacent to it, to form second dual laminate composite 122. (It is understood that second single laminate composite 102 is comprised of first substrate layer 30 bonded to fourth cut material 11).

In yet another aspect of the invention, as depicted in FIG. 13C, second substrate layer 31 may optionally positioned adjacent to the side of third single laminate composite 103 opposite to the side already laminated to first substrate layer 30; and second substrate layer 31 may laminated or bonded to the side adjacent to it, to form third dual laminate composite 123. (It is understood that third single laminate composite 103 is comprised of first substrate layer 30 bonded to third cut material 10).

In a more preferred embodiment of the invention, second substrate layer 31 is optionally comprised of a sheet or layer of synthetic, non-woven fabric such as polyester or nylon. However, it is understood that second substrate layer 31 may be comprised of a sheet or layer of any suitable material, including, without limitation, natural or synthetic fabric, mesh, flexible or pliable plastic, neoprene, natural leather, synthetic leather, or a sheet of synthetic fiber, or any combination of such materials. Optionally, second substrate layer 31 may also be made, of foam, plastic, latex, silicone, rubber, elastomer, other rubber-like materials, and so forth, including any combination of such materials. First substrate layer 30 may also be comprised of any such materials encased in, or sandwiched between, sheets of natural or synthetic fabric.

It is understood that first substrate layer 30 and second substrate layer 31 may optionally be comprised of materials with the same or different thickness in relation to each other.

It is also understood that first substrate layer 30 and second substrate layer 31 may optionally be comprised of materials with the same or different dimensions. In another aspect of the invention, either first substrate layer 30 or second substrate layer 31, or both of them, may optionally cover only some of the plurality of resilient elements, optionally leaving at least one resilient element exposed.

It is further understood that, optionally and alternatively, first substrate layer 30 and second substrate layer 31 may be comprised of the same or different types of materials. Therefore, in one aspect of the invention, first substrate layer 30 and second substrate layer 31 may optionally be comprised of materials that are different in composition, have different functional characteristics or performance parameters (by way of example only, and without limitations, different stretchability, breathability, density, permeability to gases or liquids, absorbency of vapors and liquids, resistance to tear, and the like), or have different colors. Alternatively, the two substrate layers may also be optionally comprised of the same type of material.

Figure 16A:
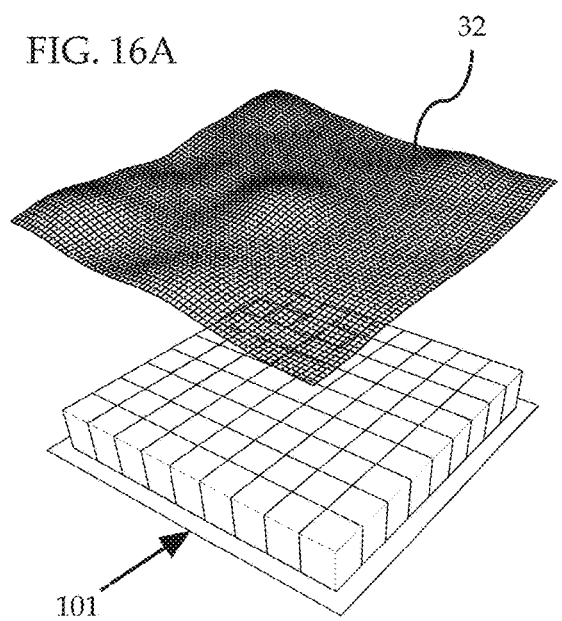
FIG. 16A shows a perspective view of an alternative substrate layer being brought into contact with a first single laminate composite, to form an alternative first dual laminate composite
Figure 16B:
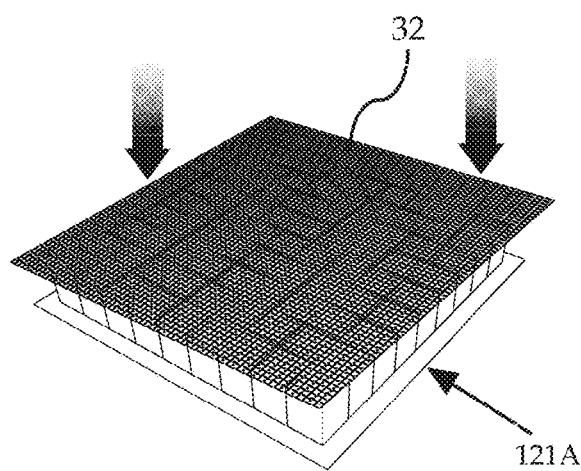
FIG. 16B shows a perspective view of an alternative substrate layer in contact with a first single laminate composite, to form an alternative first dual laminate composite
Figure 17A:
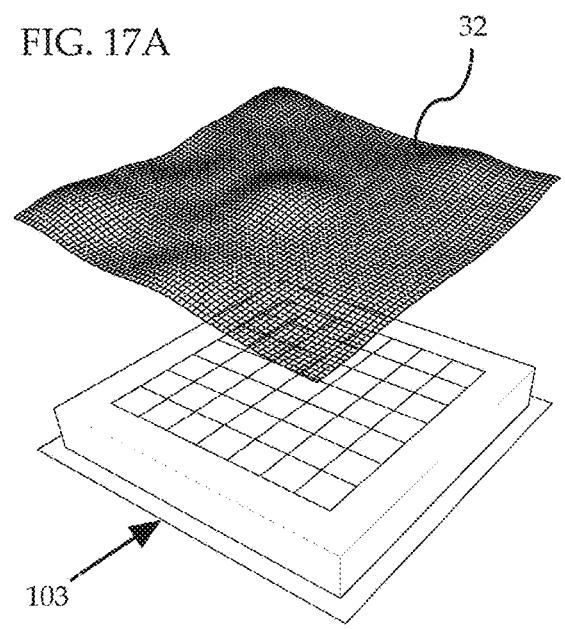
FIG. 17A shows a perspective view of an alternative substrate layer being brought into contact with a third single laminate composite, to form an alternative third dual laminate composite
Figure 17B:
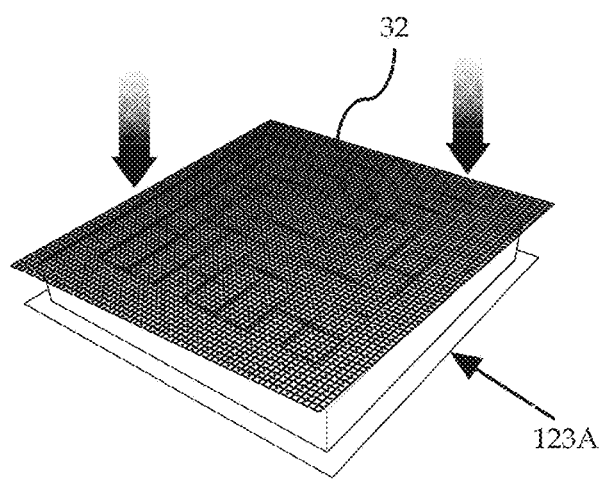
FIG. 17B shows a perspective view of an alternative substrate layer in contact with a third single laminate composite, to form an alternative third dual laminate composite

By way of example only, and without limitations, FIGS. 16A and 16B depict the optional and alternative placement and lamination of alternative substrate layer 32, comprised of open and lightweight mesh material, over first single laminate composite 101, to form alternative first dual laminate composite 121A. As another non-limiting example, FIGS. 17A and 17B depict optional and alternative placement and lamination of alternative substrate layer 32, comprised of open and lightweight mesh material, over third single laminate composite 103, to form alternative third dual laminate composite 123A.

It is understood that any suitable combination of materials may be selected for first substrate layer 30 and second substrate layer 31, to endow the finished dual laminate composite material with suitable or desired performance characteristics. In one non-limiting example, a breathable synthetic fabric relatively permeable to air and water vapor may be optionally selected for first substrate layer 30; and a foam or natural fabric with relatively high capacity for absorbing and retaining water or water vapor may optionally be selected for second substrate layer 31. Optionally, holes or apertures of varying sizes may be made in first substrate layer 30 to increase its permeability to gases and vapor. In one non-limiting example, this combination of substrate layers may optionally be employed to make footwear sockliners, such as first dual laminate sockliner 120A depicted in FIG. 53A, and second dual laminate sockliner 126A depicted in FIG. 54A.

It is understood that second substrate layer 31 may be laminated or made to bond to the resilient elements by using the various optional and alternative pressing and heat-pressing methods disclosed in this application, including the various processes disclosed above for lamination of first substrate layer 30 onto various resilient elements or cut materials.

Figure 18A:
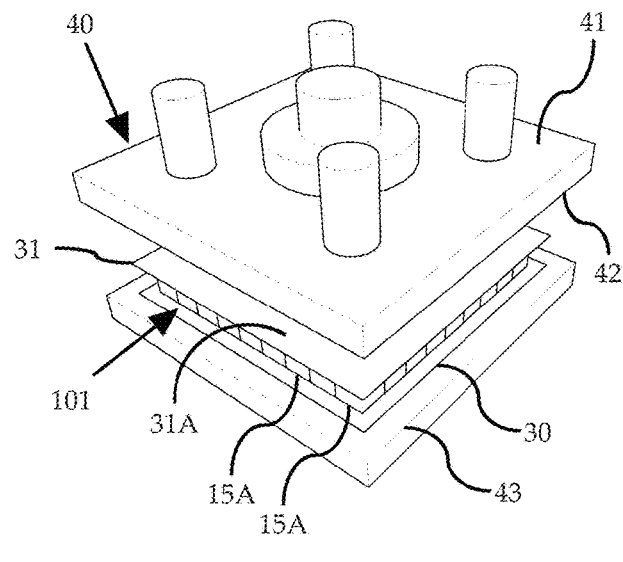
FIG. 18A shows a perspective view of a single laminate composite placed against a work surface, wherein a second substrate layer is placed against the other side of the single laminate composite from the work surface. A pressure platen is placing into contact with the work piece on the second substrate layer-side.
Figure 18B:
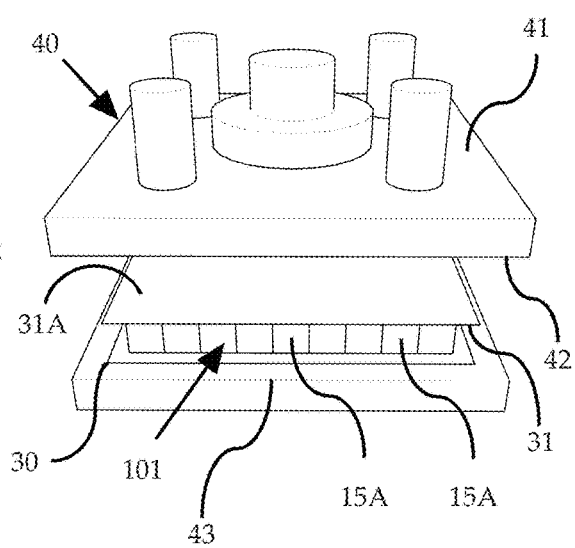
FIG. 18B shows a side perspective view of FIG. 18A.
Figure 19:
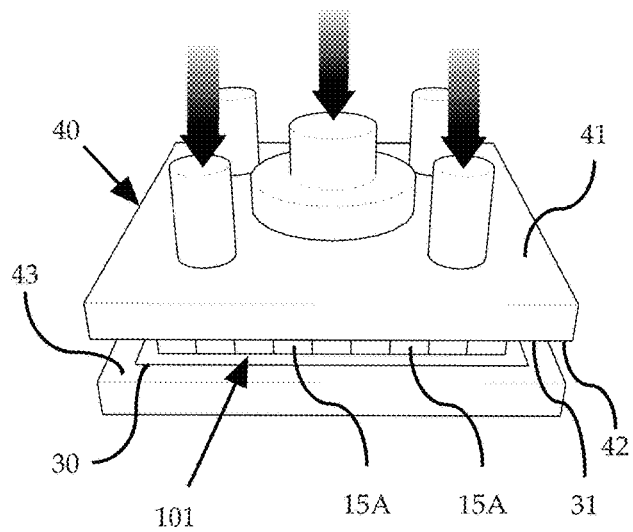
FIG. 19 shows a side perspective view of FIG. 18A wherein pressure and heat are applied to the work piece.

FIGS. 18A through 19 depict one non-limiting example of an optional heat-pressing method for laminating or bonding second substrate layer 31 to resilient elements, to make a composite cushioning material (such as dual laminate composite 120 depicted in FIG. 50A, and other variations of the same, such as first dual laminate composite 121 depicted in FIGS. 13A and 14) comprised of two or more resilient elements attached or bonded to two substrate layers, wherein the resilient elements are "sandwiched" between first substrate layer 30 and second substrate layer 31 and bonded or made to adhere to the same.

As depicted in FIG. 18A, a single laminate composite (in this case, first single laminate composite 101) is placed flat against work surface 43. Second substrate layer 31 is placed against the other side of first single laminate composite 101. Pressure platen 40 is positioned adjacent to second substrate layer 31, so that outer surface 31A of second substrate layer 31 is facing the face of pressure platen 40 incorporating heating element 42.

FIG. 18B depicts a lateral view of the above-referenced operation, and clarifies that the work piece comprised of second substrate layer 31 and first single laminate composite 101 is "sandwiched" between first substrate layer 30 and second substrate layer 31. As also depicted in FIG. 18B, the work piece is positioned between work surface 43 and pressure platen 40.

FIG. 19 depicts the heat-press operation, wherein pressure platen 40 moves towards work surface 43 and pressing element 41 makes contact with second substrate layer 31, and the entire work piece is pressed against work surface 43 and compressed. As depicted in FIG. 19, heating element 42 causes second substrate layer 31 to be heat pressed against a plurality of first resilient elements 15A in first single laminate composite 101.

Following the heat-press operation, second substrate layer 31 is bonded or adhered to first single laminate composite 101, forming first dual laminate composite 121 depicted in FIG. 14.

FIGS. 15A through 15G depict an optional and alternative method for assembling other variations of dual laminate composite 120 generally depicted in FIG. 50A, such as second dual laminate composite 122 depicted in FIGS. 13B and 15G.

By way of example only, and without limitations, FIG. 15G depicts second dual laminate composite 122 assembled by optionally removing of the perimetral edge material from a cut material with the aid of a mechanical device or means, while the mechanical device keeps the plurality of resilient elements aligned and positioned over first substrate layer 30 prior to the lamination of the substrate layer to the resilient elements, followed by the lamination of second substrate layer 31 to the resulting, partially assembled work piece.

FIG. 15A depicts third cut material 10, comprised of a plurality of third resilient elements 15C, surrounded by first perimetral edge 17A.

FIG. 15B depicts mechanical holder 20 with a perimeter shape substantially similar to the perimeter shape of the array of third resilient elements 15C positioned above an array of third resilient elements 15C.

FIG. 15C depicts mechanical holder 20 positioned above an array of third resilient elements 15C, making contact with the resilient elements, and holding them in place. As depicted in FIG. 15C, mechanical holder 20 does not hold first perimetral edge 17A in place.

FIG. 15D depicts the mechanical extraction of first perimetral edge 17A along first perimetral edge cut line 18A, aided by mechanical holder 20 that holds array of third resilient elements 15C in place next to first substrate layer 30 during the extraction.

FIG. 15E depicts the removal of first perimetral edge 17A, leaving behind a plurality of third resilient elements 15C held in place by mechanical holder 20, forming fourth cut material 11 which is positioned above first substrate layer 30.

Although not depicted in FIGS. 15D and 15E, in an alternative and optional embodiment of the invention, mechanical holder 20 may be shaped so that it makes contact with only some, and not all, of third resilient elements 15C, enabling some of third resilient elements 15C not held in place by mechanical holder 20 to be removed (along with first perimetral edge 17A) prior to the lamination of first substrate layer 30 to the remaining third resilient elements 15C.

Alternatively, and optionally, mechanical holder 20 may be released and removed, as depicted in FIG. 15F, forming fourth cut material 11 that sits above first substrate layer 30. It is understood that, alternatively and optionally, first perimetral edge 17A may also be extracted and removed manually from third cut material 10.

The resulting work piece, comprised of a cut material that sits above first substrate layer 30, may be pressed or heat pressed, and made to bond with the resilient elements of fourth cut material 11 by using the various optional and alternative method disclosed in this application, including the various processes disclosed above for lamination of first substrate layer 30 onto various resilient elements or cut materials. The result of this operation is second single laminate composite 102, as depicted in FIG. 15F.

This second single laminate composite 102 may be processed further by bonding second substrate layer 31 to it, forming second dual laminate composite 122 depicted in FIG. 15G: As depicted in FIG. 15G, following the lamination of first substrate layer 30 to fourth cut material 11, forming second single laminate composite 102, second substrate layer 31 may optionally be positioned adjacent to the exposed side of second single laminate composite 102, which is opposite to the side already laminated to first substrate layer 30; and second substrate layer 31 is laminated or bonded to the exposed side of the second single laminate composite 102, to form second dual laminate composite 122.

In another alternative and optional embodiment of the invention, the steps depicted in FIGS. 15B through 15F may optionally be carried out on the surface of pressure platen 40. In this optional embodiment of the invention, the resulting assembly may be pressed or heat pressed following the removal of first perimetral edge 17A, wherein mechanical holder 20 functions as work surface 43, and pressure platen 40 makes contact against first substrate layer 30, on the side of first substrate layer 30 that is opposite to the side of the substrate layer that makes contact with the resilient elements. The entire assembly may optionally be pressed or heat pressed, forming second single laminate composite 102.

This second single laminate composite 102 may be processed further by bonding second substrate layer 31 to it, forming second dual laminate composite 122 depicted in FIG. 15G.

It is understood that second substrate layer 31 may be laminated or bonded to the resilient elements of second single laminate composite 102 by using the various optional and alternative method disclosed in this application, including the various processes disclosed above for lamination of first substrate layer 30 onto various resilient elements or cut materials.

8. Optional Single Step Lamination Method for First and Second Substrate Layers

In another aspect of the invention, it is understood that first substrate layer 30 and second substrate layer 31 may optionally be laminated or bonded to the resilient elements of a cut material in a single step.

FIGS. 20A through 23B depict one non-limiting example of an optional single step process for laminating two substrate layers to the resilient elements of a cut material, to form a dual laminate composite material.

Figure 20A:
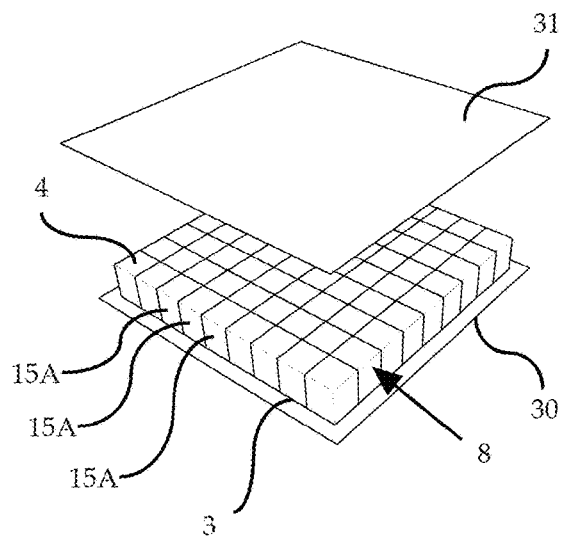
FIG. 20A shows a perspective view of the formation of a dual laminate composite material, wherein a second substrate layer is brought into contact with first cut material in contact with, on the other side, first substrate layer.
Figure 20B:
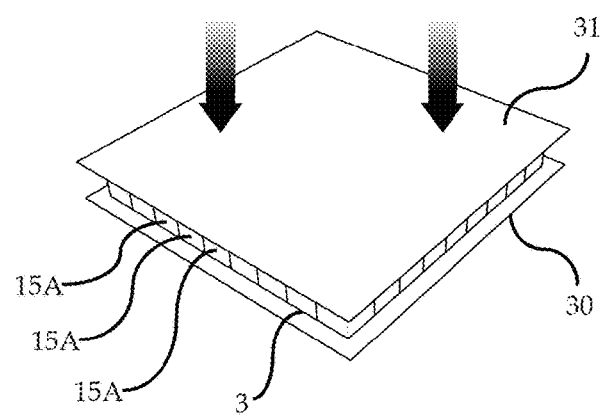
FIG. 20B shows a perspective view of the formation of a dual laminate composite material, wherein a second substrate layer is in contact with first cut material in contact with, on the other side, first substrate layer.

As depicted in FIGS. 20A and 20B, in this optional process a cut material (in this case, first cut material 8) is placed flat between first substrate layer 30 and second substrate layer 31, so that first cut material 8 is "sandwiched" between the two substrate layers as depicted in FIG. 20B. It is understood that in this aspect of the invention, first joining element 3 (such as, by way of example only, a layer of hot-melt adhesive film) is positioned between the surfaces of first resilient elements 15A and first substrate layer 30, and that second joining element 4 (such as, by way of example only, another layer of hot-melt adhesive film) is positioned on the opposite side, between the surfaces of first resilient elements 15A and second substrate layer 31.

Figure 21A:
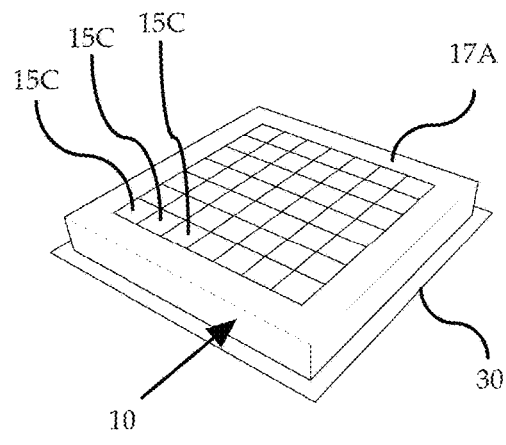
FIG. 21A shows a perspective view of third resilient elements, surrounded by a first perimetral edge, positioned adjacent to a first substrate layer.

In another alternative and optional embodiment of this aspect of the invention, another cut material such as third cut material 10, which is comprised of a plurality of third resilient elements 15C, surrounded by first perimetral edge 17A, is positioned adjacent to first substrate layer 30, as depicted in FIG. 21A.

Figure 21B:
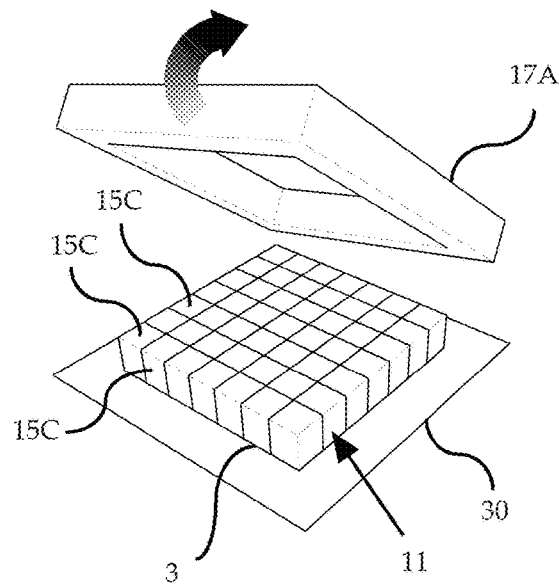
FIG. 21B shows a perspective view wherein the first perimetral edge is removed, leaving the third resilient elements adjacent to the first substrate layer.

As depicted in FIG. 21B, first perimetral edge 17A is mechanically extracted, leaving behind a plurality or array of third resilient elements 15C which forms fourth cut material 11. As shown in FIG. 21B, fourth cut material 11 is positioned adjacent to first substrate layer 30. It is understood that the mechanical extraction and removal of the perimetral edge material may be carried out by using any of the various methods disclosed in this application.

Figure 21C:
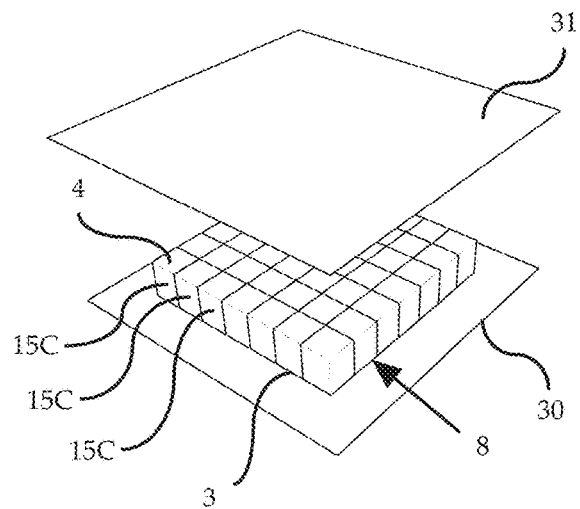
FIG. 21C shows a perspective view of a second substrate layer being brought into contact with third resilient elements in contact with, on the other side, a first substrate layer.

As depicted in FIGS. 21B and 21C, it is understood that in this aspect of the invention, first joining element 3 (such as, by way of example only, a layer of hot-melt adhesive film) is positioned between the surfaces of first substrate layer 30 and third resilient elements 15C remaining after the removal of first perimetral edge 17A.

Figure 21D:
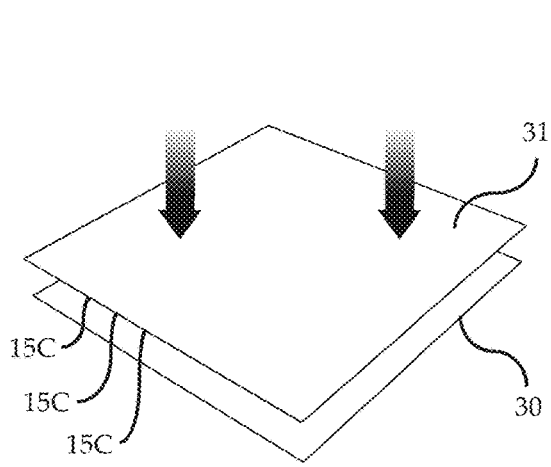
FIG. 21D shows a perspective view of a second substrate layer in contact with third resilient elements in contact with, on the other side, a first substrate layer.

As depicted in FIGS. 21C and 21D, second substrate layer 31 is positioned adjacent to fourth cut material 11, so that fourth cut material 11 (which is comprised of a plurality of third resilient elements 15C) is "sandwiched" between first substrate layer 30 and second substrate layer 31. It is understood that in this aspect of the invention, second joining element 4 (such as, by way of example only, a layer of hot-melt adhesive film) is positioned between the surfaces of third resilient elements 15C and second substrate layer 31.

In another optional aspect of the invention, the assembled work pieces depicted in FIGS. 20B and 21D (namely, a cut material that sits between first substrate layer 30 and second substrate layer 31) are processed so that the resilient elements in the cut materials bond or adhere to first substrate layer 30 and second substrate layer 31. The bonding process may be carried out by using any of the various optional and alternative method disclosed in this application, including the various pressing and heat pressing processes disclosed above for lamination of first substrate layer 30 onto various resilient elements or cut materials.

In an alternative and optional embodiment of the invention, either one of the assembled work pieces depicted in FIGS. 20B and 21D may be pressed or heat pressed in a single step, so that first substrate layer 30 and second substrate layer 31 are bonded or made to adhere to the cut materials in a single operation.

Figure 22A:
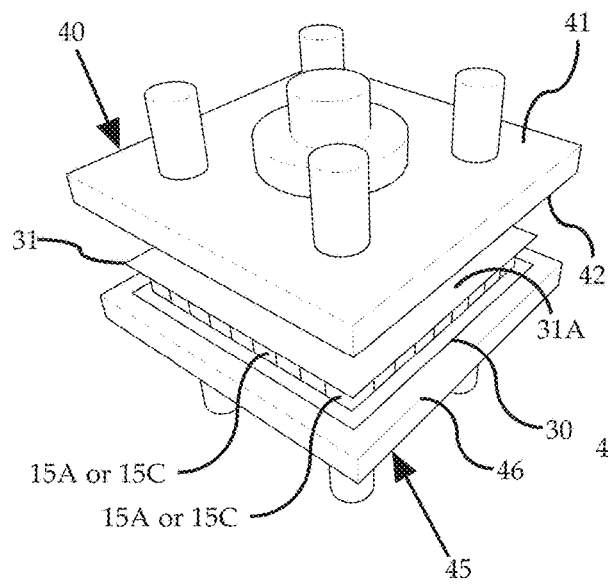
FIG. 22A shows a perspective view of a work piece, made of cut material between a first and second substrate layer, placed between a pressure platen and a supplemental pressure platen.
Figure 22B:
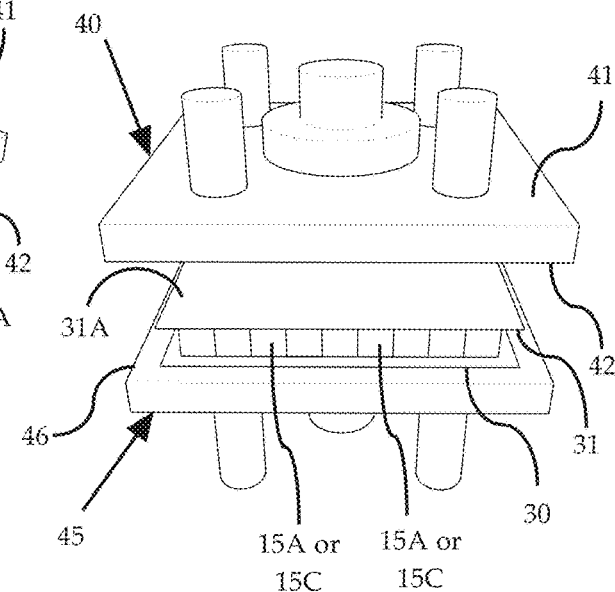
FIG. 22B shows a side perspective view of FIG. 22A.

FIGS. 22A and 22B depict one alternative method, wherein a work piece depicted in FIGS. 20B and 21D (that is, either first cut material 8 or fourth cut material 11 "sandwiched" between first substrate layer 30 and second substrate layer 31) is placed between two heat pressing devices or means, comprised of pressure platen 40 and supplemental pressure platen 45, with their respective pressing elements and heating elements (namely, heating element 42 and supplemental heating element 46) positioned facing each other.

FIG. 22B depicts a lateral view of the arrangement, wherein the work piece (that is, either first cut material 8 or fourth cut material 11 "sandwiched" between first substrate layer 30 and second substrate layer 31) is situated between pressure platen 40 and supplemental pressure platen 45. As depicted in FIG. 22B, pressure platen 40 includes pressing element 41 and optional heating element 42 contacting substrate side 31A of second substrate layer 31. The same figure also depicts supplemental pressure platen 46, which includes an optional supplemental heating element 46 contacting first substrate layer 30.

Figure 23A:
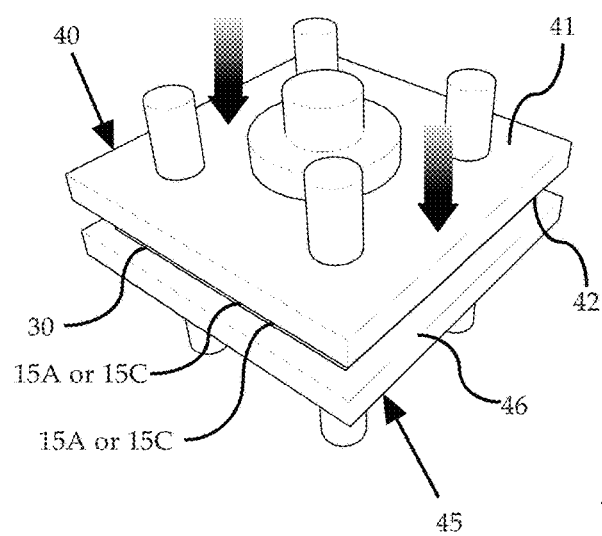
FIG. 23A shows a perspective view of a work piece, made of cut material between a first and second substrate layer, placed between a pressure platen and a supplemental pressure platen, wherein heat is applied.

FIGS. 23A and 22B depicts pressure platen 40 and supplemental pressure platen 45 in an engaged state, pressing towards each other, with the work piece (comprised of a cut material "sandwiched" between first substrate layer 30 and second substrate layer 31) compressed between pressure platen 40 and supplemental pressure platen 45, and heat pressed by means of heating element 42 and supplemental heating element 46, respectively.

Optionally, the surfaces of pressure platen 40 and supplemental pressure platen 45 may incorporate or be coated with one or more non-reactive materials (such as silicone, polytetrafluoroethylene/PTFE, perfluoroalkoxy/PFA, fluorinated ethylene propylene/FEP, Teflon, or other similar non-reactive material) that do not adhere to the exposed joining element, if any, on the surface of the resilient elements that are not fully covered by first substrate layer 30 or second substrate layer 31 (It is understood that this may be the case if, by way of example only, first substrate layer 30 or second substrate layer 31 is optionally shaped so as to cover only some of the plurality of resilient elements).

Figure 24A:
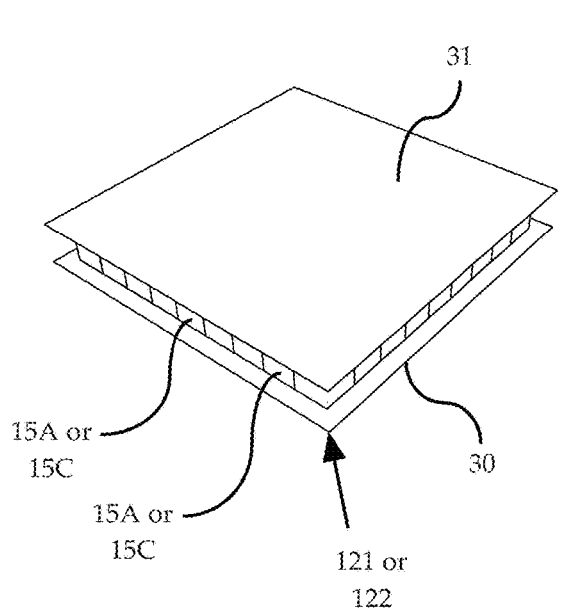
FIG. 24A shows a perspective view of a dual laminate composite material.

As depicted in FIG. 24A, a variety of dual laminate composite materials may be fabricated by means of the pressing or heat pressing operation described above—in this example, first dual laminate composite 121 and second dual laminate composite 122.

9. Optional Stretch-Processing of Dual Laminate Composite Materials

FIGS. 24A through 26C depict another optional aspect of the invention, wherein following the lamination of a cut material to two substrate layers (that is, first substrate layer 30 and second substrate layer 31), the resulting dual laminate composite material is mechanically stretched along one or two horizontal axis co-planar with the substrate layers. The purpose behind this optional procedure is to cause the plurality of resilient elements bonded to the substrate layers to move apart from each other, and thereby break any residual or excess glue or adhesive, such as traces of first joining element 3 or second joining element 4, that may have seeped out from the surface of the resilient materials and seeped into the various material cutting lines defining the resilient elements, partially bonding the resilient elements to each other.

Figure 24D:
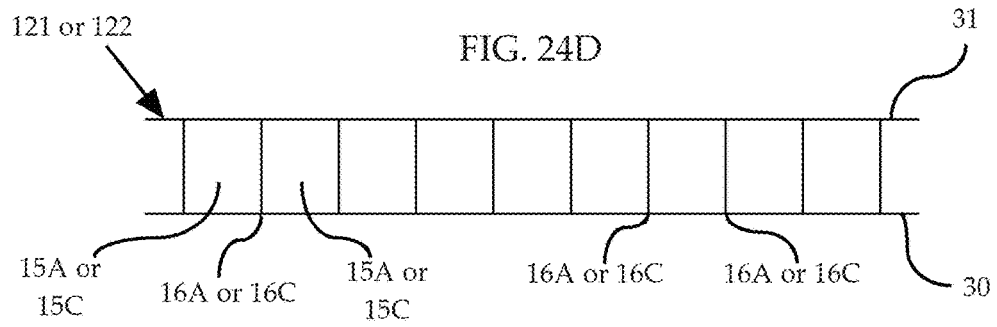
FIG. 24D shows a side view of a dual laminate composite material.

By way of example only, and without limitations, FIG. 24A depicts a double laminate composite (which may be, in this example, first dual laminate composite 121 or second dual laminate composite 122) fabricated by means of the pressing or heat pressing operation described above. FIG. 24B depicts a partial cutaway view of the double laminate composite. FIGS. 24C and 24D depict lateral and side views of the same double laminate composite.

FIGS. 24B, 24C, and 24D also depict the individual resilient elements (which may be, in this example, first resilient element 15A or third resilient element 15C) that are parts of the double laminate composite (which may be, in this example, first dual laminate composite 121 or second dual laminate composite 122), and are separated and defined from each other by material cutting lines (which may be, in this example, first material cutting lines 16A or second material cutting lines 16B).

It is understood that in this optional embodiment of the invention, the resilient elements are positioned substantially adjacent to each other, and there is no gap, or there is minimal gap, between the resilient elements (which may be, in this example, first resilient element 15A or third resilient element 15C), or along the material cutting lines (which may be, in this example, first material cutting lines 16A or second material cutting lines 16B), as depicted in FIGS. 24B, 24C, and 24D.

Figure 25A:
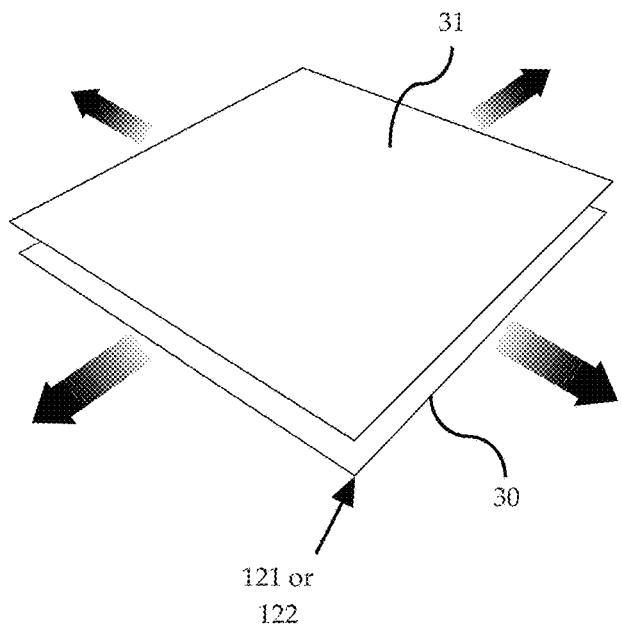
FIG. 25A shows a perspective view of a dual laminate composite material being stretched in one or two horizontal axes co-planar with the substrate layer.

Following the lamination of first substrate layer 30 and second substrate layer 31 to the cut material, and optionally after the work piece has cooled down so that the joining elements (such as a glue, hot-melt adhesive film, or other adhesive) have been allowed to set, the entire assembly (comprised of first dual laminate composite 121 or second dual laminate composite 122) may be optionally stretched along one or two horizontal axis co-planar with the substrate layers by application of mechanical force, as illustrated by the arrows in FIGS. 25A, 25B, and 25C that depict the direction of the mechanical stretch.

Figure 25D:
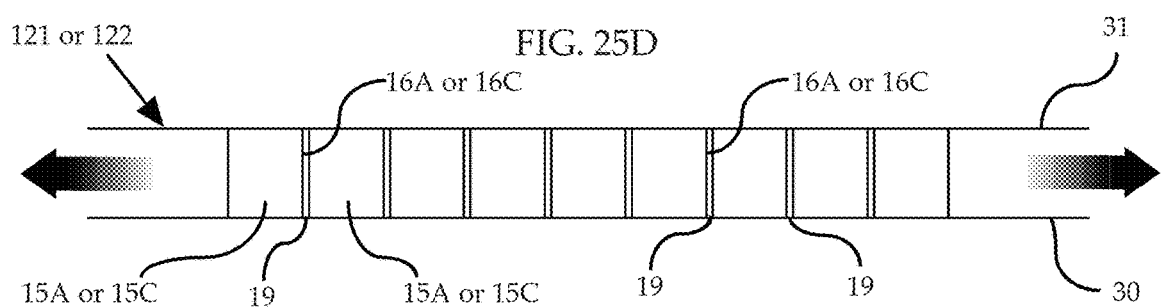
FIG. 25D shows a side view of a dual laminate composite material being stretched in one or two horizontal axes co-planar with the substrate layer.

FIG. 25D depicts a side view of the entire assembly (comprised of first dual laminate composite 121 or second dual laminate composite 122) as it is stretched, with the arrows showing the direction of the mechanical stretch.

As depicted in the partial cutaway view in FIG. 25B, as the substrate layers are stretched, individual resilient elements (which may be, in this example, first resilient element 15A or third resilient element 15C) that are bonded to first substrate layer 30 and second substrate layer 31 move apart from each other, creating stretch gap 19 between the resilient elements.

The extent of stretch gap 19 depends on the composition, dimensions, and shape of first substrate layer 30 and second substrate layer 31, as well as the extent of the mechanical force applied to the assembly. Stretch gap 19 optionally breaks any bonds between two or more resilient elements (which may be, in this example, first resilient element 15A or third resilient element 15C) caused by residues of first joining element 3 or second joining element 4 that may have seeped out in the course of the lamination process, or during the pressing or heat pressing operation.

FIGS. 25C and 25D depict lateral and side views of the double laminate composite being mechanically stretched, which creates stretch gap 19 between the resilient elements (which may be, in this example, first resilient element 15A or third resilient element 15C).

Figure 26A:
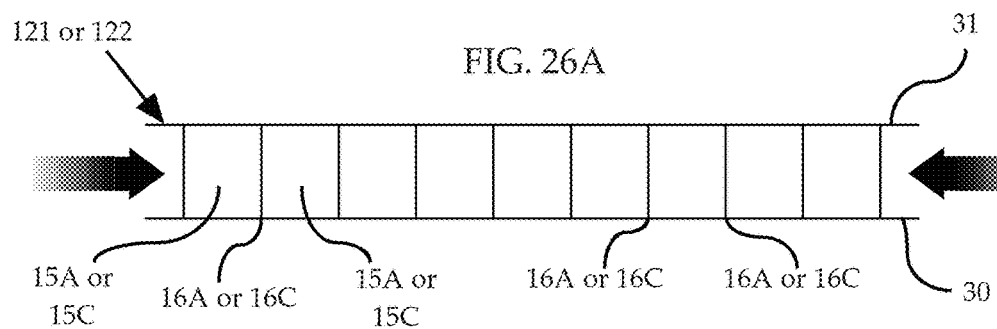
FIG. 26A shows a side view of a dual laminate composite material wherein the mechanical force is released allowing the dual laminate composite to return to a "relaxed" or rest state.
Figure 26B:
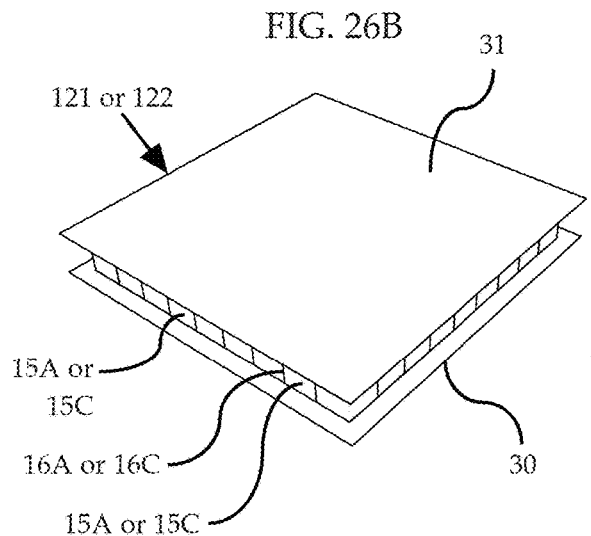
FIG. 26B shows a perspective view of a dual laminate composite material.
Figure 26C:
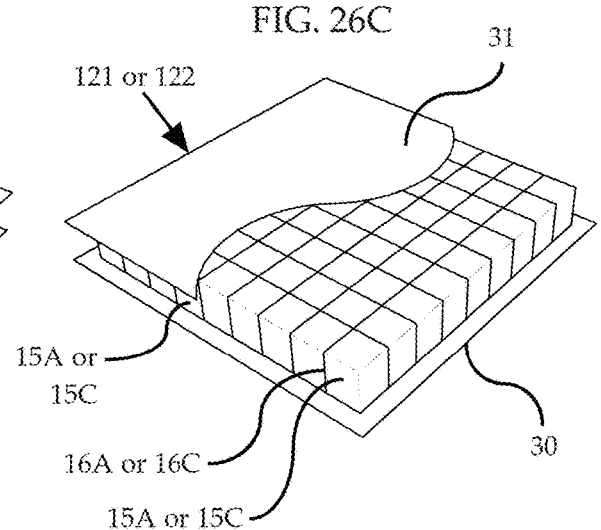
FIG. 26C shows a perspective cutaway view of a dual laminate composite material.

As depicted in FIGS. 26A, 26B, and 26C, in this optional embodiment of the invention, when mechanical force ceases to be applied, and the dual laminate composite is released, the dual laminate composite returns to a "relaxed" or rest state, and stretch gap 19 disappears.

Following this operation, the resulting dual laminate composite (which may be, in this example, first dual laminate composite 121 or second dual laminate composite 122) may be used as cushioning component in footwear, as protective padding, or as components in athletic or industrial protective gear. Optionally, the resulting dual laminate composite may also be cut into a suitable shape for use as a shoe insole, or footwear sockliner, as in first dual laminate sockliner 120A depicted in FIG. 53A, and in second dual laminate sockliner 126A depicted in FIG. 54A. The dual laminate composite may also be optionally cut into other suitable shape for use as a cushioning component or protective padding component in athletic or industrial protective gear, as in first dual laminate padding 120B depicted in FIG. 53A, and in second dual laminate padding 126B depicted in FIG. 54A.

In another optional embodiment of the invention, a single or dual laminate composite (such as, for example, first single laminate composite 101, or first dual laminate composite 121) may be mechanically stretched along one or two horizontal axis co-planar with the substrate layers, and along a third vertical axis perpendicular to the substrate layers. This optional procedure causes the plurality of resilient elements bonded to the substrate layers to move apart from each other, and thereby break any residual or excess glue or adhesive that may have leaked out of the surface of the resilient materials and seeped into the various material cutting lines defining the resilient elements, potentially causing the resilient elements to stick to each other and/or reducing the overall flexibility or stretchability of the entire assembly. As depicted in FIGS. 49A-49C, and FIGS. 49D-49H, all types of single or dual laminate composites may be mechanically stretched along one or two horizontal axis co-planar with the substrate layers, and along a third vertical axis perpendicular to the substrate layers, by means of a suitably shaped three-dimensional mold.

Figure 49A:
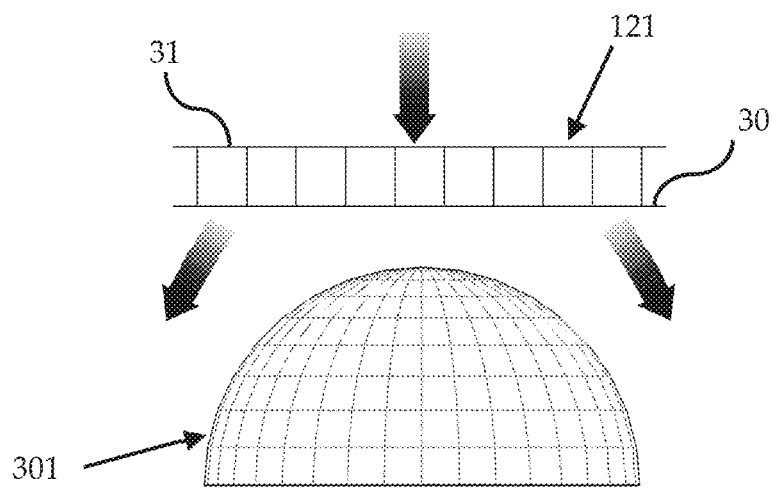
FIG. 49A shows a side view of a dome-shaped mold next to first dual laminate composite.

As shown in FIG. 49A, a laminate composite (in this case, the first dual laminate composite 121) may be positioned against an optionally convex-shaped three dimensional mold (in this case, a dome-shaped mold 301), and the laminate composite may be stretched along the direction of the arrows shown in FIG. 49A. Alternatively, and optionally, the dome-shaped mold 301 may be pushed against the laminate composite, while the edges of the laminate composite are held in place or otherwise constrained. It is understood that this step causes the laminate composite to stretch and partially or substantially conform to the shape of the three-dimensional mold. As the second substrate layer 31 in the laminate composite stretches to a greater extent than the first substrate layer 30, and the convex shape of the dome-shaped mold 301 causes the resilient elements in the laminate composite to move apart from each other, along one or two horizontal axis co-planar with the substrate layers, and along the third vertical axis perpendicular to the substrate layers, stretch gap 19 is created between the resilient elements.

FIG. 49F shows a perspective view of the first dual laminate composite 121 positioned next to the dome-shaped mold 301 for the stretch-operation.

Figure 49B:
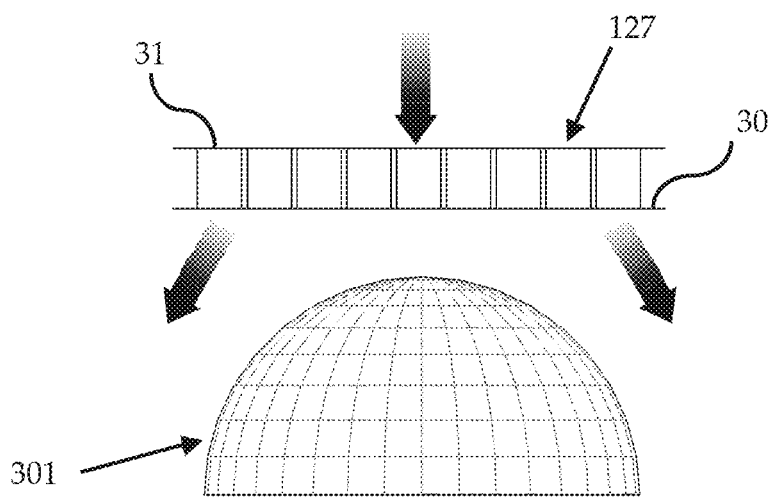
FIG. 49B shows a side view of a dome-shaped mold next to seventh dual laminate composite.
Figure 49C:
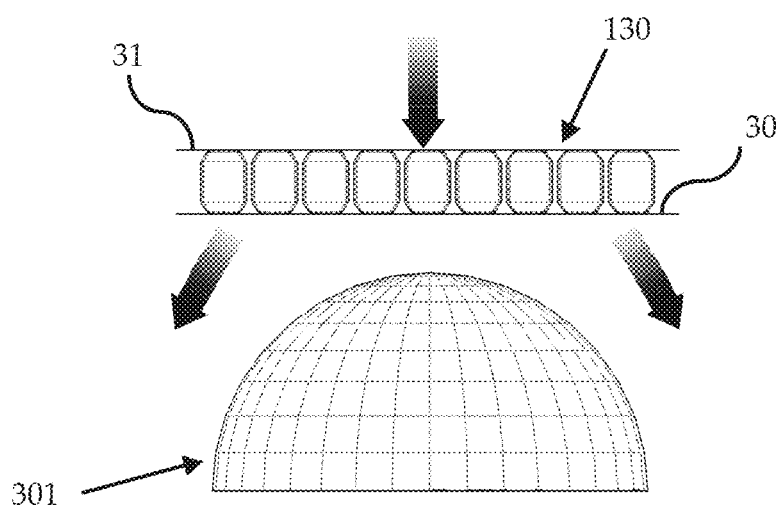

It is understood that a variety of dual laminate composites may be subject to this stretch-operation, including seventh dual laminate composite 127 as shown in FIG. 49B, eighth dual laminate composite 130 as shown in FIG. 49C, and third dual laminate composite 123 as shown in FIG. 49H.

As illustrated in FIGS. 49D-49E, and in FIG. 49G, the stretch-operation using a three-dimensional mold may also be applied to various single laminate composites. FIG. 49D depicts first single laminate composite 101 (which includes a plurality of first resilient elements 15A but does not incorporate a perimetral edge) positioned against dome-shaped mold 301 for the stretch-operation. As shown in FIGS. 49D and 49E, the stretch-operation may be applied to either side of the laminate composite.

FIG. 49G depicts third single laminate composite 103 (which includes a plurality of first resilient elements 15A surrounded by first perimetral edge 17A) positioned against dome-shaped mold 301 for the stretch-operation. It is understood that the three-dimensional mold, when pressed against the laminate composite that incorporates a perimetral edge or other similar edge-framing element, enables the resilient elements in the laminate composite to move apart or away from each other along the third vertical axis perpendicular to the substrate layers.

10. Optional Assembly and Fabrication of Resilient Elements of Different Thickness, Size, or Composition FIGS. 30 through 35 depict optional assembly of composite cushioning materials that incorporate one or more resilient elements of different thicknesses or sizes, different composition, or made of different types of materials in relation to the other resilient elements.

Figure 30:
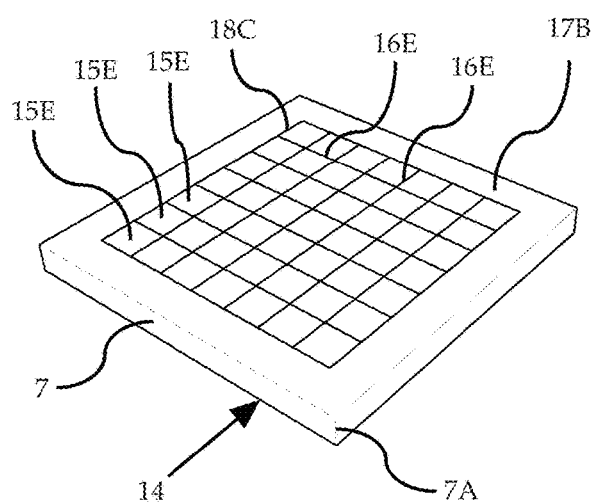
FIG. 30 shows a perspective view of seventh cut material, comprised of second coated material cut to define fifth resilient elements, optionally surrounded by second perimetral edge.

FIG. 30 depicts seventh cut material 14, comprised of second coated material 7 cut along fifth material cutting lines 16E and optionally along third perimetral edge cut line 18C, to define and create a plurality of fifth resilient elements 15E, optionally surrounded by second perimetral edge 17B. The result is seventh cut material 14 depicted in FIG. 30.

Figure 31:
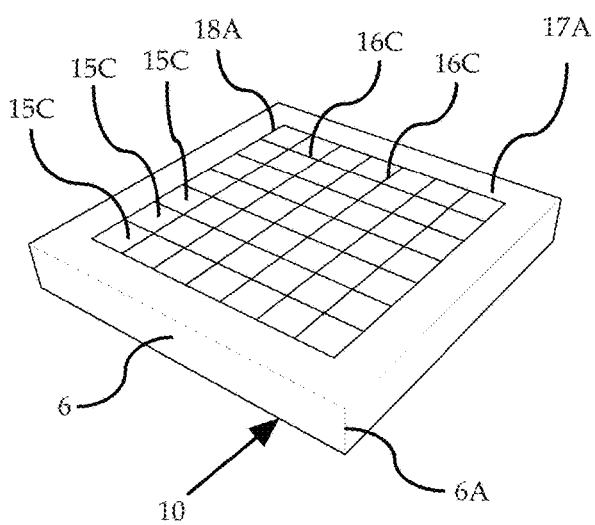
FIG. 31 shows a perspective view of third cut material, comprised of first coated material cut to define third resilient elements, optionally surrounded by first perimetral edge.

FIG. 31 depicts third cut material 10, comprised of first coated material 6 cut along third material cutting lines 16C and optionally along first perimetral edge cut line 18A, to define and create a plurality of third resilient elements 15C, optionally surrounded by first perimetral edge 17A. The result is third cut material 10 depicted in FIG. 31.

In a more preferred embodiment of the invention, thickness 6A of first coated material 6 depicted in FIG. 31 is optionally greater than thickness 7A of second coated material 7 depicted in FIG. 30, and the thickness of third cut material 10 depicted in FIG. 31 is greater than the thickness of seventh cut material 14 depicted in FIG. 30.

Also in a more preferred embodiment of the invention, second coated material 7 and seventh cut material 14 depicted in FIG. 30, and first coated material 6 and third cut material 10 depicted in FIG. 31, are all comprised of EVA foam. Second coated material 7 and seventh cut material 14 depicted in FIG. 30 are optionally comprised of EVA foam of greater density or stiffness relative to first coated material 6 and third cut material 10 depicted in FIG. 31.

However, it is understood that in another alternative and optional embodiment of the invention, second coated material 7 and seventh cut material 14 depicted in FIG. 30 may be comprised of EVA foam or other material of equal or lower density or stiffness relative to first coated material 6 and third cut material 10 depicted in FIG. 31.

In yet another alternative and optional embodiment of the invention, thickness 6A of first coated material 6 may optionally be equal or less than thickness 7A of second coated material 7, and the thickness of third cut material 10 may optionally be equal or less than the thickness of seventh cut material 14.

It is also understood that, optionally and alternatively, first coated material 6 and third cut material 10, on the one hand, and second coated material 7 and seventh cut material 14, on the other hand, may each be comprised of the same or different types of materials. By way of example only, and without limitations, first coated material 6 and third cut material 10, on the one hand, and second coated material 7 and seventh cut material 14, on the other hand, may optionally be comprised of materials that are different in composition, have different functional characteristics or performance parameters (by way of example only, and without limitations, different density, hardness, or compressibility), or have different colors. Alternatively, the coated materials and the cut materials may also be optionally comprised of the same type of material.

In a more preferred embodiment of the invention, at least one instance of fifth resilient element 15E is optionally removed from seventh cut material 14, leaving behind one or more negative space 60 corresponding to the space where resilient elements have been removed from the cut material, as depicted in FIG. 32A.

In another optional embodiment of the invention, at least one instance of third resilient element 15C is optionally removed from third cut material 10, and inserted into negative spaces 60 created by the removal of fifth resilient element 15E from seventh cut material 14, as depicted in FIG. 32B.

FIG. 32C depicts the work piece resulting from the optional replacement of a plurality of fifth resilient element 15E in seventh cut material 14, with third resilient elements 15C optionally taken from third cut material 10. As shown in FIG. 32C, in this optional embodiment, the third resilient elements 15C that are inserted into negative space 60 of seventh cut material 14 are thicker or have greater height or are taller than fifth resilient elements 15E that they replace.

It is understood that any other suitable types or instances of resilient elements may be inserted into negative space 60 of seventh cut material 14, provided that the replacement resilient elements are shaped and dimensioned so that they will fit into negative space 60.

As depicted in FIG. 32D, the work piece (comprised of seventh cut material incorporating at least one instance of third resilient element 15C inserted into one or more negative spaces 60) may be suitably positioned in relation to first substrate layer 30, and laminated or bonded to first substrate layer 30, forming sixth single laminate composite 106.

It is understood that first substrate layer 30 may optionally be laminated or made to bond to fifth resilient elements 15E and third resilient elements 15C in sixth single laminate composite 106 by means of any of the various optional and alternative pressing and heat-pressing methods disclosed in this application, including the various processes disclosed above for lamination of first substrate layer 30 onto various resilient elements or cut materials.

In a more preferred embodiment of the invention, the work piece, comprised of seventh cut material incorporating at least one instance of third resilient element 15C inserted into one or more negative spaces 60, is optionally placed against first substrate layer 30 and the entire assembly is compressed until first substrate layer 30 makes contact with every exposed fifth resilient elements 15E and third resilient elements 15C. It is understood that in one optional aspect of the invention, first substrate layer 30 is placed against the assembly and pressed until third resilient elements 15C are compressed to the point where first substrate layer 30 makes contact with and is compressed against fifth resilient elements 15E, and fifth resilient elements 15E bond to first substrate layer 30.

Optionally, as depicted in FIG. 33, second substrate layer 31 may be laminated or bonded to the exposed fifth resilient elements 15E and third resilient elements 15C in sixth single laminate composite 106, forming fourth dual laminate composite 124.

It is understood that second substrate layer 31 may optionally be laminated or made to bond to fifth resilient elements 15E and third resilient elements 15C in sixth single laminate composite 106 by means of any of the various optional and alternative pressing and heat-pressing methods disclosed in this application, including the various processes disclosed above for lamination of first substrate layer 30 onto various resilient elements or cut materials.

Figure 32E:
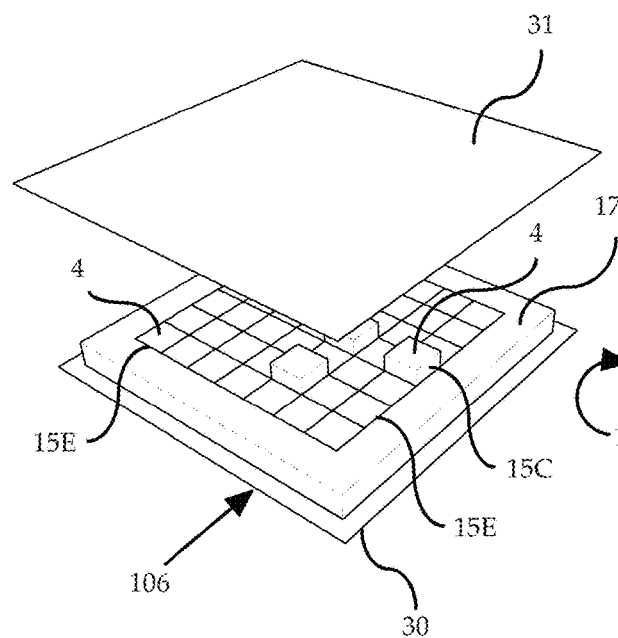
FIG. 32E shows a perspective view of sixth single laminate composite with a second substrate layer positioned above it.

In a more preferred embodiment of the invention, second substrate layer 31 is optionally placed against the exposed side of sixth single laminate composite 106, as depicted in FIG. 32E, and the entire assembly is compressed until second substrate layer 31 makes contact with every exposed fifth resilient elements 15E and third resilient elements 15C in sixth single laminate composite 106. It is understood that in one optional aspect of the invention, second substrate layer 31 is placed against the exposed side of sixth single laminate composite 106, and pressed until third resilient elements 15C are compressed to the point where second substrate layer 31 makes contact with and is compressed against fifth resilient elements 15E, and fifth resilient elements 15E as well as third resilient elements 15C bond to second substrate layer 31.

FIGS. 34A through 34D depict another alternative and optional embodiment of the invention. In this optional embodiment, seventh cut material 14 is pre-positioned next to first substrate layer 30, as depicted in FIG. 34A. At least one instance of fifth resilient element 15E is optionally removed from seventh cut material 14, leaving behind one or more negative space 60 corresponding to the space where resilient elements have been removed from the cut material.

Optionally, at least one instance of third resilient element 15C is removed from third cut material 10, and inserted into negative spaces 60 created by the removal of fifth resilient element 15E from seventh cut material 14, as depicted in FIG. 34B.

As depicted in FIGS. 34B and 34C, the work piece—comprised of seventh cut material incorporating at least one instance of third resilient element 15C inserted into one or more negative spaces 60—is already positioned next to first substrate layer 30, and the substrate layer may be laminated or bonded the exposed resilient elements, forming sixth single laminate composite 106.

Optionally, as depicted in FIGS. 34C and 34D, second substrate layer 31 may be positioned adjacent to the opposite side of the work piece, and laminated or bonded to the exposed fifth resilient elements 15E and third resilient elements 15C in sixth single laminate composite 106, forming fourth dual laminate composite 124. It is understood that second joining element 4 is positioned on the surfaces of fifth resilient elements 15E and third resilient elements 15C facing second substrate layer 31; in a more preferred, optional embodiment of the invention, the surfaces of fifth resilient elements 15E and third resilient elements 15C facing second substrate layer 31 are coated with second joining element 4 in the form of a hot-melt adhesive film.

In an alternative embodiment of the invention, first substrate layer 30 and second substrate layer 31 may be laminated or bonded to the work piece—comprised of seventh cut material incorporating at least one instance of third resilient element 15C inserted into one or more negative spaces 60—in a single pressing or heat pressing operation.

It is understood that first substrate layer 30 and second substrate layer 31 may optionally be laminated or made to bond to fifth resilient elements 15E and third resilient elements 15C in the work piece by means of any of the various optional and alternative pressing and heat-pressing methods disclosed in this application, including the various processes disclosed above for lamination of first substrate layer 30 and second substrate layer 31 onto various resilient elements or cut materials.

FIGS. 34E through 35 depict another alternative and optional embodiment of the invention. In this optional embodiment, seventh cut material 14 is pre-positioned next to first substrate layer 30. At least one instance of fifth resilient element 15E is optionally removed from seventh cut material 14, and replaced with third resilient element 15C, as depicted in FIG. 34E.

Also in this optional embodiment, second perimetral edge 17B is extracted and removed from the work piece, leaving behind a work piece comprised of a plurality of fifth resilient elements 15E and at least one instance of third resilient element 15C arranged in an array. First substrate layer 30 is laminated or bonded to the resilient elements in the work piece, forming seventh single laminate composite 107.

Figure 34G:
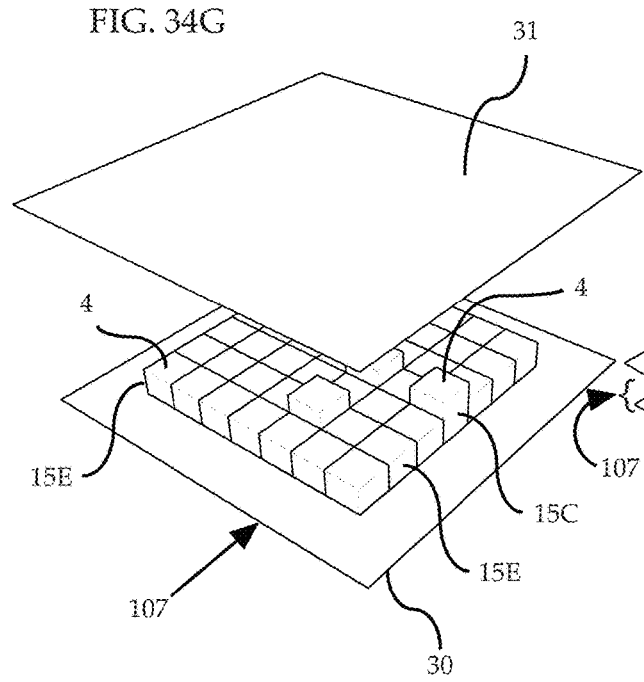
FIG. 34G shows a perspective view of seventh single laminate composite with a second substrate layer positioned above it.

Optionally, as depicted in FIGS. 34G and 35, second substrate layer 31 may be positioned adjacent to the opposite side of the work piece, and laminated or bonded to the exposed fifth resilient elements 15E and third resilient elements 15C in seventh single laminate composite 107, forming fifth dual laminate composite 125.

With respect to this optional embodiment of the invention, it is understood that second joining element 4 is positioned on the surfaces of fifth resilient elements 15E and third resilient elements 15C facing second substrate layer 31; in a more preferred, optional embodiment of the invention, the surfaces of fifth resilient elements 15E and third resilient elements 15C facing second substrate layer 31 are coated with second joining element 4 in the form of a hot-melt adhesive film.

In an alternative embodiment of the invention, first substrate layer 30 and second substrate layer 31 may be laminated or bonded to the work piece in a single pressing or heat pressing operation.

It is understood that first substrate layer 30 and second substrate layer 31 may optionally be laminated or made to bond to fifth resilient elements 15E and third resilient elements 15C in the work piece by means of any of the various optional and alternative pressing and heat-pressing methods disclosed in this application, including the various processes disclosed above for lamination of first substrate layer 30 and second substrate layer 31 onto various resilient elements or cut materials.

FIGS. 30 through 35 depict third resilient elements 15C and fifth resilient elements 15E as square or cubic in shape.

However, it is understood that third resilient elements 15C and fifth resilient elements 15E may optionally be of any suitable shape and dimension, including thickness. It is also understood that one or more resilient elements may optionally include apertures and surround other resilient elements.

FIGS. 72 and 73 depict a non-limiting example of a dual laminate composite material (namely, tenth dual laminate composite 150) that incorporates irregularly shaped resilient elements (namely, irregularly shaped and asymmetrical tenth resilient elements 92, eleventh resilient element 93A, twelfth resilient element 93B, and thirteenth resilient element 93C). FIG. 72 also depicts an optional embodiment of the invention, wherein some of the resilient elements in tenth dual laminate composite 150 (such as eleventh resilient element 93A, twelfth resilient element 93B, and thirteenth resilient element 93C) have apertures and surround other resilient elements (such as tenth resilient elements 92).

FIGS. 74 and 75 depict a non-limiting example of a single laminate composite material (namely, twelfth single laminate composite 160) that incorporates irregularly shaped resilient elements (namely, irregularly shaped and asymmetrical tenth resilient elements 92, eleventh resilient element 93A, twelfth resilient element 93B, and thirteenth resilient element 93C). FIG. 74 also depicts an optional embodiment of the invention, wherein some of the resilient elements in twelfth single laminate composite 160 (such as eleventh resilient element 93A, twelfth resilient element 93B, and thirteenth resilient element 93C) have apertures and surround other resilient elements (such as tenth resilient elements 92).

11. Optional Assembly of Arrays of Resilient Elements that are Spaced Apart in Relation to Each Other FIGS. 40A through 43B depict optional assembly of composite cushioning materials that incorporate a plurality of resilient elements that are spaced apart in relation to each other.

Initially, and for comparison purposes, FIG. 40A and FIGS. 41A, 40C, and 40D depict optional embodiments of single laminate composite and double laminate composite materials, in which the resilient elements are not spaced apart in relation to each other, and are positioned so that the resilient elements substantially contact each other along the material cutting lines.

FIG. 40A depicts a single laminate composite, in this case first single laminate composite 101, comprised of a plurality of first resilient elements 15A, bonded or made to adhere to first substrate layer 30 by means of first joining element 3. It is understood that a plurality of first resilient elements 15A may be formed by cutting first coated material 6 along first material cutting lines 16A, as depicted in FIG. 4A. It is also understood that in this optional embodiment of the invention, as depicted in FIG. 40A, first resilient elements 15A are not spaced apart in relation to each other, and are positioned so that the resilient elements substantially contact each other along first material cutting lines 16A.

FIG. 41A depicts a double laminate composite, in this case first dual laminate composite 121, comprised of a plurality of first resilient elements 15A, bonded or made to adhere to first substrate layer 30 by means of first joining element 3, and to second substrate layer 31 by means of another joining element (such as, by way of example only, second joining element 4 positioned between first resilient elements 15A and second substrate layer 31). It is understood that a plurality of first resilient elements 15A may be formed by cutting first coated material 6 along first material cutting lines 16A, as depicted in FIG. 4A. It is also understood that in this optional embodiment of the invention, as depicted in FIG. 41A and in the partial cutaway view in FIG. 40C, first resilient elements 15A are not spaced apart in relation to each other, and are positioned so that the resilient elements substantially contact each other along first material cutting lines 16A.

FIG. 40B depicts an alternative and optional embodiment of the invention, namely, eighth single laminate composite 108, comprised of a plurality of sixth resilient elements 15F, bonded or made to adhere to first substrate layer 30 by means of first joining element 3. It is understood that in this optional embodiment of the invention, as depicted in FIG. 40B, sixth resilient elements 15F are spaced apart in relation to each other, and separated from one another by spacing 61.

FIG. 41B depicts another alternative and optional embodiment of the invention, namely, seventh dual laminate composite 127, comprised of a plurality of sixth resilient elements 15F, bonded or made to adhere to first substrate layer 30 by means of first joining element 3, and to second substrate layer 31 by means of another joining element (such as, by way of example only, second joining element 4 positioned between sixth resilient elements 15F and second substrate layer 31). It is understood that in this optional embodiment of the invention, as depicted in the partial cutaway view in FIG. 41C and in the side view in FIG. 41D, sixth resilient elements 15F are spaced apart in relation to each other, and separated from one another by spacing 61.

It is understood that, for certain applications, it may be desirable to optionally position the resilient elements spaced apart from each other, separated by spacing 61, in order to increase the flexibility and stretchability of the entire assembly, to make it more compressible along the horizontal plane, to bend or impart a different shape to the entire assembly, to make it more breathable, to increase the circulation of gases and vapors between the resilient elements, or for other related or similar purposes.

In a more preferred embodiment of the invention, spacing 61 is created by shrinking the size of the resilient elements after they have been cut from a coated material along suitable material cutting lines, by applying heat, pressure, or heat and pressure to the resilient elements. Optionally, the process of shrinking the size of the resilient elements so as to create spacing 61 may be carried out during or after the process of laminating or bonding the resilient elements to first substrate layer 30 or second substrate layer 31.

In this optional embodiment of the invention, as an initial step, a suitable resilient material (such as, by way of example only, first resilient material 1 or second resilient material 2) that shrinks when exposed to heat, compressed, or both is selected, and the selected resilient material is used to fabricate a coated material (such as, by way of example only, first coated material 6 or second coated material 7 depicted in FIGS. 3A and 3B). It is understood a broad range and a wide variety of materials may be considered and selected for this purpose, as long as the selected material has the tendency to shrink when heated, compressed, or heated and compressed. It is also understood that, optionally, a combination of materials (such as sheets of two different types of materials glued to each other) may also be considered and selected for this purpose. By way of example only, and without limitations, a resilient material or a combination of resilient materials may be selected based on the extent to which the materials shrink when exposed to heat, the amount of thermal energy and the temperatures required to trigger shrinkage, their sensitivity to heat and their melting points, the heat exposure time required to trigger shrinkage, the manner in which the material shrinks in three dimensions, and the duration and persistence of the shrinkage, among other things.

In a more preferred embodiment of the invention, a suitable resilient material comprised of EVA foam may be used to fabricate a suitable coated material, such as, by way of example only, first coated material 6 or second coated material 7.

A plurality of resilient elements, such as, by way of example only, first resilient elements 15A, is formed by cutting first coated material 6 along first material cutting lines 16A, as depicted in FIG. 4A.

As depicted in FIG. 40A, a substrate layer (such as, by way of example only, first substrate layer 30) is placed next to the plurality of first resilient elements 15A, and bonded or made to adhere to the resilient elements, by means of first joining element 3.

In an alternative and optional embodiment of the invention, as depicted in FIG. 41A, two substrate layers (such as, by way of example only, first substrate layer 30 and second substrate layer 31) are placed next to the plurality of first resilient elements 15A, in opposing sides, so that the resilient elements are "sandwiched" between the two substrate layers. The two substrate layers are bonded or made to adhere to the resilient elements, by means of joining elements (such as first joining element 3 and second joining element 4).

In a more preferred embodiment of the invention, one or more substrate layers (such as, by way of example only, first substrate layer 30 and second substrate layer 31) are laminated or made to bond with the resilient elements (such as, by way of example only, first resilient elements 15A depicted in FIGS. 40A and 41A) by means of any of the various optional and alternative pressing and heat-pressing methods disclosed in this application, including the various processes disclosed above for lamination of first substrate layer 30 and second substrate layer 31 onto various resilient elements or cut materials.

Figure 23B:
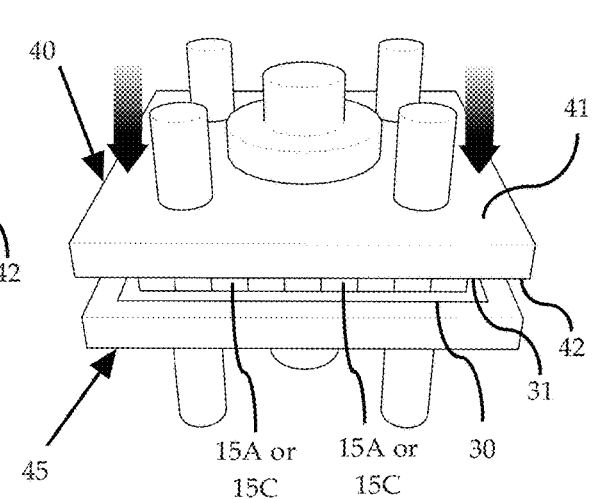
FIG. 23B shows a side perspective view of FIG. 23A

In this optional embodiment of the invention, heat, pressure, or both may be applied to the entire assembly and delivered to the resilient elements (such as, by way of example only, first resilient elements 15A) in the course of the lamination operation, by means of heating element 42 optionally included in pressure platen 40, in a manner similar to that depicted in FIG. 19 or 23B.

Also in this optional embodiment of the invention, the application of heat, pressure, or both causes the resilient elements (such as, by way of example only, first resilient elements 15A) to shrink, forming sixth resilient elements 15F depicted in FIGS. 40B and 41B. As the resilient elements shrink, spacing 61 is created between them. It is understood that eighth single laminate composite 108 and seventh dual laminate composite 127 may be created with the spaced-apart sixth resilient elements 15F, as depicted in FIG. 40B and FIG. 41B, respectively.

It is also understood that heat, pressure, or both may optionally be applied selectively, to only some of the resilient elements, in order to cause shrinkage in some of the resilient elements but not in others, so that only a subset of the resilient elements are separated from each other by spacing 61.

It is further understood that heat, pressure, or both may be applied to the resilient elements after the pressing or heat pressing lamination process has been completed, in order to cause shrinkage in some or all of the resilient elements, and to create spacing 61.

In this optional embodiment of the invention, it is understood that the degree of shrinkage of the resilient elements (such as, by way of example only, first resilient elements 15A), and the size, shape, and dimensions of the resulting sixth resilient elements 15F, and the size and shape of spacing 61, may optionally vary and be affected by the selection of the resilient materials and the composition of the same, the starting shapes and sizes of the resilient elements, the amount of heat and pressure applied during the lamination process, the duration of the heat and pressure application, and the like, among other things.

Figure 40C:
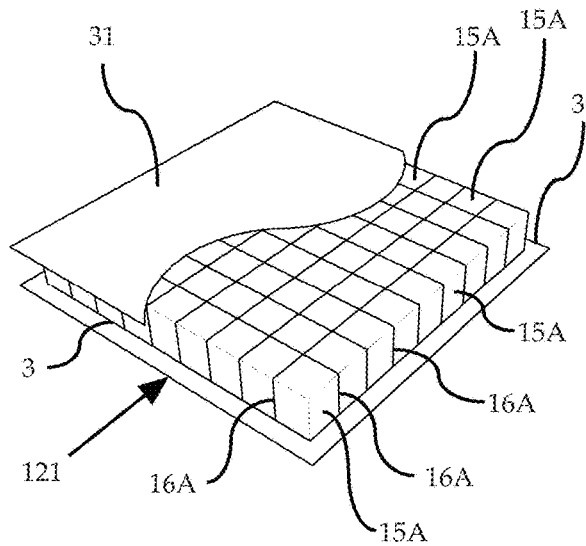
FIG. 40C shows a perspective cutaway view of first dual laminate composite with a plurality of first resilient elements.
Figure 40D:
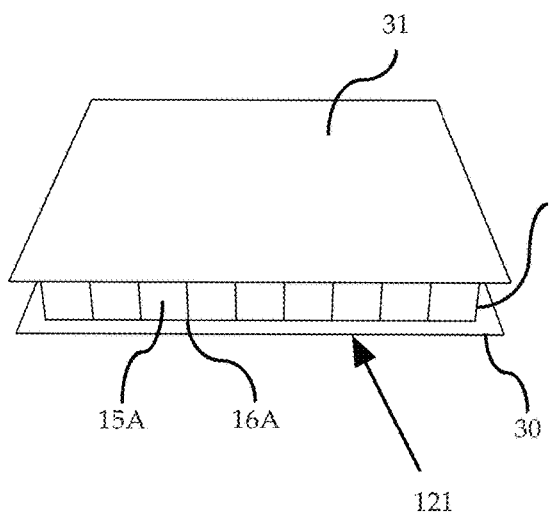
FIG. 40D shows a side perspective view of first dual laminate composite with a plurality of first resilient elements.
Figure 40E:
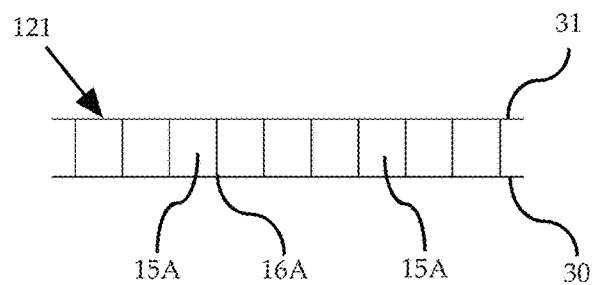
FIG. 40E shows a side view of first dual laminate composite with a plurality of first resilient elements.

By way of example only, and for purposes of comparison, FIG. 40E depicts a side view of first dual laminate composite 121, comprised of a plurality of first resilient elements 15A positioned adjacent to each other, along first material cutting lines 16A, "sandwiched" between and bonded to first substrate layer 30 and second substrate layer 31.

As depicted in FIG. 41E, seventh dual laminate composite 127 may be formed by applying heat, pressure, or both to the assembly comprising first dual laminate composite 121. Heat, pressure, or both may optionally be applied to the assembly during or after the lamination of first substrate layer 30 or second substrate layer 31 to first resilient elements 15A. The application of heat, pressure, or both to the resilient elements causes first resilient elements 15A to shrink, and form sixth resilient elements 15F, separated from one another by spacing 61.

As depicted in FIG. 41F, it is understood that by selecting a suitable composition for first resilient elements 15A, and applying a suitable amount of heat and pressure to the same over a suitable period of time, first resilient elements 15A may shrink in a non-uniform manner, and form seventh resilient elements 15G, separated from one another by spacing 61, as shown in the side view in FIG. 41F.

By way of example only, and without limitations, FIGS. 45A through 45D depict, as non-limiting examples, varying degrees or extent of shrinkage that may be caused on or induced in a non-contracted resilient element 80 (which may be, by way of example only, first resilient element 15A, second resilient element 15B, third resilient element 15C, fourth resilient element 15D, and the like) through application of heat, pressure, or both.

Figure 45A:
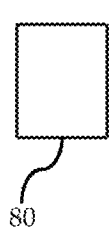
FIG. 45A shows a side view of non-contracted resilient element.
Figure 45B:
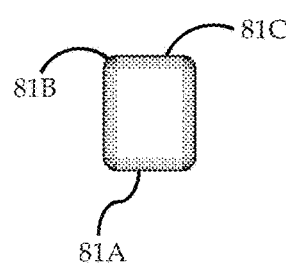
FIG. 45B shows a side view of first alternative resilient element.
Figure 45C:
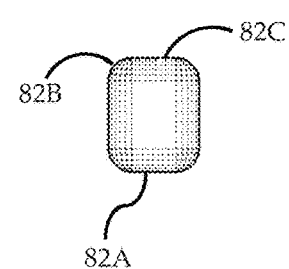
FIG. 45C shows a side view of second alternative resilient element.
Figure 45D:
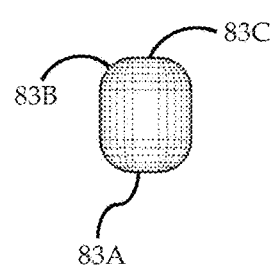
FIG. 45D shows a side view of third alternative resilient element.

FIG. 45A depicts a side view of non-contracted resilient element 80 prior to the application of heat, pressure, or both. By optionally applying heat and pressure, and optionally increasing the temperature or the exposure time, non-contracted resilient element 80 may optionally be caused to shrink non-uniformly, forming first alternative resilient element 81A, second alternative resilient element 82A, and third alternative resilient element 83A, depicted in FIGS. 45B through 45D, respectively. In this optional embodiment of the invention, directed application of heat to the top and bottom surfaces of non-contracted resilient element 80 optionally causes non-uniform shrinkage of the resilient material, resulting in shrunk top side 81C, shrunk top side 82C, and shrunk top side 83C, and increasing curvature 81B, curvature 82B, and curvature 83B.

It is understood that the degree and manner of non-uniform shrinkage of the resilient elements (such as, by way of example only, first resilient elements 15A), and the size, shape, and dimensions of the resulting "shrunk" resilient elements, and the size and shape of spacing 61, may optionally vary and be affected by the selection of the resilient materials and the composition of the same, the starting shapes and sizes of the resilient elements, the amount of heat and pressure applied to the assembly, the duration of the heat and pressure application, and the like, among other things.

As a non-limiting example, and without limitations, FIGS. 46A through 46D depict, as non-limiting examples, varying types of shrinkage that may be caused on or induced in non-contracted resilient element 80 (which may be, by way of example only, first resilient element 15A, second resilient element 15B, third resilient element 15C, fourth resilient element 15D, and the like) through application of heat, pressure, or both.

Figure 46A:
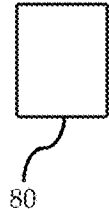
FIG. 46A shows a side view of non-contracted resilient element.
Figure 46B:
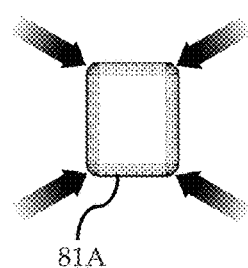
FIG. 46B shows a side view of first alternative resilient element.
Figure 46C:
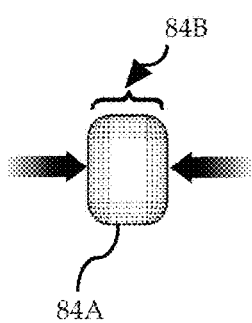
FIG. 46C shows a side view of fourth alternative resilient element.
Figure 46D:
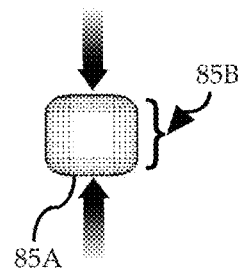
FIG. 46D shows a side view of fifth alternative resilient element.

FIG. 46A depicts a side view of non-contracted resilient element 80. By optionally applying heat and pressure, and optionally increasing the temperature, timing the increase in temperature, and the exposure time to heat and pressure, non-contracted resilient element 80 may optionally be caused to shrink non-uniformly in the direction of the arrows shown in FIGS. 46B through 46D, forming first alternative resilient element 81A, fourth alternative resilient element 84A, and fifth alternative resilient element 85A depicted in FIGS. 46B through 46D, respectively. By way of example only, in this optional embodiment of the invention, shrinkage may occur to a varying degree along shrinkage axis 84B and shrinkage axis 85B, depicted in FIGS. 46C and 46D, respectively.

FIG. 40A and FIGS. 41A, 41C, and 40D depict resilient elements (such as, by way of example only, first resilient element 15A) that regular and cubic in shape prior to the application of heat or pressure to the same. However, it is understood that the resilient elements may optionally have irregular or asymmetrical shapes before heat or pressure is applied to them.

As a non-limiting example, FIG. 42A depicts fourth single laminate composite 104, comprised of fifth cut material 12 depicted in FIG. 4E, placed adjacent to first substrate layer 30 and laminated to the same. As depicted in FIG. 42A, fourth single laminate composite 104 includes a plurality of interrelated fourth resilient elements 15D cut along and defined by fourth material cutting lines 16D, and surrounded by second perimetral edge 17B, which is cut along and defined by second perimetral edge cut line 18B.

As another non-limiting example, FIG. 43A depicts fifth single laminate composite 105, comprised of sixth cut material 13 depicted in FIG. 4F, placed adjacent to first substrate layer 30 and laminated to the same. As depicted in FIG. 43A, fifth single laminate composite 105 includes a plurality of interrelated fourth resilient elements 15D cut along and defined by fourth material cutting lines 16D.

As depicted in FIGS. 42A and 43A, the plurality of interrelated fourth resilient elements 15D incorporated into fourth single laminate composite 104 and fifth single laminate composite 105, respectively, have irregular or asymmetrical shapes. However, in both fourth single laminate composite 104 and fifth single laminate composite 105, fourth resilient elements 15D are positioned in close proximity, and adjacent, to each other, without gaps or spaces between them.

However, it is understood that in an alternative and optional embodiment of the invention, heat, pressure, or both may be applied to the assembled components in fourth single laminate composite 104, thereby shrinking some or all of fourth resilient elements 15D, and optionally shrinking second perimetral edge 17B, and creating gaps or spaces between them, as depicted in FIG. 42B.

FIG. 42B depicts ninth single laminate composite 109, formed by optionally applying heat, pressure, or both to the assembled components of fourth single laminate composite 104, either during or after the lamination of first substrate layer 30. By means of heat, pressure, or both, the interrelated fourth resilient elements 15D may be shrunken, forming eighth resilient elements 15H, separated from each other by spacing 62. By means of heat, pressure, or both, second perimetral edge 17B may be shrunken, forming third perimetral edge 17C, separated from the plurality of eighth resilient elements 15H by spacing 63.

It is also understood that in another alternative and optional embodiment of the invention, heat, pressure, or both may be applied to the assembled components in fifth single laminate composite 105, thereby shrinking some or all of fourth resilient elements 15D, and creating gaps or spaces between them, as depicted in FIG. 43B.

FIG. 43B depicts tenth single laminate composite 110, formed by optionally applying heat, pressure, or both to the assembled components of fifth single laminate composite 105, either during or after the lamination of first substrate layer 30. By means of heat, pressure, or both, the interrelated fourth resilient elements 15D may be shrunken, forming eighth resilient elements 15H, separated from each other by spacing 62.

12. Optional Use of Perimetral Edge Elements of Various Shapes

In the third single laminate composite 103 depicted in FIG. 10C, fourth single laminate composite 104 depicted in FIG. 42A, sixth single laminate composite 106 depicted in FIG. 32D, and ninth single laminate composite 109 depicted in FIG. 42B, the perimetral edge elements are depicted as surrounding the outer-most perimeter of a plurality resilient elements in a cut material consisting of all resilient elements.

For example, FIG. 47A depicts the top view of third single laminate composite 103, which includes the third cut material 10 comprised of a plurality of third resilient elements 15C (cut along third material cutting lines 16C), surrounded by first perimetral edge 17A.

However, it is understood that the perimetral edge elements may have any suitable shape and size. Optionally, perimetral edge elements may surround only a subset of resilient elements in a cut material, or even a single resilient element in the cut material.

By way of example, FIG. 47B depicts an alternative embodiment of the invention including a variation of third cut material 10, wherein the perimetral edge element 17S surrounds three separate subsets or "clusters" of resilient elements 15T, and each subset or "cluster" is comprised of a plurality of resilient elements 15S (cut along and shaped by material cutting line 16S). As depicted in FIG. 47B, perimetral edge element 17S incorporates closed loop extensions 17T that surround a discrete plurality of resilient elements.

FIG. 47C depicts another alternative and optional variation of third cut material 10, wherein a perimetral edge element 17U (shaped like a matrix or "web") includes a plurality of apertures that engage each resilient element 15U (cut along and shaped by material cutting line 16U) in the cut material.

The variation of third cut material 10 depicted in FIG. 47C may be heated and pressed, or heat-pressed, either by itself or after being positioned adjacent to a substrate layer (such as first substrate layer 30, second substrate layer 31, or alternative substrate layer 32). The application of heat, pressure, or both causes the resilient element 15U, the perimetral edge element 17U, or both of them to shrink, forming contracted resilient elements 15V and contracted perimetral edge element 17V as depicted in FIG. 47D. The shrinkage of the resilient elements and/or perimetral edge element causes spacing 19V to be created along or between the abutting edges of the resilient elements and the perimetral edge element, as shown in FIG. 47D.

The size of the spacing 19V may be controlled, for example, by varying the amount and timing of the heat and/or pressure applied to the assembly, by varying the thickness of the material, and by selecting materials of suitable density and sensitivity to heat-shrinkage, among other things, for the resilient elements and the perimetral edge element. It is understood that by varying these and other variables known to those having ordinary skill in the art, it is possible to control the degree of material deformation or shrinkage of the components in the assembly, such as the degree of shrinkage 17X in the perimetral edge element 17U (resulting in contracted perimetral edge element 17V), and the degree of shrinkage in the resilient element 15U (resulting in contracted resilient elements 15V).

For example, as shown by example in FIG. 47E, by selecting a type of material that is denser and/or less susceptible to shrinkage when exposed to heat for the perimetral edge element 17U (that is, in relation to resilient element 15U), it is possible to reduce the amount of shrinkage 17Z in the resulting contracted perimetral edge element 17Y, in comparison to the amount of shrinkage in the contracted resilient elements 15Y. As illustrated in FIG. 47E, this results in smaller gap, or spacing 19Y, between the resilient elements and the perimetral edge.

Figure 48A:
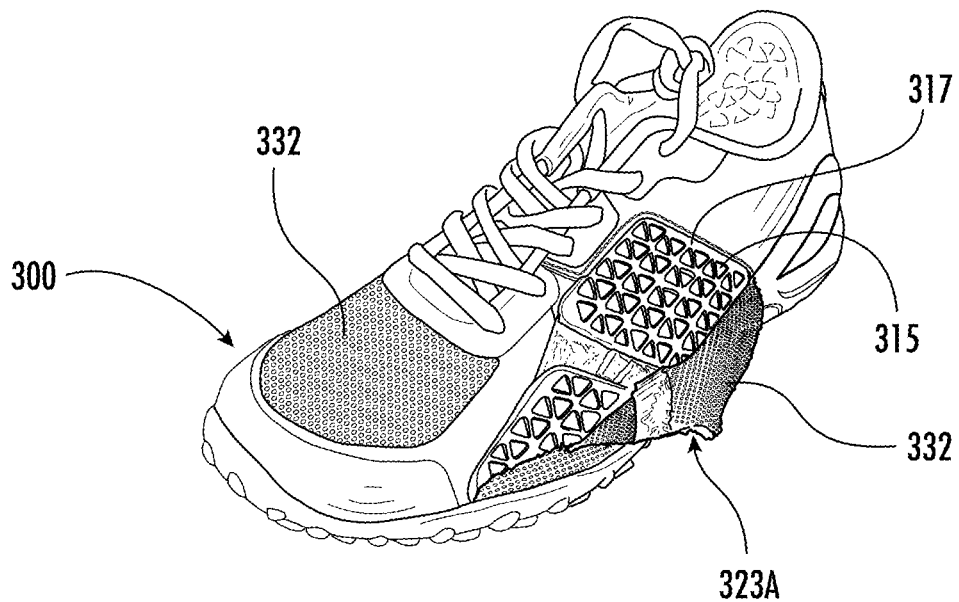
FIG. 48A shows a picture of an article of footwear.
Figure 48B:
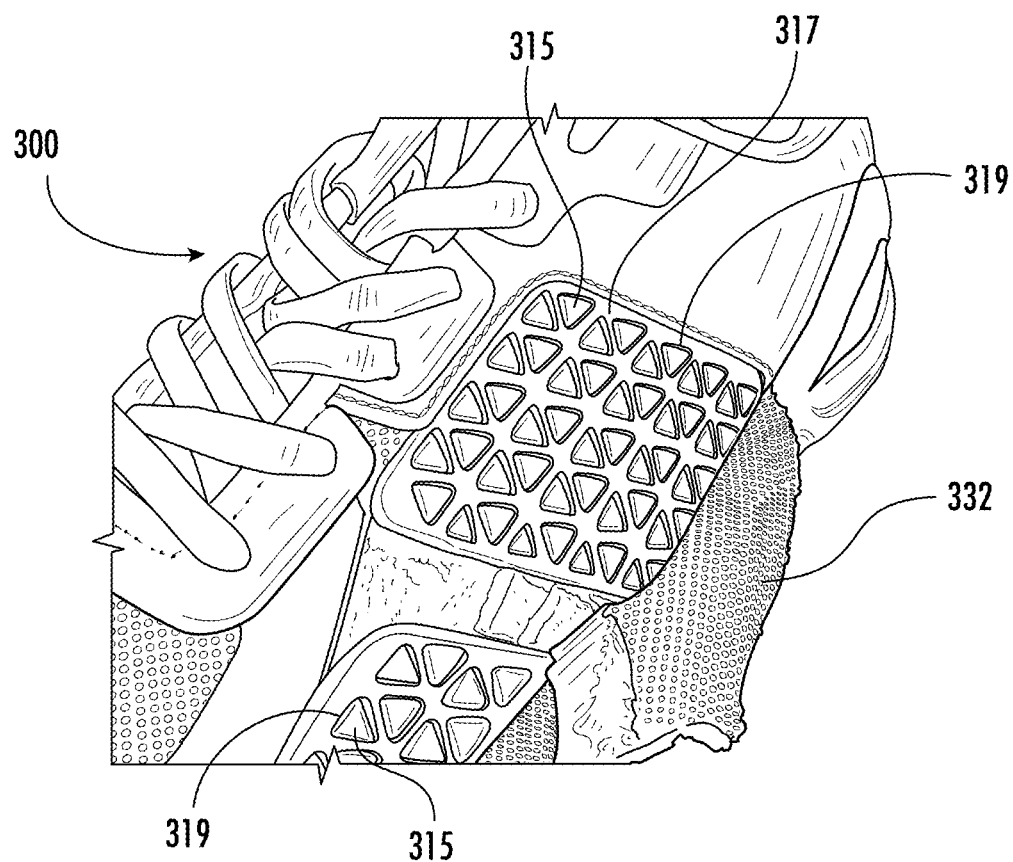
FIG. 48B shows a picture of an article of footwear.

FIGS. 48A and 48B depict an article of footwear 300 that incorporates a dual laminate composite 323A in its sidewall. The dual laminate composite includes an inner substrate layer (not shown) that functions as the inner lining for the shoe; an outer substrate layer 332 (comprising an open mesh material, shown "peeled off" from the assembly so as to expose the internal structure of the dual laminate composite), and a plurality of triangular resilient elements 315, engaged to a "cage-like" perforated perimetral edge elements 317. There is a spacing 319 between the resilient elements and the apertures in the perforated perimetral edge elements, which makes the dual laminate composite (and thus the article of footwear that incorporates it) relatively more flexible, breathable, and lightweight.

Optional Cutting of Composite Cushioning Materials, and Manufacture of Articles and Components from the Same In another optional aspect of the invention, the various single and dual composite laminate materials, such as, by way of example only, single laminate composite 100 and variations thereof disclosed in this application, and dual laminate composite 120 and variations thereof disclosed in this application, may be used as cushioning component in footwear, as protective padding, or as components in athletic or industrial protective gear.

The various single and dual composite laminate materials may also be optionally cut into other suitable shapes, for use as, by way of example only, and without limitations, shoe insoles or footwear sockliners, or as cushioning components or protective padding components in athletic or industrial protective gear.

By way of introduction, FIGS. 50A and 50B, and FIGS. 53A and 53B, generally depict the optional cutting and processing of dual laminate composites, and the manufacture of useful article and components therefor from such dual laminate composite materials.

FIGS. 54A and 54B generally depict the optional cutting and processing of dual laminate composites with gaps or spacing between the resilient elements, and the manufacture of useful article and components therefor from such dual laminate composite materials.

Figure 51B:
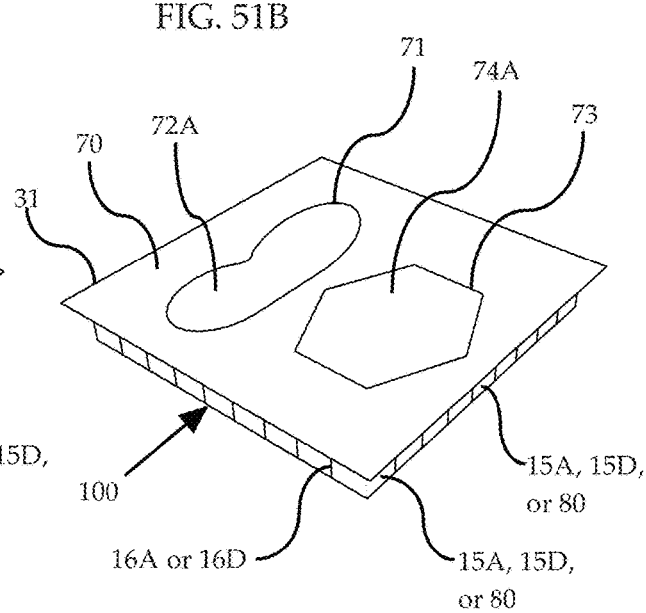

FIGS. 51A and 51B generally depict the optional cutting and processing of single laminate composites, and the manufacture of useful article and components therefor from such single laminate composite materials.

FIGS. 55A and 55B generally depict optional cutting and processing of single laminate composites that incorporate spaced-apart resilient elements, and the manufacture of article and components therefor from such single laminate composite materials.

FIGS. 60 through 79 generally depict optional assembly and manufacture of single and dual laminate composites materials incorporating asymmetrical resilient elements of different thicknesses, and the cutting and processing of single laminate composites for the manufacture of a footwear sockliner incorporating resilient elements that may be made of different materials and may have different thicknesses.

FIG. 50A depicts dual laminate composite 120. It is understood that in the alternative and optional embodiment of the invention as depicted in FIG. 50A, dual laminate composite 120 may incorporate different types of resilient materials, such as first resilient elements 15A cut and defined along first material cutting lines 16A, or fourth resilient elements 15D cut and defined along fourth material cutting lines 16D; alternatively, dual laminate composite 120 may also incorporate non-contracted resilient element 80 depicted in FIGS. 45A and 46A, or any optional variations of the same (such as first alternative resilient element 81A, second alternative resilient element 82A, and third alternative resilient element 83A depicted in FIGS. 45B through 45D, respectively; and fourth alternative resilient element 84A, and fifth alternative resilient element 85A depicted in FIGS. 46C through 46D, respectively). It is also understood that in this alternative embodiment of the invention, the resilient elements are "sandwiched" by, and laminated or bonded to, two substrate layers, namely, first substrate layer 30 and second substrate layer 31.

Figure 50B:
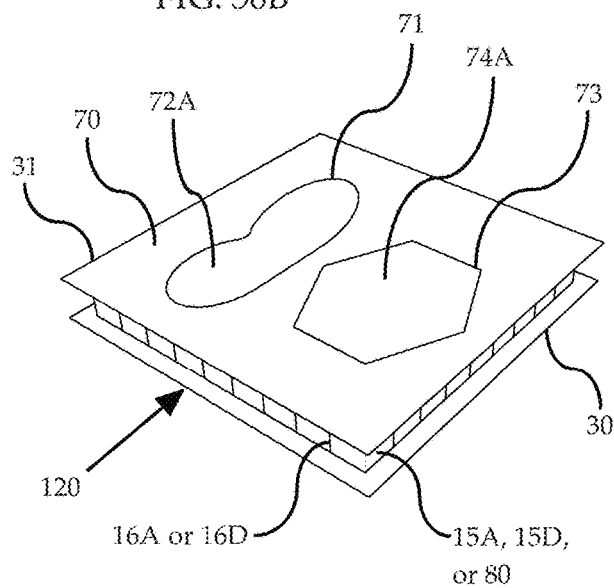

As depicted in FIG. 50B, by way of example only, and without limitations, dual laminate composite 120 is optionally cut through the composite material, along sockliner outline cutting line 71, in the process defining and separating sockliner top surface 72A from laminate composite surface 70. Also optionally, dual laminate composite 120 is cut through the composite material, along pad component outline cutting line 73, in the process defining and separating pad component top surface 74A from laminate composite surface 70. It is understood that in this embodiment of the invention, dual laminate composite 120 is cut completely through along the outline cutting lines, from second substrate layer 31 to first substrate layer 30.

As depicted in FIG. 53A, the portion of dual laminate composite 120 cut along sockliner outline cutting line 71, and defined by the same, may optionally be removed from dual laminate composite 120, leaving behind negative space 77 and forming first dual laminate sockliner 120A. Also optionally, the portion of dual laminate composite 120 cut along pad component outline cutting line 73, and defined by the same, may optionally be removed from dual laminate composite 120, leaving behind negative space 78 and forming first dual laminate padding 120B. It is understood that in this optional embodiment of the invention, first dual laminate sockliner 120A is laminated on sockliner top surface 72A with second substrate layer 31, and on sockliner bottom surface 72B with first substrate layer 30, and that first dual laminate padding 120B is laminated on pad component top surface 74A with second substrate layer 31, and on pad component bottom surface 74B with first substrate layer 30.

Figure 53B:
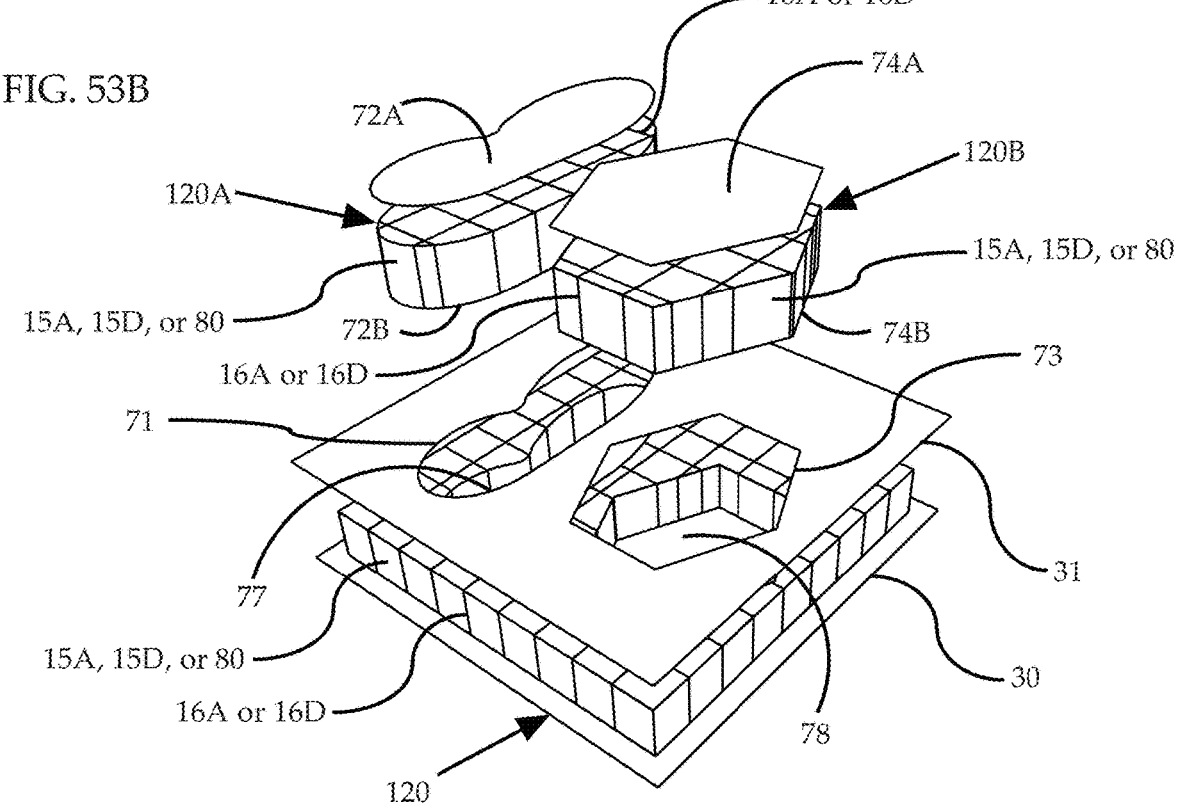

FIG. 53B depicts an exploded view of first dual laminate sockliner 120A and first dual laminate padding 120B, formed by cutting dual laminate composite 120 through, along sockliner outline cutting line 71, and pad component outline cutting line 73. It is understood that in this embodiment of the invention, the resilient elements (namely, first resilient elements 15A, fourth resilient elements 15D, and non-contracted resilient element 80 and variations thereof) are positioned adjacent to each other, substantially without gaps or spacing between them.

FIGS. 54A and 54B depict another alternative and optional embodiment of the invention, wherein heat, pressure, or both is applied to the assembled components of dual laminate composite 120, and the resilient elements therein (such as, by way of example only, first resilient elements 15A, fourth resilient elements 15D, or non-contracted resilient elements 80) are heated, compressed, or both, either during or after the process of laminating second substrate layer 31 to the resilient elements, by means of heating element 42 optionally included in pressure platen 40, in a manner similar to that depicted in FIG. 19 or 23B.

In this optional embodiment of the invention, the application of heat, pressure, or both optionally causes the resilient elements in double laminate composite 120 to shrink, forming sixth dual laminate composite 126, comprised of sixth resilient elements 15F, seventh resilient elements 15G, or first alternative resilient element 81A, separated from each other by spacing 61 or 62. It is understood that by selecting a suitable composition and starting shapes and sizes for the resilient materials, the amount of heat and pressure applied to the assembly, the duration of the heat and pressure application, and the like, among other things, the resilient elements may be made to shrink at different rates or in a non-uniform manner, forming, by way of example only, second alternative resilient element 82A or third alternative resilient element 83A, depicted in FIGS. 45B through 45D, or fourth alternative resilient element 84A or fifth alternative resilient element 85A, depicted in FIGS. 46C and 46D, and creating spacing 61 or 62 between the resilient elements.

As depicted in FIG. 54A, sixth dual laminate composite 126 is cut through and along sockliner outline cutting line 71, and pad component outline cutting line 73, forming second dual laminate sockliner 126A, and second dual laminate padding 126B. It is understood that in this optional embodiment of the invention, second dual laminate sockliner 126A is laminated on sockliner top surface 72A with second substrate layer 31, and that second dual laminate padding 126B is laminated on pad component top surface 74A with second substrate layer 31.

FIG. 54B depicts an exploded view of second dual laminate sockliner 126A, and second dual laminate padding 126B, formed by sixth dual laminate composite 126 through, along sockliner outline cutting line 71 and along pad component outline cutting line 73. It is understood that in this optional embodiment of the invention, the resilient elements (namely, sixth resilient elements 15F, seventh resilient elements 15G, or first alternative resilient element 81A, or other variations of the same) are separate from each other by spacing 61 or 62, as depicted in FIG. 54B.

FIG. 51A depicts single laminate composite 100. It is understood that in the alternative and optional embodiment of the invention as depicted in FIG. 51A, single laminate composite 100 may incorporate different types of resilient materials, such as first resilient elements 15A cut and defined along first material cutting lines 16A, or fourth resilient elements 15D cut and defined along fourth material cutting lines 16D; alternatively, single laminate composite 100 may also incorporate non-contracted resilient element 80 depicted in FIGS. 45A and 46A, or any optional variations of the same (such as first alternative resilient element 81A, second alternative resilient element 82A, and third alternative resilient element 83A depicted in FIGS. 45B through 45D, respectively; and fourth alternative resilient element 84A, and fifth alternative resilient element 85A depicted in FIGS. 46C through 46D, respectively). It is also understood that in this alternative embodiment of the invention, the resilient elements are laminated or bonded to a single substrate layer, namely, first substrate layer 30.

As depicted in FIG. 51B, by way of example only, and without limitations, single laminate composite 100 may optionally be cut through the composite material, along sockliner outline cutting line 71, in the process defining and separating sockliner top surface 72A from laminate composite surface 70. Also optionally, single laminate composite 100 may be cut through the composite material, along pad component outline cutting line 73, in the process defining and separating pad component top surface 74A from laminate composite surface 70. It is understood that in this embodiment of the invention, single laminate composite 100 is cut completely through along the outline cutting lines, from second substrate layer 31 to the opposite end of the resilient material.

It is understood that the portion of single laminate composite 100 cut through along sockliner outline cutting line 71, and defined by the same, may optionally be removed from single laminate composite 100, to form a footwear sockliner laminated only on one side with second substrate layer 31. Also optionally, the portion of single laminate composite 100 cut through along pad component outline cutting line 73, and defined by the same, may optionally be removed from single laminate composite 100, to form a pad component which shape is defined by pad component outline cutting line 73, and which is laminated only on one side with second substrate layer 31.

FIGS. 55A and 55B depict another alternative and optional embodiment of the invention, wherein heat, pressure, or both is applied to the assembled components of single laminate composite 100, and the resilient elements therein (such as, by way of example only, first resilient elements 15A, fourth resilient elements 15D, or non-contracted resilient elements 80) are heated, compressed, or both, either during or after the process of laminating second substrate layer 31 to the resilient elements, by means of heating element 42 optionally included in pressure platen 40, in a manner similar to that depicted in FIG. 19 or 23B.

In this optional embodiment of the invention, the application of heat, pressure, or both optionally causes the resilient elements in single laminate composite 100 to shrink, forming eleventh single laminate composite 140, comprised of sixth resilient elements 15F, seventh resilient elements 15G, or first alternative resilient element 81A, separated from each other by spacing 61 or 62. It is understood that by selecting a suitable composition and starting shapes and sizes for the resilient materials, the amount of heat and pressure applied to the assembly, the duration of the heat and pressure application, and the like, among other things, the resilient elements may be made to shrink at different rates or in a non-uniform manner, forming, by way of example only, second alternative resilient element 82A or third alternative resilient element 83A, depicted in FIGS. 45B through 45D, or fourth alternative resilient element 84A or fifth alternative resilient element 85A, depicted in FIGS. 46C and 46D, and creating spacing 61 or 62 between the resilient elements.

As depicted in FIG. 55A, eleventh single laminate composite 140 is cut through and along sockliner outline cutting line 71, and pad component outline cutting line 73, forming first single laminate sockliner 140A, and first single laminate padding 140B. It is understood that in this optional embodiment of the invention, first single laminate sockliner 140A is laminated on sockliner top surface 72A with second substrate layer 31, and that first single laminate padding 140B is laminated on pad component top surface 74A with second substrate layer 31.

FIG. 55B depicts an exploded view of first single laminate sockliner 140A, and first single laminate padding 140B, formed by cutting eleventh single laminate composite 140 through, along sockliner outline cutting line 71 and along pad component outline cutting line 73. It is understood that in this optional embodiment of the invention, the resilient elements (namely, sixth resilient elements 15F, seventh resilient elements 15G, or first alternative resilient element 81A, or other variations of the same) are separate from each other by spacing 61 or 62, as depicted in FIG. 55B.

FIGS. 60 through 79 depict another optional embodiment of the invention, namely, second single laminate sockliner 160A, cut from twelfth single laminate composite 160, comprised of a plurality of interrelated and "interlocking" resilient elements of varying thicknesses (namely, tenth resilient element 92, eleventh resilient element 93A, twelfth resilient element 93B, and thirteenth resilient element 93C) laminated or bonded on sockliner top surface 72A with a substrate layer, such as second substrate layer 31. FIG. 60 depicts second coated material 7, optionally cut to a suitably rectangular shape. FIG. 61 depicts first coated material 6, optionally cut to a suitably rectangular shape.

In a more preferred embodiment of the invention, first coated material 6 is thicker than second coated material 7, and first coated material 6 is made of a softer or less dense material (such as EVA foam) than second coated material 7. However, it is also understood that this is optional, and that first coated material 6 may have the same thickness as second coated material 7, or first coated material 6 may be thinner than second coated material 7. By way of example only, in another alternative and optional embodiment of the invention, first coated material 6 may have the same thickness as second coated material 7, and first coated material 6 may be made of a harder, denser, or more resilient material than second coated material 7.

As depicted in FIG. 62, second coated material 7 is cut along second perimetral edge cut line 18B, which defines and creates second perimetral edge 17B. Second coated material 7 is also cut along a plurality of fourth material cutting lines 16D, to define and create a plurality of interrelated and interlocking resilient elements, namely, ninth resilient elements 91, eleventh resilient element 93A, twelfth resilient element 93B, and thirteenth resilient element 93C, surrounded by second perimetral edge 17B.

As depicted in FIG. 63, first coated material 6 is cut along second perimetral edge cut line 18B, which defines and creates second perimetral edge 17B. Second coated material 7 is also cut along a plurality of fourth material cutting lines 16D, to define and create a plurality of interrelated and interlocking resilient elements, such as, by way of example only, tenth resilient elements 92 and fourteenth resilient elements 94, surrounded by second perimetral edge 17B.

In a more preferred embodiment of the invention, optional stretch cutting lines 90 may be cut into the resilient elements, such as in one or more instances of tenth resilient elements 92, as depicted in FIGS. 63 and 67, in order to increase the flexibility of the resilient elements, or to enable the resilient element to stretch or bend without creasing.

It is also understood that optional registration or alignment marks, such as first registration mark 88 and second registration mark 89 depicted in FIGS. 62 and 63, may be incorporated into the material cutting lines or the perimetral edge cut lines, in order to aid in aligning the work pieces during assembly, cutting, and processing.

As depicted in FIG. 64, the resilient elements in second coated material 7 are separated and extracted from second perimetral edge 17B, forming seventh partial pad assembly 95. It is understood that the resilient elements are held together during this process by their "interlocking" shape and dimension.

As depicted in FIG. 65, the resilient elements in first coated material 6 are separated and extracted from second perimetral edge 17B, forming eighth partial pad assembly 96. It is understood that the resilient elements are held together during this process by their "interlocking" shape and dimension.

FIG. 66 depicts seventh partial pad assembly 95, comprised of a plurality of interrelated and interlocking resilient elements, namely, ninth resilient elements 91, eleventh resilient element 93A, twelfth resilient element 93B, and thirteenth resilient element 93C, defined by a plurality of fourth material cutting lines 16D.

FIG. 67 depicts eighth partial pad assembly 96, comprised of a plurality of interrelated and interlocking resilient elements, namely, tenth resilient elements 92 defined by a plurality of fourth material cutting lines 16D, and the remaining fourteenth resilient elements 94.

As depicted in FIG. 68, ninth resilient elements 91 are extracted and removed from seventh partial pad assembly 95, leaving behind negative spaces 97 corresponding to the space where resilient elements have been removed from seventh partial pad assembly 95.

As depicted in FIG. 69, tenth resilient elements 92 are extracted and removed from eighth partial pad assembly 96, leaving behind negative spaces 98 corresponding to the space where resilient elements have been removed from eighth partial pad assembly 96.

As depicted in FIG. 70, tenth resilient elements 92 (which have been extracted and removed from eighth partial pad assembly 96) are inserted into negative spaces 97 created by the removal of ninth resilient elements 91 from seventh partial pad assembly 95.

It is understood that in this optional embodiment of the invention, tenth resilient elements 92 in first coated material 6 are cut so that they have substantially the same shape and dimension as the corresponding ninth resilient elements 91 in second coated material 7, so that tenth resilient elements 92 will fit into the space created by ninth resilient elements 91 in second coated material 7.

FIG. 71 depicts ninth partial pad assembly 149, comprised of one or more instances of tenth resilient elements 92, and eleventh resilient element 93A, twelfth resilient element 93B, and thirteenth resilient element 93C, wherein the resilient elements are interrelated and "interlock" with each other.

Alternatively, and optionally, as depicted in FIGS. 72 and 73, two substrate layers (such as first substrate layer 30 and second substrate layer 31) may be laminated or bonded to two opposite faces of ninth partial pad assembly 149, forming tenth dual laminate composite 150. FIG. 73 depicts a fully assembled instance of tenth dual laminate composite 150.

Alternatively, and optionally, as depicted in FIGS. 74 and 75, a single substrate layer (such as second substrate layer 31) may be laminated or bonded to one side of ninth partial pad assembly 149, forming twelfth single laminate composite 160. FIG. 75 depicts a fully assembled instance of twelfth single laminate composite 160.

In another optional aspect of the invention, tenth dual laminate composite 150 and twelfth single laminate composite 160 may be cut into appropriate shapes, to fabricate useful articles (such as, by way of example only, shoe insoles and footwear sockliners), or components for the same (such as, by way of example only, cushioning components or protective padding components in athletic or industrial protective equipment or gear).

By way of example only, and without limitations, as depicted in FIG. 76, twelfth single laminate composite 160 may optionally be cut through and along sockliner outline cutting line 71, to define second single laminate sockliner 160A.

FIG. 77 depicts second single laminate sockliner 160A, after it has been extracted and removed from twelfth single laminate composite 160. As depicted in FIG. 77, in the partial cutaway view in FIG. 78, and in the exploded view in FIG. 79, second single laminate sockliner 160A is comprised of a plurality of interrelated resilient elements of varying thicknesses (namely, tenth resilient element 92, eleventh resilient element 93A, twelfth resilient element 93B, and thirteenth resilient element 93C), laminated or bonded on sockliner top surface 72A with a substrate layer, such as second substrate layer 31.

In the optional embodiment depicted in FIGS. 78 and 79, the resilient elements are shaped to "interlock" with each other, and they are positioned adjacent to each other, so that there is no gap or space between the resilient elements, or along fourth material cutting lines 16D. However, it is understood that, in another optional and alternative embodiment of the invention, heat, pressure, or both may be applied to the assembled components of twelfth single laminate composite 160, either during or after the lamination of the substrate layer (such as second substrate layer 31) to twelfth single laminate composite 160, to cause the resilient elements to shrink, and to create gaps, or spacing 62, to appear between the resilient elements.

Optional Composite Cushioning Materials with Dual-Density Resilient Materials, and Assembly and Construction Process for the Same Several of the single and dual laminate composites depicted above (such as, by way of example only, the single laminate composite 100 as depicted in FIG. 51A, first single laminate composite 101 as depicted in FIG. 10A, second single laminate composite 102 as depicted in FIG. 10B, third single laminate composite 103 as depicted in FIG. 10C, fourth single laminate composite 104 as depicted in FIG. 42A, fifth single laminate composite 105 as depicted in FIG. 43A, sixth single laminate composite 106 as depicted in FIG. 32D, seventh single laminate composite 107 as depicted in FIG. 34F, eighth single laminate composite 108 as depicted in FIG. 40B, ninth single laminate composite 109 as depicted in FIG. 42B, tenth single laminate composite 110 as depicted in FIG. 43B, eleventh single laminate composite 140 as depicted in FIG. 55A, and twelfth single laminate composite 160 as depicted in FIG. 75, and dual laminate composite 120 as depicted in FIG. 50A, first dual laminate composite 121 as depicted in FIG. 14, second dual laminate composite 122 as depicted in FIG. 15G, third dual laminate composite 123 as depicted in FIG. 13C, fourth dual laminate composite 124 as depicted in FIG. 33, fifth dual laminate composite 125 as depicted in FIG. 35, sixth dual laminate composite 126 as depicted in FIG. 54A, seventh dual laminate composite 127 as depicted in FIG. 41B, eighth dual laminate composite 130 as depicted in FIG. 41F, and tenth dual laminate composite 150 as depicted in FIG. 73) suggest resilient elements made of a single type of material.

However, it is understood that any number of resilient elements in these single and double laminate composites may optionally comprise one or more types of materials. By way of example only, and without limitation, a resilient element may include a "core" comprised of a denser elastomer, polymer foam, or other material less susceptible to shrinkage when exposed to heat, and an outer "ring" comprised of a less dense elastomer, polymer foam, or other material more susceptible to shrinkage when exposed to heat in relation to the "core" material. Alternatively, the resilient element may include one or more vertical layers comprised of different materials, with a first layer comprised of a denser elastomer, polymer foam, or other material less susceptible to shrinkage when exposed to heat, and a second layer comprised of a lighter elastomer, polymer foam, or other material more susceptible to heat-shrinkage.

The use of different materials in the resilient elements (that is, in the "dual-density" resilient elements) confers advantages to the resulting single or dual laminate composites. By way of example only, by combining materials with different densities and heat-shrinkage rates, it is possible to apply a relatively greater amount of heat and pressure to the assembly at the time of fabrication, resulting in greater amount of spacing (or gaps) between the resilient elements without the risk of deforming the same, and thereby produce single or dual laminate composites that are relatively more breathable, flexible, stretchable, and/or lighter. Examples of such composite materials are shown in FIG. 88 (depicting fourteenth single laminate composite 212), and FIGS. 89-91 (depicting eleventh dual laminate composite 213).

FIGS. 80-89 depict methods for fabricating single and dual laminate composites with "dual-density" resilient elements. As shown in FIG. 80, two sets of coated materials (coated material 206 and coated material 207) of suitable quality are selected. Each coated material is comprised of a suitable resilient material or elastomer (such as, by way of example only and without limitations, EVA foam, olefin or polyolefin foam, PU foam, urethane based foam, thermoplastic foam, rubber, elastomer, other open or closed cell polymer foam, or other resilient material), and is covered on one or two opposing surfaces with an adhesive element. It is understood that first resilient material 1 or second resilient material 2 may be selected to make the said coated materials. It is also understood that first joining element 3 or second joining element 4 may be applied to one or two opposing surfaces of the coated material 206 and/or coated material 207.

In this embodiment of the invention, coated material 206 and coated material 207 are comprised of materials that display different degrees of shrinkage or deformation when exposed to heat, or heat and pressure. In one optional embodiment, coated material 206 is comprised of a material (or combination of materials) that is denser and/or has lower degree of shrinkage when exposed to heat, or heat and pressure relative to coated material 207.

As shown in FIG. 81, coated material 206 is cut along material cutting lines 216C, which define and create one or more resilient elements 215C. Coated material 207 is cut along material cutting lines 216E, which define and create one or more resilient elements 215E. The location(s) and the dimension(s) of the material cutting are such that the shape(s), relative location(s), and dimension(s) of each resilient element 215C substantially correspond to the shape(s), relative location(s), and dimension(s) of each resilient element 215E.

As shown in FIG. 82, resilient elements 215E are displaced, removed, or extracted from the coated material 207, leaving behind apertures 260 that correspond to the shape(s), relative location(s), and dimension(s) of the resilient element 215E that formerly occupied that space. Resilient elements 215E may be removed by mechanically extracting them from the block or sheet of coated material 207, as depicted in FIG. 82.

Thereafter, resilient elements 215C from coated material 206 are positioned in relation to apertures 260 in coated material 207, and positioned in the said apertures, as depicted in FIG. 83.

Alternatively, and optionally, coated material 206 may be positioned over and aligned (or "superimposed") to coated material 207, so that resilient elements 215C in coated material 206 are substantially aligned to resilient elements 215E in coated material 207, and resilient elements 215C may be pushed towards and into coated material 207 (by way of a mechanical pusher, pressure blower, or other similar means), so that resilient elements 215C are pushed out of coated material 206 and into coated material 207, and displace and replace resilient elements 215E in coated material 207 in a substantially single step.

FIG. 84 depicts the resulting dual-density cut material 209, comprised of one or more resilient elements 215C "embedded" into a frame or matrix element 208A comprised of coated material 207 without the resilient elements 215E. It is understood that the displaced resilient elements 215E (shown in FIG. 82) and the matrix element remaining from coated material 206 (shown in FIG. 84) may be discarded as waste material or recycled for other uses.

As depicted in FIG. 85, dual-density cut material 209 is cut along material cutting lines 216F, to define and create one or more dual-density resilient elements 220, shown individually in FIGS. 92-93. It is understood that in this embodiment, each dual-density resilient element 220 comprises a core material (consisting of resilient element 215C) and an outer material 208B. In this embodiment of the invention, a plurality of dual-density resilient element 220 form dual-density matrix 210A.

As depicted in FIG. 86, a substrate layer (such as first substrate layer 30, second substrate layer 31, or alternative substrate layer) may be bonded to one side of the dual-density matrix 210A, to form thirteenth single laminate composite 211.

In one optional embodiment of the invention, the substrate layer (such as first substrate layer 30, second substrate layer 31, or alternative substrate layer) is positioned adjacent to dual-density matrix 210A as shown in FIG. 86, and heat, or heat and pressure, is applied to the assembly, bonding the substrate layer to the dual-density matrix. Alternatively, the substrate layer may be bonded to the dual-density matrix by any suitable means, and heat, or heat and pressure, may be applied to the assembly as a separate step.

As depicted in FIG. 88, in this embodiment of the invention, the application of heat, or heat and pressure, causes dual-density resilient elements 220 to shrink or contract, and convert into contracted dual-density resilient elements 221. The contraction or shrinkage of the resilient elements cause spacing 219 to appear between the resilient elements. As shown in FIG. 88, a plurality of contracted dual-density resilient elements 221 forms contracted dual-density matrix 210B.

The resulting material, namely, fourteenth single laminate composite 212, may be used as is, or cut into a suitable shape and incorporated into other articles, such as footwear, apparel, athletic equipment and accessories, protective pads, cushions, and the like. It is understood that the presence of gaps, or spacing 219, between the contracted dual-density resilient elements 221 confers beneficial attributes to the resulting fourteenth single laminate composite 212 and to the articles that incorporate the same, including, without limitations, greater flexibility, enhanced breathability, and lower weight.

In another alternative and optional embodiment of the invention, a second substrate layer (such as first substrate layer 30, second substrate layer 31, or alternative substrate layer) may be positioned adjacent to dual-density matrix 210A as shown in FIGS. 86 and 87, and heat, or heat and pressure, may be applied to the assembly, bonding the two substrate layers (simultaneously or sequentially) to the dual-density matrix. Alternatively, the substrate layers may be bonded to the dual-density matrix by any suitable means, and heat, or heat and pressure, may be applied to the assembly as a separate step.

As depicted in FIG. 89, in this embodiment of the invention, the entire assembly is "sandwiched" between two substrate layers, forming eleventh dual laminate composite 213.

As shown in greater detail in FIGS. 90 and 91, which depict partial cutout views of eleventh dual laminate composite 213, the application of heat, or heat and pressure, causes dual-density resilient elements 220 to shrink or contract, and convert into contracted dual-density resilient elements 221. A plurality of contracted dual-density resilient elements 220 forms contracted dual-density matrix 210B. The contraction or shrinkage of the resilient elements cause spacing 219 to appear between the resilient elements.

The resulting material, namely, eleventh dual laminate composite 213, may be used in a similar manner as fourteenth single laminate composite 212.

It is understood that individual dual-density resilient elements 220 do not shrink or contract uniformly, because dual-density resilient elements are comprised of at least two types of materials with different characteristics. By varying the type of materials, and the shape, size, and position of each component that comprises the dual-density resilient element, the shrinkage or contraction of the assembly, and the shape of the resulting dual-density resilient element may be controlled.

FIGS. 92 and 94 depict one optional embodiment of the invention, wherein each dual-density resilient element 220 includes at least two components: A "core" comprised of resilient element 215C, and an outer "jacket," namely, outer material 208B.

The "core" (that is, resilient element 215C) is made of a denser material, or a material that is more resistant to heat and/or less prone to shrinkage or deformation when exposed to heat, relative to the outer "jacket."

The outer "jacket" (that is, outer material 208B) is made of a lighter or less dense material, or a material that is more prone to shrinkage or deformation when exposed to heat, relative to the "core."

FIG. 93 depicts an exploded view of the dual-density resilient elements 220 prior to exposure to heat, or heat and pressure. FIG. 95 depicts a partial cutout view of the same dual-density resilient elements, showing the "core" and the outer "jacket."

It is understood that dual-density resilient elements may take on a variety of shapes. For example, FIGS. 98 and 99 show, by way of example only, cylindrical dual-density resilient elements 222 that are cylindrical in shape. In this example, each cylindrical dual-density resilient element 222 includes a cylindrical "core" 215D and an annular outer "jacket," or annular outer material 208D.

Upon exposure to heat, or heat and pressure, the dual-density resilient elements 220 changes shape, forming contracted dual-density resilient elements 221. As depicted in FIGS. 96 and 97, in this embodiment of the invention, the application of heat, or heat and pressure, causes the outer "jacket" (consisting of outer material 208B) to shrink or contract to a greater degree than the "core" (consisting of resilient element 215C).

Similarly, FIGS. 98 and 99 show an alternative, cylindrically-shaped dual-density resilient element 222. Differential shrinkage of the outer "jacket" (consisting of annular outer material 208D) is shown in FIG. 99, with the cylindrical "core" 215D displaying lesser degree of shrinkage or contraction in relation to the outer "jacket."

In this embodiment of the invention, spacing 219 appears between the contracted dual-density resilient elements 221 (and the cylindrical dual-density resilient elements 222), as the outer "jacket" shrinks or contracts. However, the degree of contraction may be constrained and controlled by the "core" (consisting of a denser or more heat-resistant resilient elements 215C and 215D).

The use of two or more materials in the make of the resilient elements has several advantages. Among other things, and by way of example only, the use of a denser or more heat-resistant "core" permits the entire workpiece to be heated at a higher temperature and/or for a longer time without deforming the workpiece to the extent that structural and dimensional integrity are lost. It also permits the shrinkage or contraction of the workpiece to be controlled (for example, by selecting suitable shapes and thicknesses or dimensions for the outer "jacket" and the core, and by heating the work piece only to the threshold level required to deform the outer "jacket," without affecting the shape or dimension of the "core"). The use of a "dual-density" resilient element also permits the fabrication of composite materials with greater spacing between the resilient elements.

It is understood that the various components of the process disclosed herein may be made of any suitable material and may be any size and shape consistent with their functions. The specific embodiments of the process disclosed and illustrated herein are not to be considered in a limiting sense as numerous variations are possible. Ordinal indicators, such as first, second or third, for identified elements in the specification and descriptions herein are used to distinguish between the elements, and do not indicate a required or limited number of such elements, and do not indicate a particular position or order of such elements unless otherwise specifically indicated. The subject matter of this disclosure includes all novel and non-obvious combinations and subcombinations of the various features, elements, functions and/or properties disclosed herein. No single feature, function, element or property of the disclosed embodiments is essential.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. The following examples are offered by way of illustration of the present invention, and not by way of limitation.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A composite material of a cushion on bottom of a footwear, comprising a sheet of resilient material comprising:
   a first expanse of material on the bottom of the footwear to which it is bound; and
   a plurality of resilient elements having defined length and width and physical characteristics, wherein each resilient element is directly bound to the first expanse of material at one end, wherein the resilient elements are spaced apart from each other, wherein the resilient elements are comprised of any one of ethylene vinyl acetate ("EVA") foam, olefin or polyolefin foam, polyurethane ("PU") foam, urethane based foam, or thermoplastic foam, wherein at least one of the plurality of resilient elements is different from at least one of the remainder of the plurality of elements in physical characteristics, wherein a free end of the resilient elements face away from the footwear, wherein the resilient elements comprise a dense material of EVA foam, fully or partially enveloped by less dense material.

2. The composite material according to claim 1, wherein a difference in the physical characteristics is in color, length, width, hardness, density, or shrinkage when exposed to heat, pressure, or both.

3. The composite material according to claim 1, wherein the resilient elements comprise a core that shrinks less when exposed to heat, which is fully or partially enveloped by resilient material that comparatively shrinks more when exposed to heat.

4. The composite material according to claim 1, wherein the less dense material on the resilient elements is changed in shape at or near the point of contact with the first expanse of material.

5. The composite material according to claim 3, wherein the resilient elements that comparatively shrinks more when exposed to heat is changed in shape at or near a point of contact with the first expanse of material.

6. The composite material according to claim 1, wherein at least one resilient element is changed in shape at or near a point of contact with the first expanse of material.

7. The composite material according to claim 6, wherein the change in shape is shriveling, rounding, shrinking, cutting or contracting at an edge of the resilient element at or near the point of contact with the first expanse of material.

8. The composite material according to claim 6, wherein shape of the resilient element sought to be changed is composed of material that changes shape or dimension to a greater extent when exposed to heat, pressure or both, than a resilient element not sought to be changed.

9. The composite material according to claim 8, wherein the material that changes shape or dimension to a greater extent when exposed to heat, pressure, or both is less dense material.

10. The composite material according to claim 9, wherein a range of from 0.1% to 99% along an axis perpendicular to the source of heat or pressure from the point of contact with the first expanse of material is changed in shape.

11. The composite material according to claim 10, wherein the range is from 0.1% to 40%.

12. The composite material according to claim 1, wherein the resilient elements are spaced apart from each other so that a gap is present between the resilient elements.

13. A multiple density composite material of a resilient cushion on bottom a footwear, comprising:
(i) a first expanse of material; and
(ii) a plurality of resilient elements having defined first end and second end and a middle along the length of the resilient element, as well as defined width along the length of the resilient element, wherein each resilient element is directly bound to the first expanse of material at the first end of the resilient element and free of binding at the second end to form the composite material, wherein the first end of the resilient element connected to the first expanse of material has maximum diameter that is less than the maximum diameter of the middle of the resilient element, wherein the resilient elements are spaced apart from each other, wherein the resilient elements are comprised of any one of ethylene vinyl acetate ("EVA") foam, olefin or polyolefin foam, polyurethane ("PU") foam, urethane based foam, or thermoplastic foam, wherein at least one of the plurality of resilient elements is different from at least one of the remainder of the plurality of elements in physical characteristics, wherein the resilient elements comprise a dense material of EVA foam, fully or partially enveloped by less dense material.

14. The composite material according to claim 13, wherein the maximum diameter of the first end is less than the maximum diameter of the middle of the resilient element by about 1 to 50%.

15. The composite material according to claim 14, wherein the maximum diameter of the first end is less than the maximum diameter of the middle of the resilient element by about 10 to 40%.

16. The composite material according to claim 13, wherein the resilient elements are spaced apart from each other so that a gap is present between the resilient elements.

* * * * *